(12) United States Patent
Fukuda et al.

(10) Patent No.: US 7,470,017 B2
(45) Date of Patent: *Dec. 30, 2008

(54) RECORDING LIQUID, LIQUID CARTRIDGE EMITTING DEVICE AND LIQUID EMITTING METHOD

(75) Inventors: Toshio Fukuda, Kanagawa (JP); Yuji Yakura, Kanagawa (JP); Masato Nakamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/745,727

(22) Filed: May 8, 2007

(65) Prior Publication Data

US 2007/0209551 A1 Sep. 13, 2007

Related U.S. Application Data

(62) Division of application No. 10/522,449, filed as application No. PCT/JP2004/007439 on May 25, 2004.

(30) Foreign Application Priority Data

May 29, 2003 (JP) ............................. 2003-152031
Oct. 2, 2003 (JP) ............................. 2003-344969

(51) Int. Cl.
  *G01D 11/00* (2006.01)
(52) U.S. Cl. ........................ 347/100; 347/95; 106/31.27
(58) Field of Classification Search ................. 347/100, 347/95, 96, 101; 106/31.6, 31.27, 31.13; 523/160
See application file for complete search history.

(56) References Cited

U.S. PATENT DOCUMENTS 4,229,747 A * 10/1980 Hwang ........................ 347/100

| 5,141,556 A | 8/1992 | Matrick |
| 5,531,817 A | 7/1996 | Shields et al. |
| 7,081,330 B2 * | 7/2006 | Takamiya ................... 430/302 |

FOREIGN PATENT DOCUMENTS

| EP | 0 562 732 | 9/1993 |
| JP | 06-157955 | 6/1994 |
| JP | 2000-345082 | 12/2000 |
| JP | 2003-154652 | 5/2003 |
| JP | 2003-192966 | 7/2003 |
| JP | 2004-197037 | 7/2004 |

OTHER PUBLICATIONS

Japanese Office Action dated Apr. 30, 2008 for Application No. 2003-344969.
Japanese Office Action dated May 27, 2008 for Application No. 2004-017676.
Japanese Office Action issued on May 27, 2008.

* cited by examiner

*Primary Examiner*—Manish S Shah
(74) *Attorney, Agent, or Firm*—Sonnenschein Nath & Rosenthal LLP

(57) ABSTRACT

Disclosed is an ink liquid used in a printer device of the ink jet system for recording an image or letters/characters. A surfactant containing an organic compound represented by the following chemical formula 1:

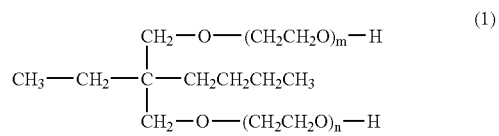

where m and n are integers not less than 1, is contained in an ink 2 to prevent blurring or bleeding from being produced at a point of deposition of an ink liquid droplet i.

4 Claims, 18 Drawing Sheets

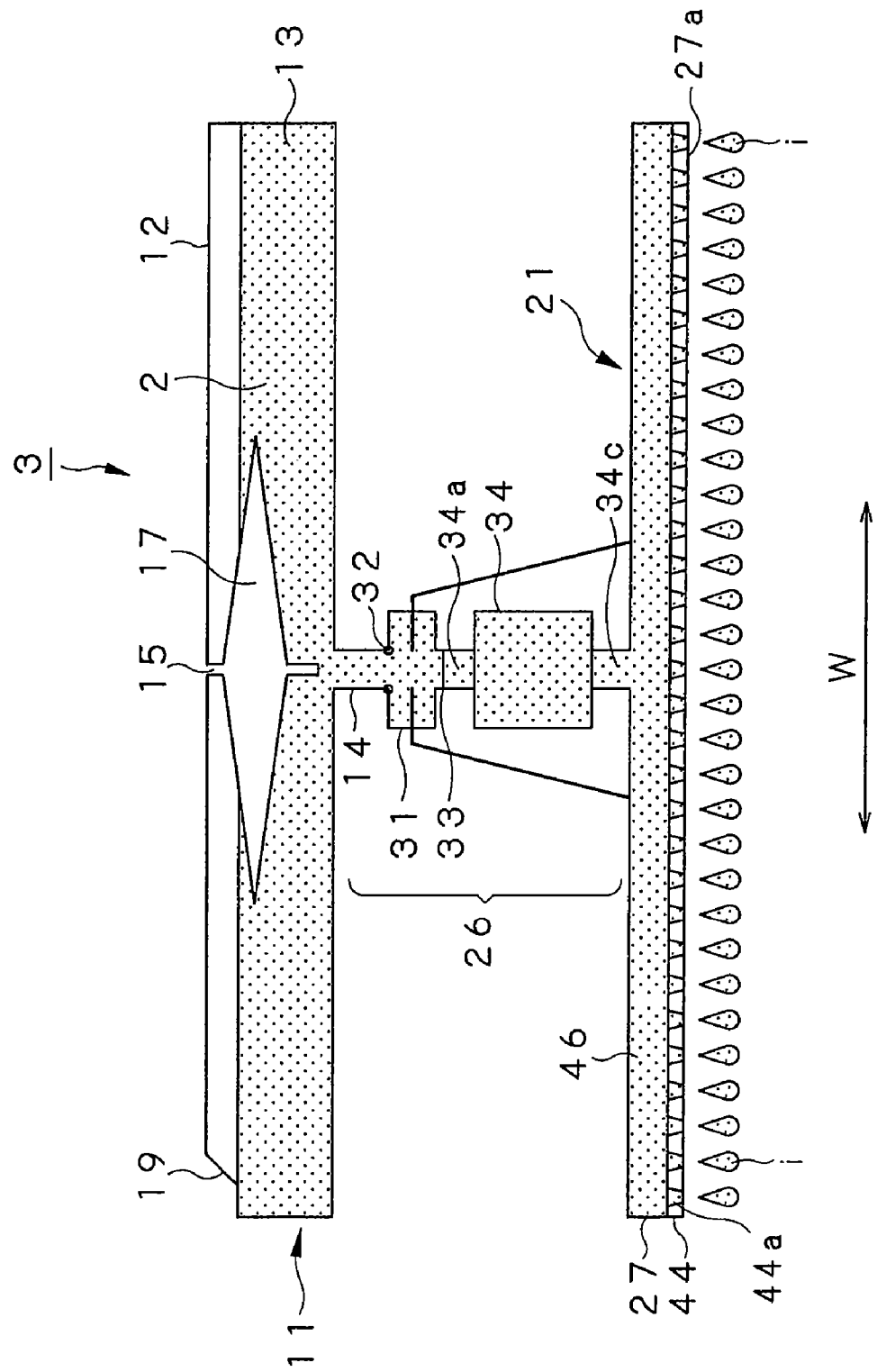

RECORDING LIQUID, LIQUID CARTRIDGE EMITTING DEVICE AND LIQUID EMITTING METHOD

RELATED APPLICATION DATA

This application is a divisional of U.S. patent application Ser. No. 10/522,449, filed Jan. 20, 2005, the entirety of which is incorporated herein by reference to the extent permitted by law, which is the Section 371 National Stage of PCT/JP2004/007439. This application claims the benefit of priority to PCT International Application No. PCT/JP2004/007439, filed May 25, 2004, and to Japanese Patent Application 2003-152031, filed in the Japanese Patent Office on May 29, 2003, and Japanese Patent Application 2003-344969, filed in the Japanese Patent Office on Oct. 2, 2003, the entirety of which both are also incorporated by reference herein to the extent permitted by law.

This invention relates to a recording liquid for recording on a support, a liquid cartridge holding the recording liquid therein, and to a liquid emitting device and a liquid emitting method for pressurizing the recording liquid by a pressurizing element to emit the liquid in the form of liquid droplets from an emitting opening.

Among liquid emitting devices for emitting the liquid to a support via an emitting opening, there is a printer device of the ink jet system for recording images or letters/characters. The printer device of the ink jet system lends itself to low running costs, small device size and to formation of multi-color printing images. In a printer device of the ink jet system, the ink as a recording liquid, such as yellow, magenta, cyan or black, is supplied from an ink cartridge to e.g. an ink liquid chamber of a head chip. In this printer device, the ink supplied to e.g. the ink liquid chamber is pressurized by a pressurizing element, such as a resistance heating element, arranged in the ink liquid chamber, and emitted via a small-sized ink emitting opening, that is, a so-called ink nozzle. More specifically, the resistance heating element, arranged in the ink liquid chamber, heats the ink in the ink chamber to generate air bubbles in the ink on the resistance heater to emit the ink via nozzle under the thrusting force exerted by the air bubbles, with the ink then being deposited on a recording sheet, as a support, for printing an image or letters/characters thereon.

For the ink used for the printer device of the ink jet system, a solution obtained on dispersing various dyestuffs, operating as a dye, or colorants, such as pigments, in a solvent, comprising e.g. an organic solvent, is used. Such ink is required to satisfy the following requirements:
1) that it does not bleed on deposition on a recording sheet, that is, that it gives high image quality;
2) that it is not deteriorated on prolonged storage, that is, that it has superior long-term storability;
3) that it is not changed in color after deposition on the recording sheet due to light, heat or moisture, that is, that it has high resistant properties;
4) that it has superior frequency response against the driving frequency for high-speed printing;
5) that it dries promptly after printing, that is, it has fast drying properties; and
6) that it does not clog the nozzle during printing or on re-start after printing interruption.

The techniques disclosed in e.g. the Japanese Laid-Open Patent Publications S59-93765 and S60-243175, are designed to meet these requirements.

However, in the current status of the art, it is difficult to develop an ink having high response properties to the driving frequency in order to keep pace with the increasing printing speed of the printer, that is, the ink designed to cope with a shortened ink emitting interval from the ink nozzle. It is specifically necessary to reduce the ink viscosity in keeping with the increasing printing speed of the printer device. However, if the ink viscosity is reduced in this manner, ink emission stability at the time of ink emission from the nozzle is undesirably lowered.

Moreover, in printing on a printer device, ordinary paper sheets, such as, for example, copy sheets, bond paper sheets, or reporting paper sheets, are mainly used as recording paper sheets. In this case, there may be raised a problem that the deposited ink bleeds along the fiber of the ordinary paper sheet or is not readily dried due to the sizing agent contained in the ordinary paper.

For addressing these problems, it has been proposed in the Japanese Patent Publication Nos. 56-57862 or 55-29546 to set pH of the ink to strong alkalinity or to use a large quantity of a surfactant.

However, with the technique of setting pH of the ink to strong alkalinity, the ink printed on the ordinary paper sheet also becomes strongly alkaline, with the result that an object touching the printed ink is changed in its physical properties.

The technique of using a large quantity of a surfactant suffers a problem that the surface tension of the ink is lowered, while air foams tend to be produced during ink preparation or within an ink liquid chamber, with the so generated air foams not vanishing readily on defoaming. Hence, with the conventional printer device, the ink is set back appreciably from the orifice due to air foams generated in the ink liquid chamber, without being emitted, or conversely the orifice surface in its entirety is wetted to inhibit ink emission. Moreover, with the present proposal, there is a risk that bleeding occurs severely depending on the sort of the ordinary paper sheet employed. Additionally, with the present proposal, it may be an occurrence that the ink temperature exceeds the cloud point of the routinely used surfactant, which is on the order of 60° C., due to heating of the ink by the resistance heater at the time of ink emission. If the ink is heated to higher than the cloud point of the surfactant, it may be an occurrence that a surfactant is precipitated into the ink to change its physical properties, high image quality printing becomes impossible, or that the shortened emission interval cannot be coped with.

For addressing the above problem, the technique of using a surfactant, composed of an acetylene glycol, as a surfactant, has been proposed in, for example, the Japanese Laid-Open Patent Publication 63-139964 or Japanese Patent 3262568. The acetylene glycol is low in foaming properties and in bleeding and superior in defoaming and in fixing properties, while being able to emit the ink in stability even in high-speed printing of letters/characters, because of its specified structure having a triple bond and a hydroxyl group in the adjoining carbon atom in the molecule.

However, the surfactant, comprising an acetylene glycol, as stated in the Japanese Laid-Open Patent Publication 63-139964 or Japanese Patent 3262568, is extremely costly, such that its use in deterrent to the lowering of the production cost of the ink. On the other hand, the surfactant, comprising acetylene glycols, is susceptible to non-negligible variations in surface activity from one production lot to another, such that the ink quality is not constant.

SUMMARY OF THE INVENTION

It is an object of the present invention to provide a novel recording liquid, with which the problems inherent in the conventional technique may be resolved, a liquid cartridge containing the recording liquid, and a liquid emission method as well as a liquid emission device, capable of performing the high image quality printing, using the recording liquid contained in the liquid cartridge.

It is another object of the present invention to provide an inexpensive recording liquid which is superior in wettability for a support, susceptible to foaming or bleeding only to a lesser extent, and which is able to cope with high quality printing and shortened emitting interval. It is yet another object of the present invention to provide a liquid emitting method as well as a liquid emitting device capable of performing high quality printing using a liquid cartridge containing the recording liquid, and the recording liquid accommodated in this liquid cartridge.

The present inventor has found that the above problems may be resolved by containing a surfactant, containing in turn an ethylene oxide adduct of 3-ethyl-3-hydroxymethyl-heptanol, in place of the acetylene glycol, in the recording liquid. Based on this finding, the present inventors have arrived at the present invention.

Thus, the present invention provides a recording liquid deposited as a liquid droplet on a support for printing thereon, comprising a dye, a solvent for dispersing the dye, and a surfactant containing an organic compound represented by the following chemical formula 1:

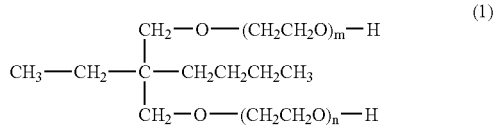

where m and n are integers not less than 1.

The present invention also provides a liquid cartridge loaded on a liquid emission device and operating as a supply source for a recording liquid held in a vessel for a liquid, the liquid emission device emitting the recording liquid as a liquid droplet for deposition and recording on a support, wherein the recording liquid contains a dye, a solvent for dispersing the dye, and a surfactant containing an organic compound represented by the following chemical formula 1:

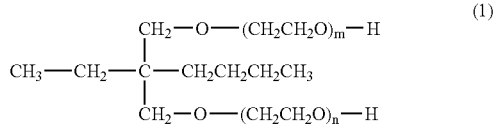

where m and n are integers not less than 1.

The present invention also provides a device for liquid emission comprising emission means including a liquid chamber for storing a recording liquid, a supply unit for supplying the recording liquid to the liquid chamber, one or more pressurizing units provided in the liquid chamber for pressurizing the recording liquid stored in the liquid chamber, and an emission opening for emitting the recording liquid, pressurized by the pressurizing means, from each liquid chamber in a state of a liquid droplet to the major surface of a support, a liquid cartridge connected to the emission means and operating as a supply source for supplying the recording liquid to the supply unit, and emission controlling means for controlling the driving of the pressurizing unit. The recording liquid contains a dye, a solvent for dispersing the dye, and a surfactant containing an organic compound represented by the following chemical formula 1:

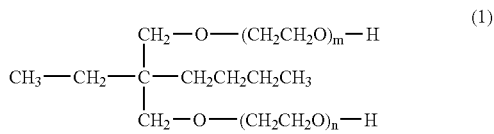

where m and n are integers not less than 1.

The present invention also provides a method for liquid emission by a liquid emitting device comprising emission means including a liquid chamber for storing a recording liquid, a supply unit for supplying the recording liquid to the liquid chamber, one or more pressurizing units provided in the liquid chamber for pressurizing the recording liquid stored in the liquid chamber, and an emission opening for emitting the recording liquid, pressurized by the pressurizing means, from each liquid chamber to the major surface of a support, in a state of a liquid droplet, a liquid cartridge connected to the emission means and operating as a supply source for supplying the recording liquid to the supply unit, and emission controlling means for controlling the driving of the pressurizing unit, wherein, as the recording liquid, a liquid mixture containing a dye, a solvent for dispersing the dye, and a surfactant containing an organic compound represented by the following chemical formula 1:

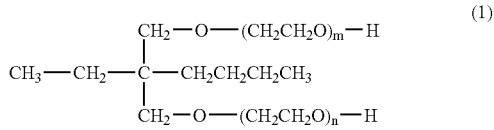

is used, where m and n are integers not less than 1.

The recording liquid according to the present invention contains at least a surfactant containing in turn an organic compound represented by the above formula 1. Specifically, by the recording liquid containing at least the non-ionic surfactant, represented by the above chemical formula 1, in the recording liquid, it is possible to suppress the recording liquid in the liquid chamber from foaming as well as to optimize the coating performance of the recording liquid against a support. Hence, according to the present invention, in which it is possible to suppress the recording liquid in the liquid chamber from foaming as well as to optimize the coating performance of the recording liquid against e.g. the emission opening, the recording liquid can be optimally emitted from the emission opening and, when the recording sheet is used as a support, it is possible to suppress the recording liquid, deposited on the recording sheet, from blurring or bleeding, to enable high quality printing. In addition, even if the interval of the emission of the recording liquid from the emission opening is shortened, it is possible to suppress excessive foaming of the recording liquid in the liquid chamber. Since the ink exhibits optimum wettability with respect to the emission opening, the recording liquid may optimally be supplied to the inside of the liquid chamber or to the emission opening, so that the recording liquid may be emitted so as to cope with an increased printing speed.

Furthermore, with the recording liquid of the present invention, the cloud point of the surfactant, containing the organic compound shown by the chemical formula 1, is on the order of 80° C., and is higher than with the conventional surfactant, it is possible to prohibit the temperature of the recording liquid on the pressurizing unit from readily exceeding the cloud point of the surfactant, so that it is possible to prevent an inconvenience that the characteristics of the recording liquid are changed to render it impossible to emit liquid droplets from the emission opening.

The present invention also provides another recording liquid deposited on a support in the state of a liquid droplet for printing thereon. The recording liquid contains a dye, a solvent for dispersing the dye, a surfactant containing an organic compound represented by the following chemical formula 1:

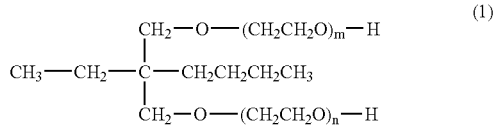

where m and n are integers not less than 1, and a glycol ether having the vapor pressure at 20° C. not larger than 0.1 mmHg and the surface tension not larger than 35 mN/m.

The present invention also provides another liquid cartridge loaded on a liquid emission device and operating as a supply source for a recording liquid held in a vessel for a liquid, the liquid emission device emitting the recording liquid as a liquid droplet for deposition and recording on a support. The recording liquid contains a dye, a solvent for dispersing the dye, a surfactant containing an organic compound represented by the chemical formula 1:

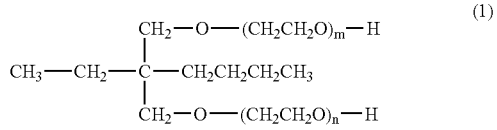

where m and n are integers not less than 1, and a glycol ether having the vapor pressure at 20° C. not larger than 0.1 mmHg and the surface tension not larger than 35 mN/m.

The present invention also provides a liquid emission device comprising emission means including a liquid chamber for storing a recording liquid, a supply unit for supplying the recording liquid to the liquid chamber, one or more pressurizing units provided in the liquid chamber for pressurizing the recording liquid stored in the liquid chamber, and an emission opening for emitting the recording liquid, pressurized by the pressurizing means, from each liquid chamber in a state of a liquid droplet to the major surface of a support, a liquid cartridge connected to the emission means and operating as a supply source for supplying the recording liquid to the supply unit, and emission controlling means for controlling the driving of the pressurizing unit. The recording liquid contains a dye, a solvent for dispersing the dye, a surfactant containing an organic compound represented by the following chemical formula 1:

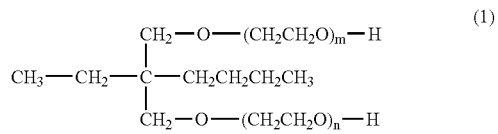

where m and n are integers not less than 1, and a glycol ether having the vapor pressure at 20° C. not larger than 0.1 mmHg and the surface tension not larger than 35 mN/m.

The present invention also provides another method for liquid emission by a liquid emitting device comprising emission means including a liquid chamber for storing a recording liquid, a supply unit for supplying the recording liquid to the liquid chamber, one or more pressurizing units provided in the liquid chamber for pressurizing the recording liquid stored in the liquid chamber, and an emission opening for emitting the recording liquid, pressurized by the pressurizing means, from each liquid chamber to the major surface of a support in a state of a liquid droplet, a liquid cartridge connected to the emission means and operating as a supply source for supplying the recording liquid to the supply unit, and emission controlling means for controlling the driving of the pressurizing unit. The recording liquid contains a dye, a solvent for dispersing the dye, a surfactant containing an organic compound represented by the following chemical formula 1:

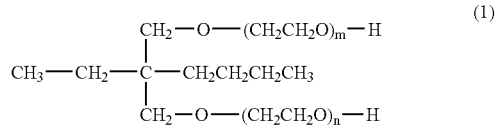

where m and n are integers not less than 1, and a glycol ether having the vapor pressure at 20° C. not larger than 0.1 mmHg and the surface tension not larger than 35 mN/m. The recording liquid is emitted from the emission opening.

With the other recording liquid, according to the present invention, containing the surfactant, containing in turn the organic compound represented by the above chemical formula 1, specifically, the non-ionic surfactant shown by the above chemical formula 1, it is possible to suppress the recording liquid in the liquid chamber from foaming as well as to assure optimum coating performance against the support. Thus, with the use of the recording liquid, according to the present invention, it is possible to suppress the recording liquid in the liquid chamber of the emission means from foaming and to assure optimum wettability of the recording liquid against e.g. the emission opening, so that the recording liquid may be emitted satisfactorily from the emission opening. Moreover, with the recording liquid, according to the present invention, the cloud point of the surfactant, containing the organic compound of the above chemical formula, is on the order of 80° C. and is higher than that of the routinely used surfactant, so that it is possible to prevent the temperature of the recording liquid on the pressurizing unit from readily exceeding the cloud point of the surfactant.

With the other recording liquid according to the present invention, containing, in addition to the surfactant, shown by the above chemical formula 1, the glycol ether having the vapor pressure at 20° C. not larger than 0.1 mmHg and the surface tension not larger than 35 mN/m, the surface tension of the ink may be maintained at a lower value at any time, such as when the ink is contained in the liquid chamber, when the ink is present in the emission opening, or after deposition on the support, thus further improving the wettability against the inside of the liquid chamber or the inside of the emission opening. This merit adds to the advantage proper to the aforementioned recording liquid according to the present invention.

In addition, the recording liquid according to the present invention, containing the surfactant containing the organic compound shown by the above chemical formula 1 in place of the conventional surfactant comprising e.g. acetylene glycols, is less costly than in case of using e.g. acetylene glycols.

BRIEF DESCRIPTION OF THE DRAWINGS

FIG. 4A is a side view showing a supply opening closed and FIG. 4B is a cross-sectional view showing the supply opening opened.

FIG. 5 is a side view showing the relationship between the ink cartridge and a head chip in the ink jet print head cartridge.

FIGS. 6A and 6B show a valve mechanism at an ink cartridge connecting portion, wherein FIG. 6A is a cross-sectional view showing the valve closed and FIG. 6B is a cross-sectional view showing the valve opened.

FIGS. 16A to 16C are cross-sectional views showing the state of the emission controlling unit controlling the direction of emission of the ink droplet, wherein FIG. 16A is a cross-sectional view for illustrating an ink droplet emitted substantially directly downwards, FIG. 16B is a cross-sectional view for illustrating an ink droplet emitted substantially obliquely in one direction along the width of a recording sheet with the nozzle as center, and FIG. 16C is a cross-sectional view for illustrating an ink droplet emitted substantially obliquely in the opposite direction along the width of the recording sheet with the nozzle as center

FIG. 19A is a plan view showing the state in which resistance heater is arranged parallel to the running direction of the recording sheet, FIG. 19B is a plan view showing three resistance heaters provided in the ink chamber, and FIG. 19C is a plan view showing four resistance heaters provided in the ink chamber.

DETAILED DESCRIPTION OF THE PRESENTLY PREFERRED EMBODIMENTS

Figure 1:
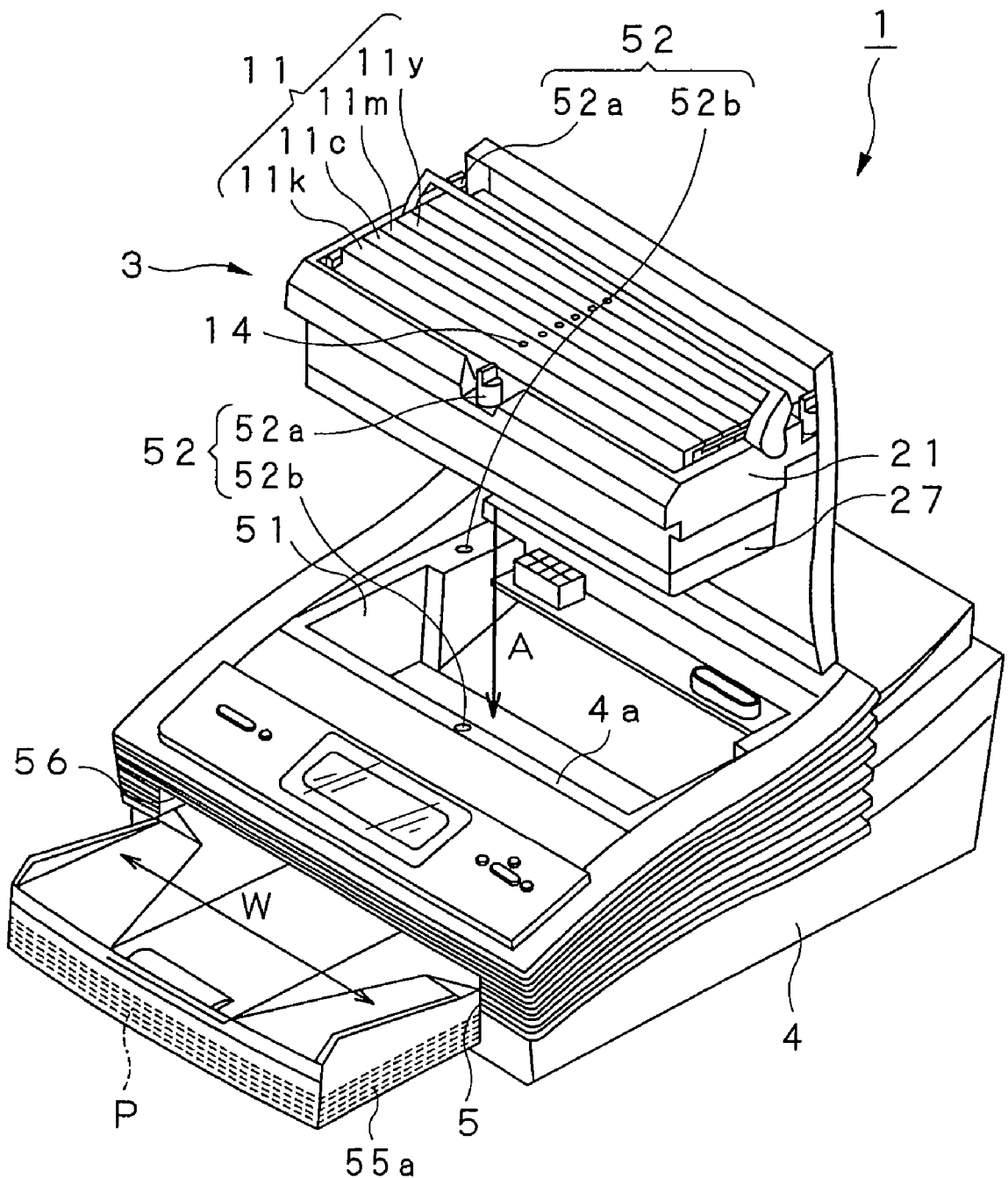
FIG. 1 is a perspective view showing an ink jet printer device according to the present invention.

Referring to the drawings, a recording liquid, a liquid cartridge, a liquid emitting device and a liquid emitting method, according to the present invention, are hereinafter explained. An ink jet printer device 1, shown in FIG. 1, referred to below as a printer device 1, emits e.g. ink to a recording sheet P, running in a preset direction, to print an image or letters/characters. This printer device 1 is a so-called line printer device in which an ink emission opening (nozzle) is arranged substantially in a line along the width of a recording sheet P, that is, along the direction of an arrow W in FIG. 1, in keeping with the printing width of the recording sheet P.

Figure 2:
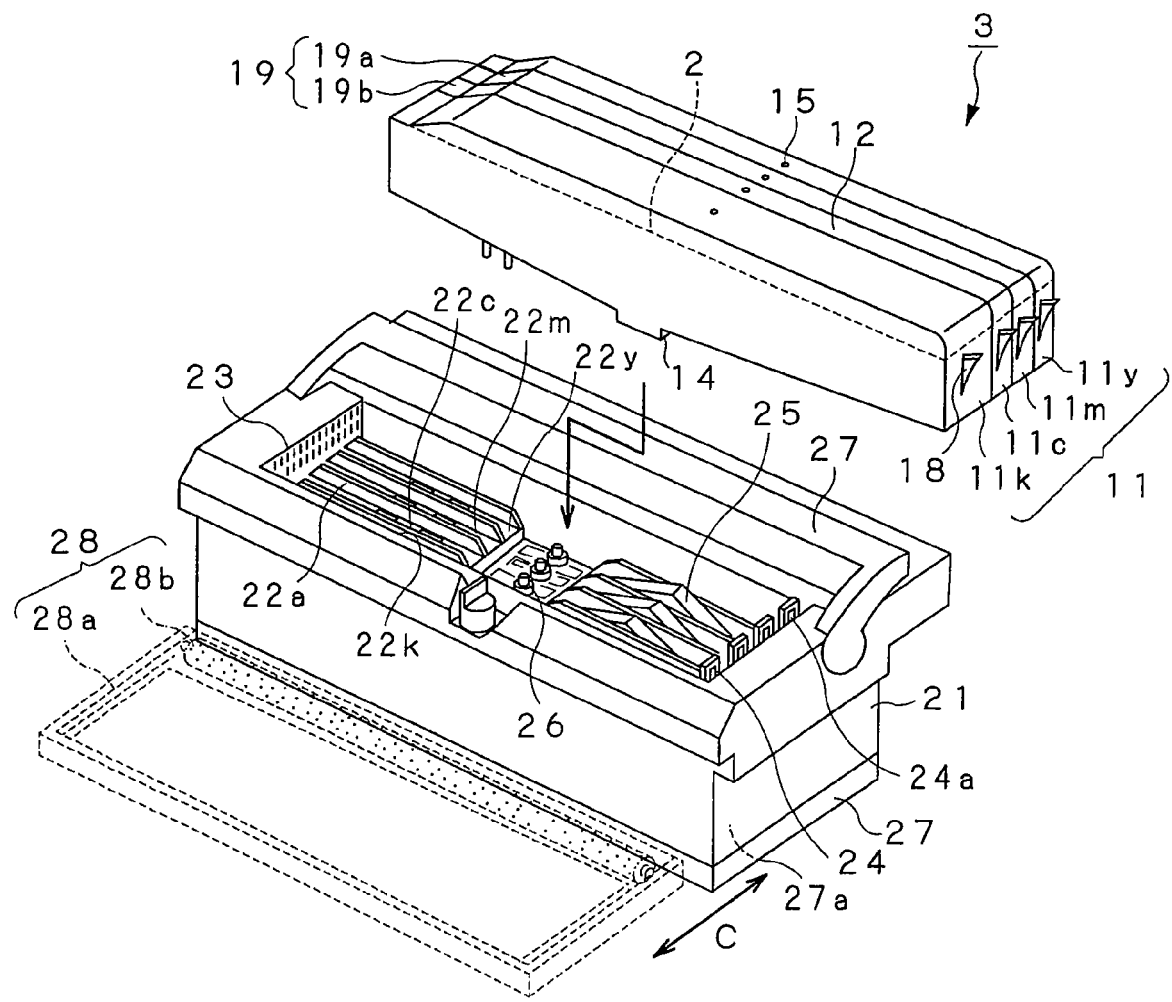
FIG. 2 is a perspective view showing an ink jet print head cartridge provided in the ink jet printer device.
Figure 3:
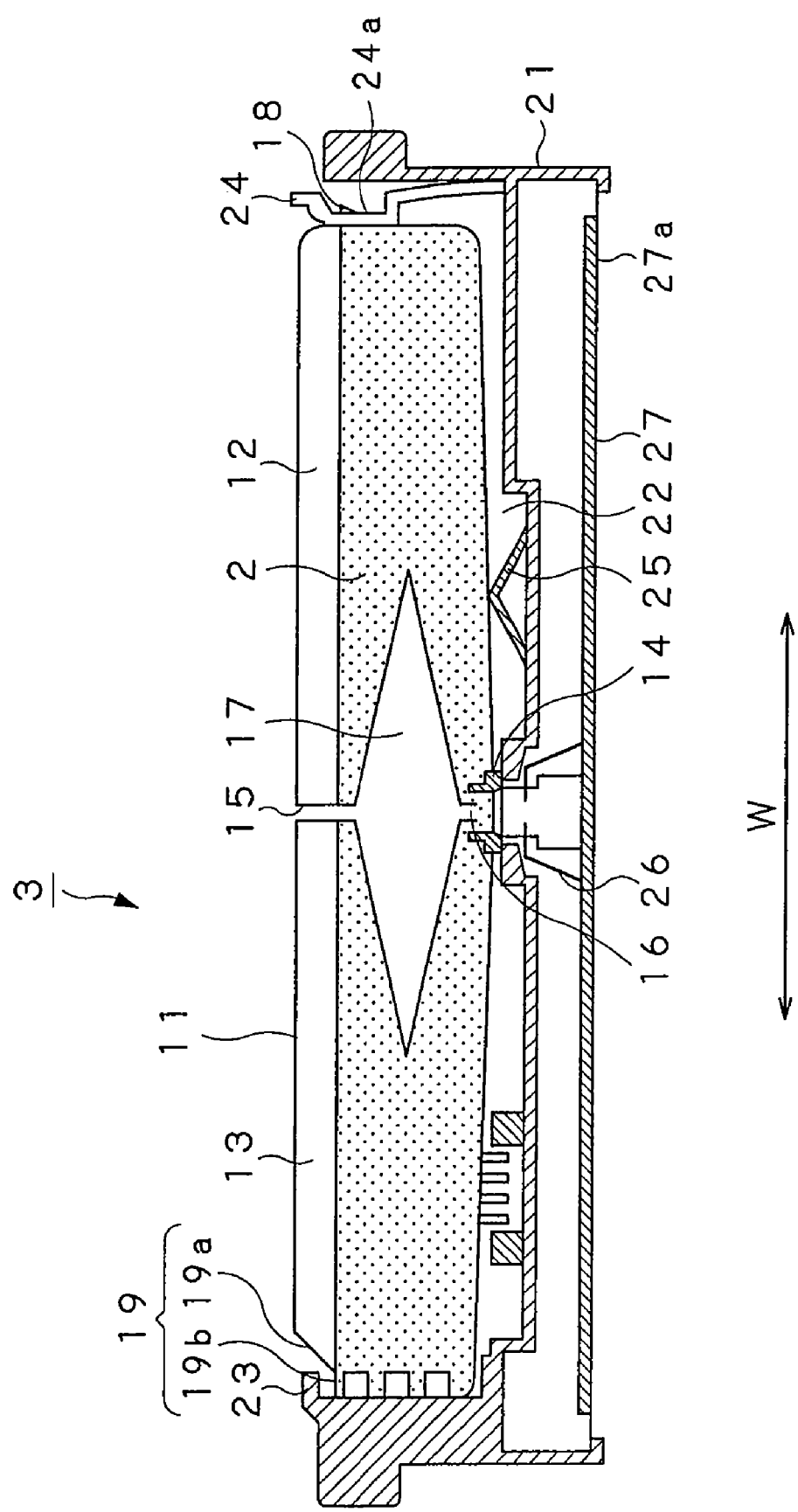
FIG. 3 is a cross-sectional view showing the ink jet print head cartridge.

Referring to FIGS. 2 and 3, this printer device 1 includes an ink jet print head cartridge 3, referred to below as a head cartridge 3, for emitting an ink 2, as a recording liquid for recording an image or letters/characters, to the recording sheet P, and a main body unit of the printer 4 on which to load the head cartridge 3. With the printer device 1, the head cartridge 3 may be mounted to or dismounted from the main body unit of the printer 4. On the head cartridge 3, there are detachably mounted ink cartridges 11$y$, 11$m$, 11$c$ and 11$k$, operating as ink supply sources and as liquid cartridges for holding the ink therein. With the printer device 1, the ink cartridge 11$y$ for yellow, ink cartridge 11$m$ for magenta, ink cartridge 11$c$ for cyan, and the ink cartridge 11$k$ for black, are usable. The head cartridge 3, detachably mounted to the main body unit of the printer 4, and the ink cartridges 11$y$, 11$m$, 11$c$ and 11$k$, detachably mounted to the head cartridge 3, may be exchanged as consumables.

With the above-described printer device 1, a tray 55$a$, in which the recording sheets P are held in a stacked state, is loaded on a tray loading unit 5 provided on the front bottom side of the main body unit of the printer 4, in order to permit the recording sheets P, held in the tray 55$a$, to be supplied to inside the main body unit of the printer 4. When the tray 55$a$ is loaded on the tray loading unit 5 on the front side of the main body unit of the printer 4, the recording sheet P is supplied by a sheet delivery/discharge mechanism 54 from a sheet delivery opening 55 to the back surface side of the main body unit of the printer 4. The recording sheet P, supplied to the back surface side of the main body unit of the printer 4, has its traveling direction reversed by a reversing roll 83 and supplied on an upper side of the forward path from the back side towards the forward side of the main body unit of the printer 4. Before the recording sheet P, supplied from the back side toward the front side of the main body unit of the printer 4, is discharged from a sheet exit opening 56, provided to the front side of the main body unit of the printer 4, printing data, corresponding to letter/character data or image data, entered from an information processing device 69, such as a personal computer, are printed on the sheet as letters/characters or images.

The ink 2, as a recording liquid in printing, is a liquid mixture composed of water-soluble dyes, as dyestuffs, colorants, such as various pigments, solvents for dispersing the colorants, and surfactants, including organic compounds represented by the following chemical formula 1:

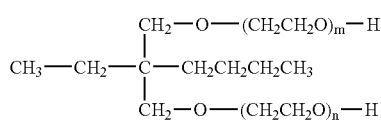

(1)

where m and n are integers not less than 1.

As the colorants, direct dyes, acid dyes, basic dyes, reactive dyes, food dyes, dispersible dyes, vat dyes or soluble vat dyes, shown below, may be used. Specifically, the yellow direct dyes may be enumerated by, for example, C.I. Direct Yellow 1, 8, 11, 12, 24, 26, 27, 28, 33, 39, 44, 50, 58, 85, 86, 87, 88, 89, 98, 100 and 110, used alone or in combination. The magenta direct dyes may be enumerated by, for example, C.I. Direct Red 1, 2, 4, 9, 11, 13, 17, 20, 23, 24, 28, 31, 33, 37, 39, 44, 46, 62, 63, 75, 79, 80, 81, 83, 84, 89, 95, 99, 113, 197, 201, 218, 220, 224, 225, 226, 227, 228, 229, 230 and 321, used alone or in combination. The cyan direct dyes may be enumerated by, for example, C.I. Direct Blue 1, 2, 6, 8, 15, 22, 25, 41, 71, 76, 77, 78, 80, 86, 90, 98, 106, 108, 120, 158, 160, 163, 165, 168, 192, 193, 194, 195, 196, 199, 200, 201, 202, 203, 207, 225, 226, 236, 237, 246, 248 and 249, used alone or in combination. The black direct dyes may be enumerated by, for example, C.I. Direct 17, 19, 22, 32, 38, 51, 56, 62, 71, 74, 75, 77, 94, 105, 106, 107, 108, 112, 113, 117, 118, 132, 133 and 146, used alone or in combination.

The yellow acid dyes may be enumerated by, for example, C.I. Acid Yellow 1, 3, 7, 11, 17, 19, 23, 25, 29, 36, 38, 40, 42, 44, 49, 59, 61, 70, 72, 75, 76, 78, 79, 98, 99, 110, 111, 112, 114, 116, 118, 119, 127, 128, 131, 135, 141, 142, 161, 162, 163, 164 and 165, used alone or in combination. The magenta acid dyes may be enumerated by, for example, C.I. Acid Red 1, 6, 8, 9, 13, 14, 18, 26, 27, 32, 35, 37, 42, 51, 52, 57, 75, 77, 80, 82, 83, 85, 87, 88, 89, 92, 94, 97, 106, 111, 114, 115, 117, 118, 119, 129, 130, 131, 133, 134, 138, 143, 145, 154, 155, 158, 168, 180, 183, 184, 186, 194, 198, 199, 209, 211, 215, 216, 217, 219, 249, 252, 254, 256, 257, 262, 265, 266, 274, 276, 282, 283, 303, 317, 318, 320, 321 and 322, used alone or in combination. The cyan acid dyes may be enumerated by, for example, C.I. Acid Blue 1, 7, 9, 15, 22, 23, 25, 27, 29, 40, 41, 43, 45, 54, 59, 60, 62, 72, 74, 78, 80, 82, 83, 90, 92, 93, 100, 102, 103, 104, 112, 113, 117, 120, 126, 127, 129, 130, 131, 138, 140, 142, 143, 151, 154, 158, 161, 166, 167, 168, 170, 171, 175, 182, 183, 184, 187, 192, 199, 203, 204, 205, 229, 234 and 236, used alone or in combination. The black acid dyes may be enumerated by, for example, C.I. Acid Black 1, 2, 7, 24, 26, 29, 31, 44, 48, 50, 51, 52, 58, 60, 62, 63, 64, 67, 72, 76, 77, 94, 107, 108, 109, 110, 112, 115, 118, 119, 121, 122, 131, 132, 139, 140, 155, 156, 157, 158, 159 and 191, used alone or in combination.

The yellow basic dyes may be enumerated by, for example, C.I. Basic Black 2.8, C.I. Basic Yellow 1, 2, 11, 12, 14, 21, 32 and 36 and Basic Orange 2, 15, 21 and 22, used alone or in combination. The magenta basic dyes may be enumerated by, for example, C.I. Basic Red 1, 9, 12, 13 and 37, and C.I. Basic Violet 1, 3, 7, 10 and 14, used alone or in combination. The cyan basic dyes may be enumerated by, for example, C.I. Basic Blue 1, 3, 5, 7, 9, 24, 25, 26, 28 and 29, and C.I. Basic Green 1 and 4, used alone or in combination.

The yellow reactive dyes may be enumerated by, for example, C.I. Reactive Yellow 1, 2, 3, 13, 14, 15 and 17, C.I. Reactive Orange 2, 5, 7, 16, 20 and 24, used alone or in combination. The magenta reactive dyes may be enumerated by, for example, C.I. Reactive Red 6, 7, 11, 12, 13, 14, 15, 17, 21, 23, 24, 35, 36, 42, 63, 66 and 84, used alone or in combination. The cyan reactive dyes may be enumerated by, for example, C.I. Reactive Blue 2, 5, 7, 12, 13, 14, 15, 17, 18, 19, 20, 21, 25, 27, 28, 37, 38, 40 and 41, and C.I. Reactive Green 5 and 7, used alone or in combination.

The yellow food dyes may be enumerated by C.I. Food Yellow 3 and 4, used alone or in combination.

The magenta food dyes may be enumerated by C.I. Food Red 7, 9, 14 and 231, used alone or in combination.

The cyan food dyes may be enumerated by C.I. Food Blue 1 and 2, used alone or in combination.

The black food dyes may, for example, be C.I. Food Black 2.

The ink 2 may be added by a pigment, as a colorant, or the pigment may be contained along with the dye. The pigment may be general short amounts of inorganic or organic pigments. The inorganic pigments may, for example, be titanium oxide and iron oxide added by carbon black manufactured by a contact method, a funnel method or a thermal method. The inorganic pigments may also be azo pigments, including azo lake, insoluble azo pigments, condensed azo pigments, and chelate azo pigments, polycyclic pigments, including phthacyanine pigments, perylene pigments, perynone pigments, anthraquinone pigments, quinacridone pigments, dioxadine pigments, thioindigo pigments, isoindolinone pigments or quinophtalone pigments, dye chelates, such as basic dye chelates or acid dye chelates, nitro pigments, nitroso pigments and aniline black.

The pigments used are dispersed in an alkaline solution. As the pigments dispersed in the alkaline solution, there are, for example, color pigments dispersed by dispersants in an alkaline solution, and color pigments provided with functional groups and dispersed in an alkaline solution.

As for the color pigments, the yellow pigments may be enumerated by C.I. Pigment Yellow 1, 2, 3, 4, 5, 6, 7, 8, 9, 10, 11, 12, 13, 14C, 15, 16, 17, 24, 34, 35, 37, 42, 53, 55, 65, 73, 74, 75, 81, 81, 83, 93, 95, 97, 100, 101, 104, 108, 109, 110, 114, 117, 120, 128, 129, 138, 150, 151, 153, 154 and 180, used alone or in combination.

The red pigments may be enumerated by C.I. Pigment Red 1, 2, 3, 4, 5, 6, 7, 8, 9, 10, 11, 12, 13, 14, 15, 16, 17, 28, 19, 21, 22, 23, 30, 31, 32, 37, 38, 39, 40, 48 (Ca), 48 (Mn), 48:2, 48:2, 48:4, 49, 49:1, 50, 51, 52, 52:2, 53:1, 53, 55, 57 (Ca), 57:1, 60, 60:1, 63:1, 63:2, 64, 64:1, 81, 83, 87, 88, 89, 90, 101 (iron oxide), 104, 105, 106, 108 (Cadmium Red), 112, 114, 122 (Quinacridone Black 3), 123, 146, 149, 163, 166, 168, 170, 172, 177, 178, 179, 184, 185, 190, 193, 202, 209 and 219, used alone or in combination.

The blue pigments may be enumerated by C.I. Pigment Blue 1, 2, 3, 15, 15:1, 15:2, 15:3, 15:34, 16, 17:1, 22, 25, 56 and 60 and C.I. Vat blue 4, 60 and 63, used alone or in combination.

The orange pigments may be enumerated by C.I. Pigment Orange 5, 13, 16, 17, 36, 43 and 51, used alone or in combination.

The purple pigments may be enumerated by C.I. Pigment Violet 1 (Rhodamine Lake), 3, 5:1, 16, 19 (Quinacridone Red), 2, 3 and 38, used alone or in combination.

The black pigments may be enumerated by carbon black and C.I. Pigment Black 1.

As the alkaline solution, an aqueous solution of sodium hydroxide, potassium hydroxide, lithium hydroxide, sodium carbonate, sodium hydrogen carbonate, ammoniac water, triethanolamine, diethanolamine, triethylamine, or aminomethyl propanol, may be used.

The dispersant may be enumerated by, for example, styrene-acrylic acid resin, styrene-acrylic acid-acrylic acid ester resin, a styrene maleic acid resin, styrene-maleic acid half-ester resin, acryl-acrylic acid ester resin, isobutylene-maleic acid resin, and rosin-modified maleic acid resin.

As a solvent for dispersing the above dyes, water is used because it satisfies characteristics, such as low viscosity, ease in handling, low cost and freeness from odor. As the solvent for the ink 2, ion exchanged water, for example, may be used for preventing unneeded ions from becoming mixed in the ink 2.

In the ink 2, water-soluble organic solvents, such as aliphatic monohydric alcohols, aliphatic polyhydric alcohols, or derivatives of the aliphatic polyhydric alcohols, are contained as solvents, in addition to the solvent water or ion exchanged water.

Specifically, the aliphatic monohydric alcohols may be enumerated by, for example, lower alcohols, such as methyl alcohol, ethyl alcohol, n-propyl alcohol, i-propyl alcohol, n-butyl alcohol, s-butyl alcohol or t-butyl alcohol, which may be used alone or in combination. If the aliphatic monohydric alcohols are used as a solvent, the surface tension of the ink 2 may be set to a proper value so that the ink 2 may be obtained which is superior in its permeability to the recording sheet P, dot forming properties and drying properties of the printed image. By employing ethyl alcohol, i-butyl alcohol or n-butyl alcohol in this case as the solvent for the ink 2, it is possible to obtain the ink 2 having superior properties described above.

The aliphatic polyhydric alcohols may be enumerated by, for example, alkylene glycols, such as ethylene glycol, diethylene glycol, triethylene glycol, propylene glycol, butylene glycol or glycerol, polyalkylene glycols, such as polyethylene glycol or polypropyleneglycol, and thiodiglycol, which may be used alone or in combination. The derivatives of aliphatic polyhydric alcohols may be enumerated by, for example, lower alkyl ethers of the aliphatic polyhydric alcohols, such as ethylene glycol dimethylether, and lower carbonic acid esters of the aliphatic polyhydric alcohols, such as ethylene glycol diacetates. With the use of the above-enumerated aliphatic polyhydric alcohols and derivatives thereof, as the solvent for the ink 2, the ink 2 may be rendered less susceptible to drying, while the freezing point of the ink 2 may be lowered, with the result that the ink 2 on prolonged storage is rendered less susceptible to changes in physical properties and the nozzle 44a is less susceptible to clogging with the dried ink 44a.

Thus, by employing one or more of aliphatic monohydric alcohols, aliphatic polyhydric alcohols and derivatives of aliphatic polyhydric alcohols, having specific properties, in combination, in addition to water, as a solvent for dispersing e.g. dyestuffs, it is possible to obtain the ink suited to the objective or application.

The ink 2 may also be added by amides, such as dimethylformamide or dimethylacetoamide, ketones, such as acetone or diacetone alcohols, keto-alcohols, trivalent alcohols, such as tetrahydrofuran, dioxane, γ-butyrolactone, glycerin, 1.2.6-hexanetriols, and nitrogen-containing heterocyclic compounds, in combination, in addition to the aliphatic monohydric alcohols, aliphatic polyhydric alcohols and derivatives thereof. By so doing, it is possible to improve the aforementioned various characteristics.

A surfactant, at least including the organic compound, represented by the following chemical formula 1:

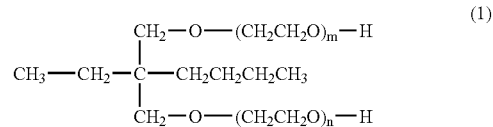

where m and n denote integers not less than unity, is contained, in addition to the aforementioned dyestuffs and solvents, in the ink 2.

The organic compounds, indicated by the above chemical formula 1, that is, ethylene oxide (EO) adducts of 3-ethyl-3-hydroxymethyl-heptanol, are non-ionic surfactants that may be manufactured industrially more inexpensively than e.g. acetylene glycols. In addition, the above organic compounds exhibit lower foaming properties and superior defoaming properties when mixed into the ink 2 as a surfactant.

In the chemical formula 1, m and n, that is, the added amount of EO, are integers not less than unity. If any of m or n is zero, the effect of the present invention cannot be achieved. The sum of m and n, that is, the total amount of addition of EO, is not larger than 30, preferably 2 to 10, and more preferably 4 to 8. The total amount of EO addition exceeding 30 is not desirable since the surface tension is then less liable to be lowered.

In addition to the surfactants containing the organic compounds shown in the above chemical formula 1, surfactants obtained on mixing one or more of ethers, such as polyoxyethylene alkyl ethers or polyoxyethylene alkylphenyl ethers, esters, such as polyoxyethyelen fatty acid esters, polyoxyethylene polyoxypropylene copolymers, polyoxyethylene alkylamine ethers, or nitrogen-containing compounds, such as fatty acid diethenol amides, to polyoxyethylene acetylene glycols, may also be used.

With the ink 2 obtained on mixing the above materials, in which the non-ionic surfactants, containing the organic compounds, represented by the chemical formula 1, in place of the conventional surfactants composed of acetylene glycols, it is possible to suppress foaming as well as to improve the wetting performance for the recording sheet P. That is, the ink is permeated quickly along the thickness of the recording sheet P and presents a dried state. Hence, the image or letter/character data, obtained on deposition to the recording sheet P, may be printed to a high image quality state free of bleeding or blurring.

Moreover, with the present ink 2, employing the non-ionic surfactant, containing the organic compound shown by the chemical formula 1, the ink fixation properties are improved even in case fibers are exposed on the major surface of the recording sheet P. That is, the ink is improved in fixation properties on a common paper sheet subjected to sizing, in particular the copy paper, report paper, bond paper or a sheet for a series of slip paper sheets divided by perforations. This improves the quality of printed letters/characters, or so-called letter/character printing quality (reduced edge bleeding or edge sharpness).

Additionally, with the present ink 2, employing the non-ionic surfactant containing the organic compound of the chemical formula 1, an ink liquid droplet I may be emitted even in case a pair of resistance heaters 42a, 42b, explained later, are actuated with the pulse current having a frequency of 1 kHz, with the result that a recording liquid may be provided which is also superior in ink emitting performance even on speedy printing.

With the ink 2, in which the cloud point of the non-ionic surfactant, containing the organic compound, indicated by the chemical formula 1, is high and is on the order of 89° C., the cloud point of the surfactant is not exceeded when the ink is emitted as liquid droplet, as conventionally, such that the ink may be deposited on the recording sheet P in a state of stable liquid properties without undergoing changes in performance.

In the ink 2, the content of the surfactant containing the organic compound shown in the chemical formula 1 is in a range from not less than 0.05 wt % to not larger than 10 wt %, more preferably, in a range from not less than 0.1 wt % to not larger than 5 wt %, based on the total weight of the ink 2. If the content of the surfactant containing the organic compound shown in the chemical formula 1, based on the total quantity of the ink 2, is less than 0.05 wt %, the ink becomes inferior in wettability for the recording sheet P. On the other hand, if the content of the surfactant containing the organic compound shown in the chemical formula 1, based on the total quantity of the ink 2, is larger than 10 wt %, the ink may be subjected to foaming. It is therefore critical for the content of the surfactant containing the organic compound shown in the chemical formula 1 to be not less than 0.05 wt % and to be not larger than 10 wt % for the total weight of the ink 2 in order to obtain the ink 2 free from foaming and which may seep into the recording paper sheet P adequately.

In addition to the dye, solvent and the surfactant, referred to hereinabove, viscosity adjustment agents, surface tension adjustment agents, pH adjustment agents, antiseptics, rust-proofing agents or mold-proofing agents may be added to the ink 2. Specifically, the viscosity adjustment agents, surface tension adjustment agents and the pH adjustment agents may be enumerated by proteins, such as gelatin or casein, natural rubbers, such as gum Arabic, cellulose derivatives, such as methyl cellulose, carboxymethyl cellulose or hydroxymethyl cellulose, natural high polymeric materials, such as lignin sulfonates or shellacs, polyacrylates, styrene-acrylic acid copolymers, polyvinyl alcohol, and polyvinyl pyrrolidone. One or more of these may be added, if so desired. The antiseptics, antiseptics, rust-proofing agents and the mold-proofing agents may be enumerated by, for example, benzoic acid, dichlorophene, hexachlorophene, sorbic acid, p-hydroxy benzoate and ethylenediamine tetraacetate (EDTA). One or more of these may be added if so desired.

The ink 2 of the above composition may be prepared as follows: In preparing a solution type ink 2, employing e.g. the dye as a colorant, the colorant agent, formed of the above dyestuff, solvent and the surfactant, are mixed together, heated to 40 to 80° C. and, in this state, are agitated and dispersed together. In the case of the dispersion ink 2, employing e.g. the pigment as the colorant, the ink may be prepared by dispersing the pigment and the surfactant in a solvent, using a fine pigment dispersing method, used up to now, for example, a ball mill, a sand mill, an attriter, a roll mill, an agitator, a Henschell mixer, a colloid mill, an ultrasonic homogenizer, a pearl mill or a wet jet mill. The ink 2, thus prepared, is processed at least once by pressure filtration, employing a filter, and/or by a filtration under a reduced pressure, or at least once by centrifugal separation, employing a centrifugal separator, for removing impurities, coarse particles, or cuttings.

The ink 2 is prepared in this manner so that the surface tension of the ink 2 at 25° C. will be 30 to 60 mN/m, more preferably 30 to 40 mN/m, in order for the ink to cope with high speed printing, more specifically, in order that paired resistance heaters 42a, 42b, as later explained, will be driven with the pulse current with the frequency not less than 1 kHz, preferably not less than 3 kHz and more preferably not less than 5 kHz. The ink 2 is prepared so that it is of a low viscosity value, with its viscosity being preferably not higher than 15 mPa·s, more preferably not higher than 5 mPa·s.

Referring to FIGS. 2 and 3, the ink 2 prepared as described above, and presenting the yellowish color, is held in an ink cartridge 11y. The ink 2 presenting the yellowish color, is held in an ink cartridge 11m, the ink 2 presenting the cyan color, is held in an ink cartridge 11c and the ink 2 presenting the black color is held in an ink cartridge 11k.

Referring to the drawings, a head cartridge 3, that may be mounted to and dismounted from the main body unit of the printer 4, forming the above-described printer 1, and the ink cartridges 11y, 11m, 11c and 11k, that may be mounted to and dismounted from the head cartridge 3, are hereinafter explained.

In FIG. 1, the head cartridge 3, carrying out the printing on the recording sheet P, is loaded from an upper surface of the main body unit of the printer 4, that is, from the direction indicated by an arrow A in FIG. 1, and carries out printing as it emits the ink 2 to the recording sheet P traveling via recording sheet delivery/discharging mechanism 54.

The head cartridge 3 comminutes the ink 2 by the pressure generated by a pressure generating means, employing e.g. an electro-thermal or electromechanical transducer and emits the so comminuted ink to spray the ink 2 in the form of liquid droplets on the major surface of a support, such as the recording sheet P. Referring to FIGS. 2 and 3, the head cartridge 3 includes a main body unit of the cartridge 21, and ink cartridges 11y, 11m, 11c and 11k, as vessels charged with the ink 2, are loaded on this main body unit of the cartridge 21. The ink cartridges 11y, 11m, 11c and 11k are sometimes referred to herein as ink cartridge 11.

The ink cartridge 11, that may be mounted to or dismounted from the head cartridge 3, includes a cartridge vessel 12, produced by injection molding a resin material, such as polypropylene exhibiting strength and resistance against inks. The cartridge vessel 12 is of a substantially rectangular shape and of approximately the same longitudinal size as the width-wise size of the recording sheet P, for maximizing the capacity of the ink stored therein.

Specifically, the cartridge vessel 12, forming the ink cartridge 11, is provided with an ink reservoir 13, in which to store the ink 2, an ink supplying unit 14 for supplying the ink 2 from the ink reservoir 13 to the main body unit of the cartridge 21 of the head cartridge 3, an external communication opening 15 for taking air from outside into the ink reservoir 13, an air inlet 16 for introducing air taken in by the external communication opening 15 into the ink reservoir 13, a storage unit 17 for transiently storing the ink 2 between the external communication opening 15 and the air inlet opening 16, a retention projection 18 and an engagement step 19, both adapted for retaining the ink cartridge 11 by the main body unit of the cartridge 21.

The ink reservoir 13 forms spacing for holding the ink 2 therein by high air tightness. The ink reservoir 13 is substantially rectangular in shape and is substantially of the same longitudinal size as the size along the width of the recording sheet P used, that is, the width-wise size W of the recording sheet P shown in FIG. 3.

The ink supplying unit 14 is provided at a mid portion of the lower side of the ink reservoir 13, and is in the form of a nozzle protruded into communication with the ink reservoir 13. The distal end of the nozzle is fitted to a connecting part 26 of the head cartridge 3 as later explained for connecting the cartridge vessel 12 of the ink cartridge 2 to the main body unit of the cartridge 21 of the head cartridge 3.

Figure 4A:
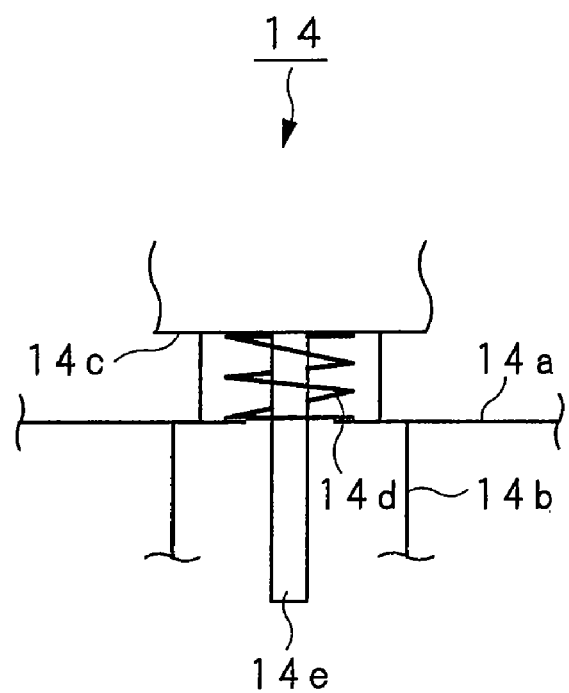
FIGS. 4A and 4B show an ink supply unit when an ink cartridge is loaded in position in the ink jet print head cartridge, where
Figure 4B:
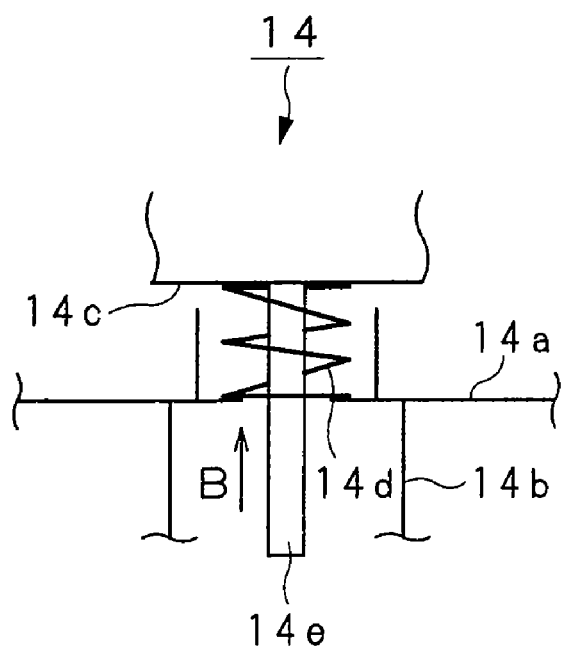

Referring to FIGS. 4A and 4B, the ink supplying unit 14 includes a supply port 14b for supplying the ink 2 to a bottom surface 14a of the ink cartridge 11. This bottom surface 14a is provided with a valve 14c for opening/closing the supply port 14b, a coil spring 14d for biasing the valve 14c in the direction of closing the supply port 14b, and an opening/closing pin 14e for opening/closing the valve 14c. The supply port 14b, connected to the connecting part 26 of the head cartridge 3, is biased in a direction of closure by the valve 14c, and is closed, under the force of bias of the coil spring 14d, in a pre-stage in which the ink cartridge 11 is yet to be loaded on the main body unit of the cartridge 21, as shown in FIG. 4A. When the ink cartridge 11 is loaded on the main body unit of the cartridge 21, the opening/closing pin 14e is hoisted by an upper part of the connecting part 26 of the main body unit of the cartridge 21, forming the head cartridge 3, in an opposite direction to the biasing direction of the coil spring 14d, as shown in FIG. 4B. The opening/closing pin 14e, thus hoisted, uplifts the valve 14c, against the bias of the coil spring 14d, to open the supply port 14b. In this manner, the ink supplying unit 14 of the ink cartridge 11 is connected to the connecting part 26 of the head cartridge 3 for establishing communication between the ink supply unit 13 and an ink reservoir 31 to enable the ink 2 to be supplied to the ink reservoir 31.

When the ink cartridge 11 is extracted from the connecting part 26 provided on the side of the head cartridge 3, that is, when the ink cartridge 11 is dismounted from the loading unit 22 of the head cartridge 3, the thrust state of the valve 14c by the opening/closing pin 14e is canceled, with the valve 14c being moved along the biasing direction of the coil spring 14d to close the supply port 14b. In this manner, it is possible to prevent the ink 2 from leaking from the inside of the ink reservoir 13 even if the distal end of the ink supplying unit 14 is directed downwards directly before loading the ink cartridge 11 on the main body unit of the cartridge 21. On the other hand, when the ink cartridge 11 is extracted from the main body unit of the cartridge 21, the valve 14c immediately closes the supply port 14b, and hence the ink may be prevented from leaking out from the distal end of the ink supplying unit 14.

The external communication opening 15 is a communication port for taking air from outside the ink cartridge 11 into the ink reservoir 13, as shown in FIG. 3. The external communication opening is formed in the upper surface, herein at a mid part of the upper surface, of the cartridge vessel 12, at such a position that the opening 15 is able to face outwards at the time of mounting of the head cartridge 3 to the loading unit 22, so that the opening faces outwards to take in outside air even on loading on the loading unit 22 of the head cartridge 3. The external communication opening 15 takes air into the ink cartridge 11 in an amount corresponding to the decrease in the ink quantity in the ink reservoir 13 caused when the ink cartridge 11 is loaded in the main body unit of the cartridge 21 and consequently the ink 2 has flown down towards the main body unit of the cartridge 21.

The air inlet opening 16 provides for communication of the ink reservoir 13 with the external communication opening 15 to introduce air taken via external communication opening 15 into the ink reservoir 13. In this manner, air may be introduced by the air inlet opening 16 into the ink reservoir 13 even if, when the ink 2 is supplied to the main body unit of the cartridge 21 of the head cartridge 3, on loading the ink cartridge 11 on the main body unit of the cartridge 21, thus decreasing the ink 2 in the ink reservoir 13 to produce the depressurized state in the inner space of the ink reservoir, with the result that the inner pressure may be maintained in the balanced state to enable the ink 2 to be introduced into the main body unit of the cartridge 21.

The storage unit 17 is provided between the external communication opening 15 and the air inlet opening 16 for transient storage of the ink 2 in case the ink 2 flows out abruptly to outside in case of leakage of the ink 2 via air inlet opening 16 communicating to the ink reservoir 13. The storage unit 17 is formed to substantially the lozenge shape, with a longer diagonal line of the lozenge extending along the longitudinal direction of the ink reservoir 13. The air inlet opening 16 is provided at an apex of the lozenge at the lowermost part of the ink reservoir 13, that is, on the lower side of the shorter diagonal line, in order to return the ink 2, introduced from the ink reservoir 13, back into the ink reservoir 13. The storage unit 17 is also provided at an uppermost apex of the shorter diagonal line so that the ink 2 introduced via the ink reservoir 13 is less susceptible to leakage via the ink reservoir 13.

The retention projection 18 is formed on one lateral surface of the short side of the ink cartridge 11 and is engaged in an engagement opening 24a of a latch lever 24 of the main body unit of the cartridge 21 of the head cartridge 3. This retention projection 18 has its upper surface formed as a planar surface substantially perpendicular to the lateral surface of the ink reservoir 13, while having its lower surface inclined from the lateral surface towards the upper surface. The engagement step 19 is provided to an upper part of the lateral surface of the ink cartridge 11 where there is formed the retention projection 18 of the ink cartridge 11. The engagement step 19 is made up of an inclined surface 19a and a planar surface 19b contiguous to the opposite side and the opposite lateral surface of the inclined surface 19a and substantially planar to the upper surface. Since the ink cartridge 11 is provided with the engagement step 19, the height of the lateral surface thereof having the planar surface 19b is lower stepwise from the upper surface of the ink cartridge 2, with this stepped part engaging with the engagement piece 23 of the main body unit of the cartridge 21. The engagement step 19 is provided on the lateral surface on the inserting end when the head cartridge 3 is introduced to the loading unit 22. The engagement step 19 is provided to the lateral side of the inserting end, when the head cartridge 3 is engaged by the engagement piece 23 so as to serve as a pivot for rotation in mounting the ink cartridge 11 to a loading unit 22.

The above-described ink cartridge 11 includes a residual quantity detection unit for detecting the residual quantity of the ink 2 in the ink reservoir 13 and a discriminating unit for discriminating the ink cartridges 11y, 11m, 11c and 11y, in addition to the above components.

The head cartridge 3, loaded with the ink cartridges 11y, 11m, 11c and 11y, holding the yellow, magenta, cyan and black inks 2, constructed as described above, are hereinafter explained.

Referring to FIGS. 2 and 3, the head cartridge 3 is made up by the ink cartridge 11 and the main body unit of the cartridge 21. The main body unit of the cartridge 21 includes loading units 22y, 22m, 22c, 22k, loaded with the ink cartridge 11, the engagement piece 23 and the latch lever 24 for securing the ink cartridge 11, a biasing member 25 for biasing the ink cartridge 11 in the takeout direction, a connecting part 26 connected to the ink supplying unit 14 for being supplied with the ink 2, a head chip 27 for emitting the ink 2 and a head cap 28 for protecting the head chip 27. It is noted that in case the loading units 22y, 22m, 22c, 22k are referred to in their entirety, they are simply referred to as a loading unit 22.

The loading unit 22, loaded with the ink cartridge 11, has its upper surface recessed as an insertion/ejection opening for the ink cartridge 11, in order to permit the loading of the ink cartridge 11. In the present embodiment, four ink cartridges 11 are housed side-by-side in a direction substantially perpendicular to the width-wise direction of the recording sheet P, that is, in a traveling direction of the recording sheet P. Since the ink cartridge 11 is housed in the loading unit 22, the loading unit is provided lengthwise along the printing width, as is the ink cartridge 11. The ink cartridge 11 is housed and loaded in the main body unit of the cartridge 21.

The loading unit 22 is a unit loaded with the ink cartridge 11, as shown in FIG. 2. The parts of the loading unit 22, loaded with the ink cartridge 11y for yellow, the ink cartridge 11m for magenta, the ink cartridge 11c for cyan and the ink cartridge 11k for black, are loading unit parts 22y, 22m, 22c and 22k, respectively. The loading units 22y, 22m, 22c and 22k are separated from one another by partitions 22a. Meanwhile, since the ink cartridge 11k for black is used in a large quantity, it is of a thicker thickness in order to increase the contents of the ink 2. For this reason, the loading unit 22k is wider in width than the remaining loading units 22y, 22m, 22c, in keeping with the thickness of the ink cartridge 11k.

The opening end of the loading unit 22, loaded with the ink cartridge 11, is provided with the engagement piece 23, as shown in FIG. 3. This engagement piece 23 is provided at a longitudinal lateral edge of the loading unit 22, and is engaged with the engagement step 19 of the ink cartridge 11. The ink cartridge 11 is obliquely introduced into the loading unit 22, with the position of engagement of the engagement step 19 of the ink cartridge 11 as an inserting end, and is loaded on the loading unit 22 so that, with the site of engagement of the engagement step 19 with the engagement piece 23 as the pivot of rotation, the part of the ink cartridge 11 not provided with the engagement step 19 will be rotated towards the loading unit 22. This allows the ink cartridge 11 to be loaded readily on the loading unit 22.

The latch lever 24 is formed by warping a spring plate, and is provided on the lateral surface of the loading unit 22 opposite to the engagement piece 23, that is, on the lateral surface of the opposite end of the loading unit 22. The latch lever 24 has its proximal end formed as one with a bottom side part of the lateral surface at the opposite end along the longitudinal direction forming the loading unit 22, while having its distal end formed for elastically flexing in a direction towards and away from this lateral surface. The distal end of the latch lever is formed with an engagement opening 24a. The latch lever 24 is elastically deformed at the same time as the ink cartridge 11 is loaded on the loading unit 22, with the engagement opening 24a being engaged by the retention projection 18 of the ink cartridge 11 to prevent the ink cartridge 11 loaded on the loading unit 22 from being detached from the loading unit 22.

The biasing member 25 is formed by bending a spring plate, biasing the ink cartridge 11 in the disengaging direction, on the bottom surface on the lateral surface side associated with the engagement step 19 of the ink cartridge 11. The biasing member 25 is an ejector having a top formed by bending and is elastically deformed in a direction towards and away from the bottom surface to thrust the bottom surface of the ink cartridge 11 loaded on the loading unit 22 to bias the ink cartridge 11 loaded on the loading unit 22 in a direction of being dismounted from the loading unit 22. When the retention projection 18 is disengaged from the engagement opening 24a of the latch lever 24, the biasing member 25 ejects the ink cartridge 11 from the loading unit 22.

At a mid portion along the longitudinal direction of the loading units 22y, 22m, 22c, 22k, there are mounted connecting parts 26, to which are connected ink supply units 14 of the ink cartridges 11y, 11m, 11c and 11k when the ink cartridges 11y, 11m, 11c and 11k have been mounted on the loading units 22y, 22m, 22c, 22k, respectively. The connecting parts 26 operate as ink supply ducts for supplying the ink 2 from the ink supply units 14 of the ink cartridge 11 loaded on the loading unit 22 to the head chip 27 provided on the bottom surface of the main body unit of the cartridge 21 for supplying the ink 2.

Referring specifically to FIG. 5, the connecting part 26 includes an ink reservoir 31 for storing the ink 2 supplied from the ink cartridge 11, a sealing member 32 for sealing the ink supply units 14 connected to the connecting part 26, a filter 33 for removing impurities in the ink 2, and a valving mechanism 34 for opening/closing a supply path towards the head chip 27.

The ink reservoir 31 is a spacing connected to the ink supply units 14 for storing the ink 2 supplied from the ink cartridge 11. The sealing member 32 is a member provided to the top of the ink reservoir 31 and, when the ink supply units 14 are connected to the ink reservoir 31 of the connecting part 26, hermetically seals the spacing between the ink reservoir 31 and the ink supply units 14 to prohibit the ink 2 from leaking to outside. The filter 33 is used for removing contaminants, such as dust and dirt, mixed into the ink 2 during mounting/dismounting the ink cartridge 11. The filter 33 is mounted downstream of the ink reservoir 31.

Figure 6A:
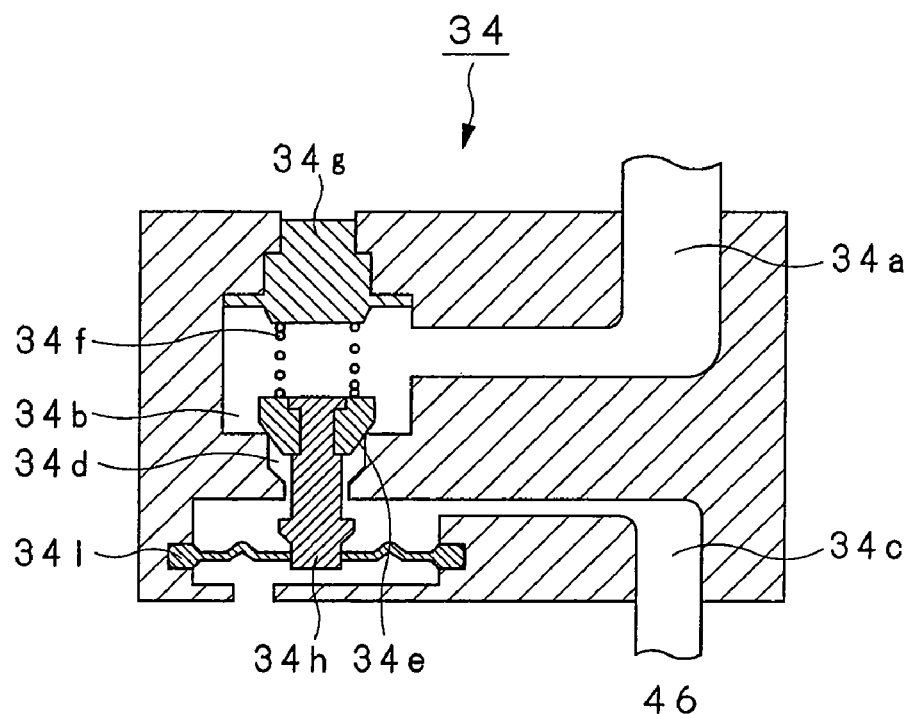
Figure 6B:
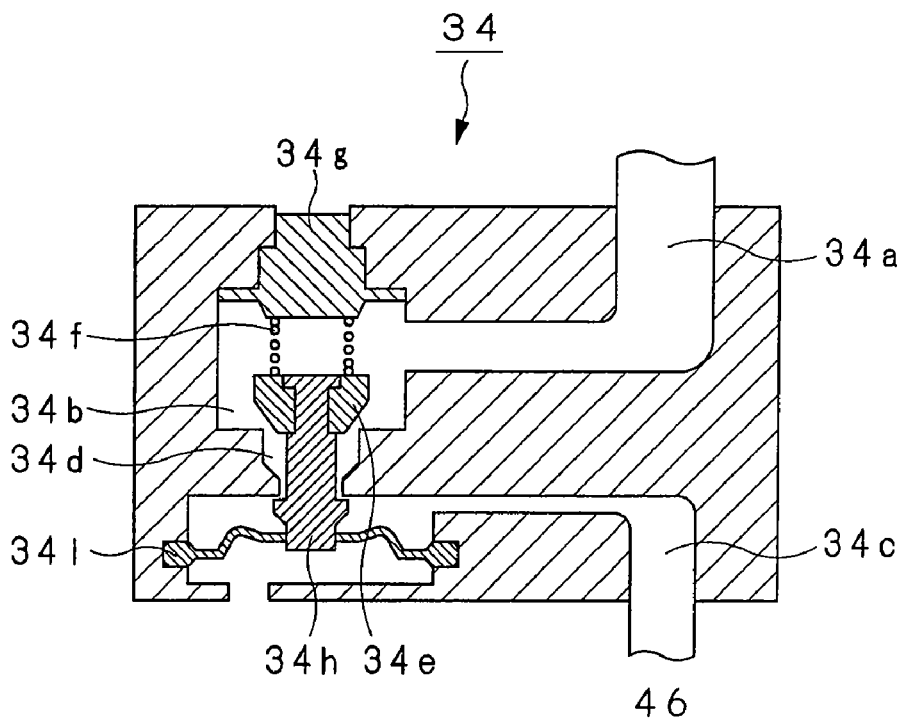

Referring to FIGS. 6A and 6B, the valving mechanism 34 includes an ink inlet 34a, supplied with the ink 2 from the ink reservoir 31, an ink chamber 34b, supplied with the ink 2 flowing from the ink inlet 34a, an ink outlet 34c for discharging the ink 2 from the ink inlet 34a, an opening 34d formed between the side of the ink chamber 34b facing the ink inlet 34a and the side of the ink chamber 34b facing the ink outlet 34c, a valve 34e for opening/closing the opening 34d, a biasing member 34f for biasing the valve 34e in a direction of closing the opening 34d, a negative pressure adjustment screw 34g for adjusting the biasing force of the biasing member 34f, a valve shaft 34h connected to the valve 34e, and a diaphragm 34i connected to the valve shaft 34h.

The ink inlet 34a is a supply duct connecting to the ink reservoir 13 for supplying the ink 2 in the ink reservoir 31 of the ink cartridge 11 to the head chip 27 through the ink reservoir 31. The ink inlet 34a is provided from the bottom side of the ink reservoir 31 up to the ink chamber 34b. The ink chamber 34b is a substantially rectangular spacing combining the ink inlet 34a, ink outlet 34c and the opening 34d, and is supplied with the ink 2 from the ink outlet 34c, while discharging the ink 2 from the ink outlet 34c via opening 34d. The ink outlet 34c is a supply duct supplied with the ink 2 from the ink chamber 34b via opening 34d and which is connected to the head chip 27. The ink outlet 34c is provided for extending from the bottom side of the ink chamber 34b up to the head chip 27.

The valve 34e is a valve closing the opening 34d for separating the side ink inlet 34a from the side ink outlet 34c. The valve 34e is moved under the biasing force of the biasing member 34f, the restoring force of the diaphragm 31l, connected via valve shaft 34h, and under the negative pressure of the ink 2 on the side ink outlet 34c. When disposed at the lower end, the valve 34e closes the opening 34 for separating the side ink inlet 34a from the side ink outlet 34c to interrupt the supply of the ink 2 to the ink outlet 34c. When disposed at an upper end, against the biasing force of the biasing member 34f, the valve 34e does not interrupt the side ink inlet 34a from the side ink outlet 34c to enable the ink 2 to be supplied to the head chip 27. Although there is no limitation to the material of the valve 34e, the valve 34e is formed of, for example, a rubber elastic material, or a so-called elastomer, in order to assure high hermetic closing properties.

The biasing member 34f is e.g. a compression coil spring and interconnects a negative pressure adjustment spring 34g and the valve 34e between the upper surface of the valve 34e and the upper surface of the ink chamber 34b to bias the valve 34e in a direction of closing the opening 34e. The negative pressure adjustment screw 34g is used for adjusting the biasing force of the biasing member 34f, such that, by adjusting this negative pressure adjustment screw 34g, it is possible adjust the biasing force of the biasing member 34f. By so doing, the negative pressure of the ink 2, actuating the valve 34e, responsible for opening/closing the opening 34d, may be adjusted, as will be explained later in detail.

The valve shaft 34h is used for providing for interlinked operation of the valve 34e connected to its one end and the diaphragm 34i connected to its other end. The diaphragm 34i is a thin elastic sheet connected to the other end of the valve shaft 34h. The diaphragm 34i is made up by a major surface on the side ink outlet 34c of the ink chamber 34b and the other major surface contacted with atmospheric air and is elastically flexed towards the atmospheric air and the side ink outlet 34c under the negative pressure of the ink 2.

With the above-described valving mechanism 34, the valve 34e is thrust in a direction of closing the opening 34d of the ink chamber 34b under the bias of the biasing member 34f and that of the diaphragm 34i, as shown in FIG. 6A. When the ink 2 has been ejected from the head chip 27, such that the negative pressure of the ink 2 in the ink chamber 34b on the side ink outlet 34c, separated by the opening 34d, is raised, the diaphragm 34i is uplifted under the negative pressure of the ink 2 to uplift the valve 34e along with the valve shaft 34h against the bias of the biasing member 34f. At this time, the opening 34d between the side ink inlet 34a and the side ink outlet 34c of the ink chamber 34b is opened to supply the ink 2 from the side ink inlet 34a to the side ink outlet 34c. As the negative pressure of the ink 2 is lowered, the diaphragm 34i is restored to its original shape to lower the valve 34e along with the valve shaft 34h, under the bias of the biasing member 34f, such as to close the ink chamber 34b. Thus, with the valving mechanism 34, the above-described process is repeated as the negative pressure of the ink 2 is raised each time the ink 2 is emitted.

Moreover, with the connecting parts 26, the quantity of the ink 2 in the ink reservoir 13 is decreased when the ink 2 in the ink reservoir 13 is supplied to the ink chamber 34b. At this time, the atmospheric air is introduced into the ink cartridge 11 via the air inlet 16. The air intruded into the ink cartridge 11 is sent to an upper portion of the ink cartridge 11. This re-sets the state prior to emission of the ink droplet i from the nozzle 44a and hence a state of equilibrium. In this state of equilibrium, there is scarcely no ink 2 in the air inlet 16.

The head chip 27 is arranged along the bottom surface of the main body unit of the cartridge 21, as shown in FIG. 5. A plural number of nozzles 44a, as ink discharge ports for emitting ink droplets i, supplied from the connecting part 26, are arranged in a line from one color to another, along the width of the recording sheet P, that is, in the direction of an arrow W in FIG. 5.

A head cap 28 is a cover for protecting the head chip 27 and, when the printing operation is carried out, is taken out from the head chip 27, as shown in FIG. 2. The head cap 28 includes a groove 28a, provided along the opening/closing direction, and a cleaning roll 28b, provided along the longitudinal direction for sucking excess ink 2 affixed to an emitting surface 27a of the head chip 27. The head cap 28 is opened/closed along the width-wise direction of the ink cartridge 11, along the groove 28a, during the opening/closing operation. At this time, the cleaning roll 28b is rotated in abutting contact with the emitting surface 27a to suck up the excess ink 2 to clean the emitting surface 27a of the head chip 27. This cleaning roll 28b is formed e.g. of a highly hygroscopic material. The head cap 28 operates for protecting the ink 2 in the head chip 27 from drying in case no printing operation is performed.

The head cartridge 3, described above, has a residual ink quantity detector for detecting the residual ink quantity in the ink cartridge 11, and an ink presence/absence detector for detecting the presence/absence of the ink 2 when the ink supplying unit 14 has been connected to the connecting part 26.

Figure 7:
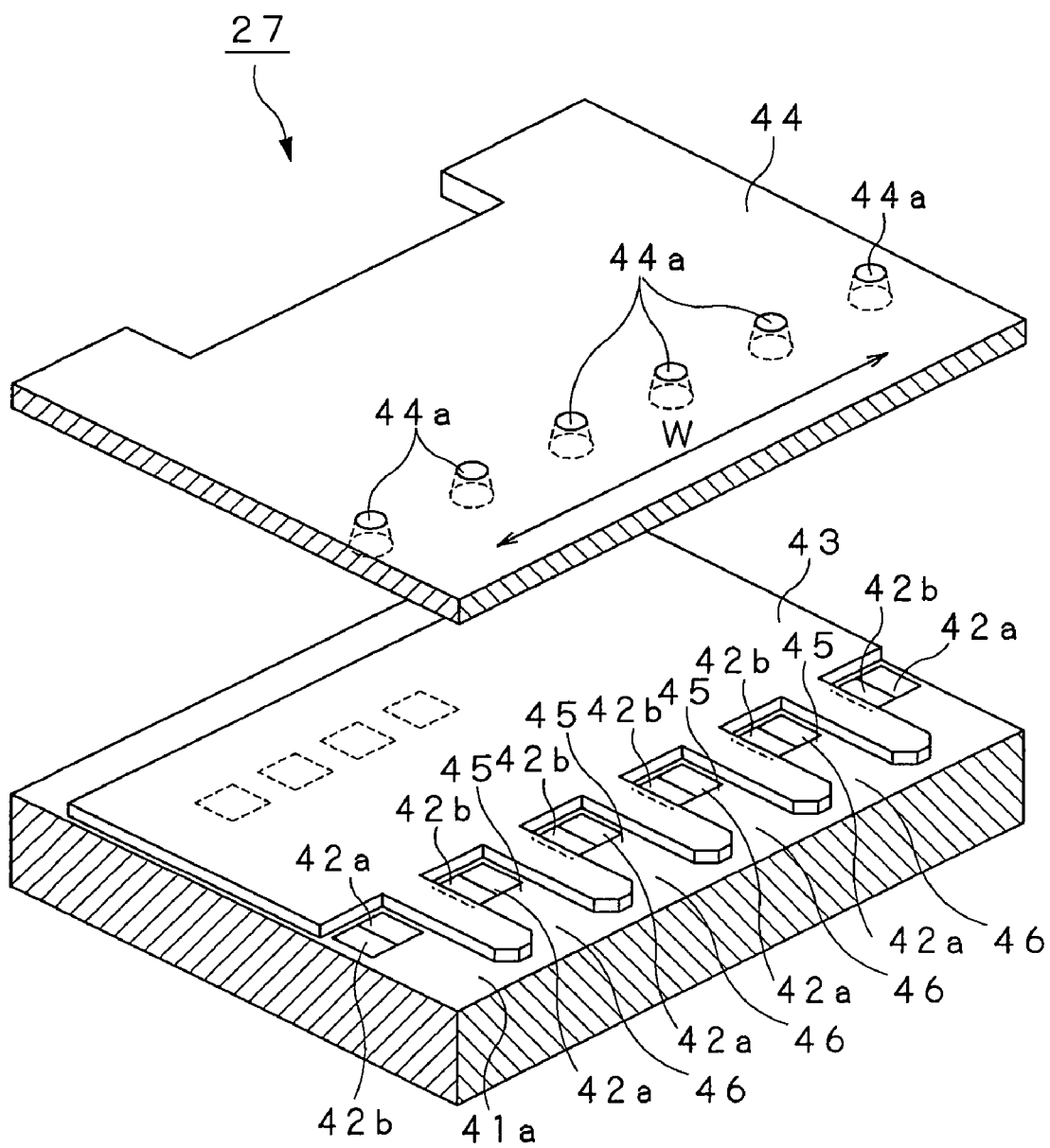
FIG. 7 is an exploded view showing a head chip of the ink jet print head cartridge.
Figure 8:
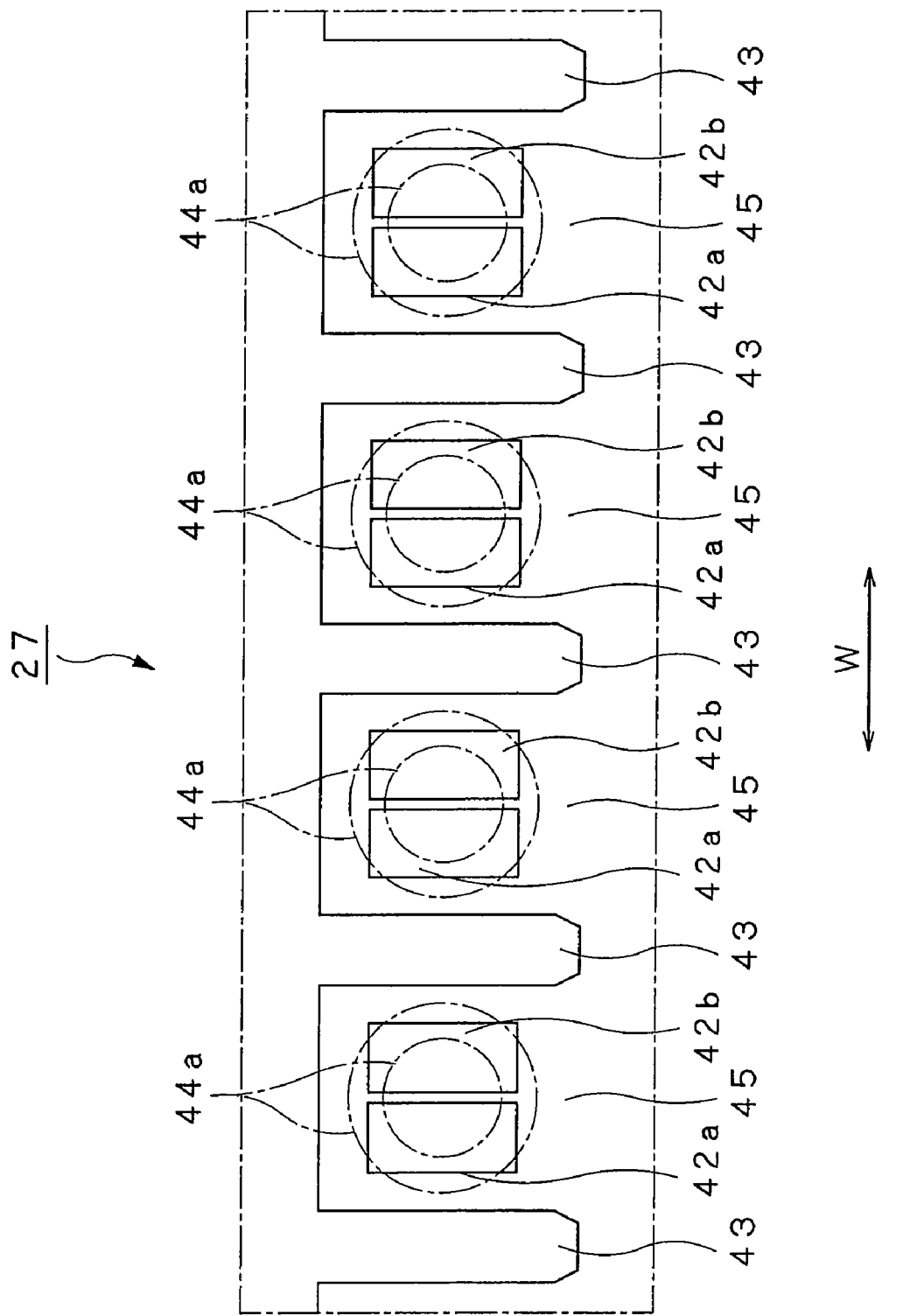
FIG. 8 is a plan view showing the head chip.
Figure 9:
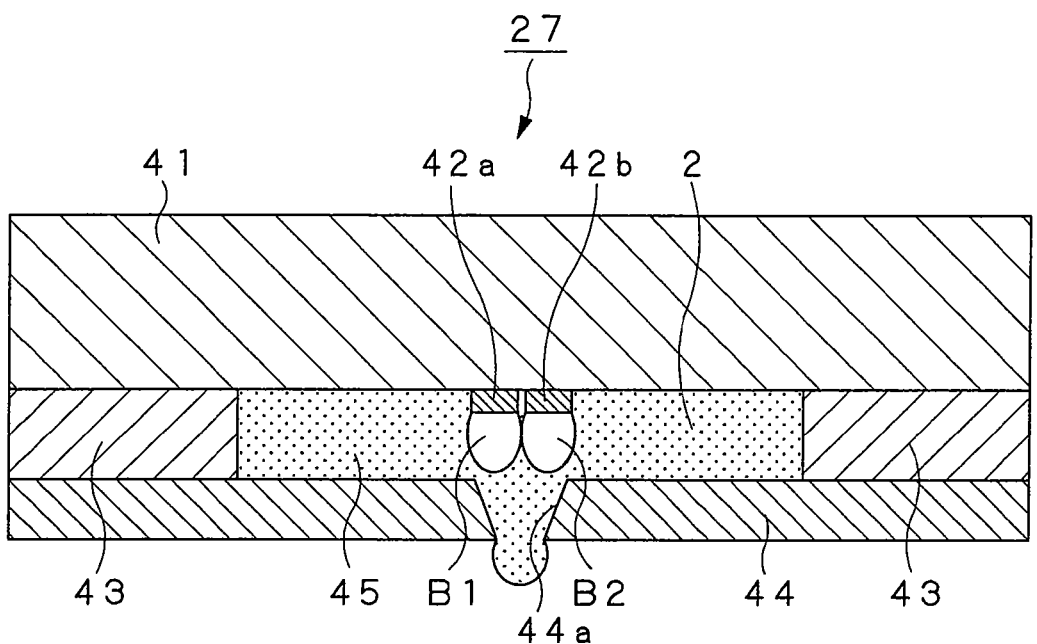
FIG. 9, illustrating the state of the head chip emitting an ink droplet, is a cross-sectional view depicting a state in which air bubbles of ink of approximately the same size have been formed in an ink liquid chamber.

The aforementioned head chip 27 includes, for the ink 2 of each color, a circuit substrate 41, as a base member, a pair of resistance heaters 42a, 42b, arranged side-by-side substantially at right angles with the running direction of the recording sheet P, that is, along the width of the recording sheet P, a film 43 for preventing leakage of the ink 2, a nozzle sheet 44, having a large number of nozzles 44a for emitting the ink 2 as liquid droplets, an ink liquid chamber 45, as a spacing surrounded by these components and which is supplied with the ink 2, and an ink duct 46 for supplying the ink liquid chamber 45 with the ink 2, as shown in FIGS. 7 and 8.

The circuit substrate 41 is a semiconductor substrate of, for example, silicon, having the paired resistance heaters 42a, 42b on its major surface 41a. These paired resistance heaters 42a, 42b are connected to an emission controller 63 on the circuit substrate 41. This emission controller 63, explained later on, is an electrical circuit formed e.g. by a logic IC (integrated circuit) or a driver transistor.

The paired resistance heaters 42a, 42b are heated by the pulse current supplied from the emission controller 63 to heat the ink 2 within the ink liquid chamber 45 to raise the inner pressure. That is, the resistance heaters 42a, 42b are pressure generating devices. The ink 2, heated by these paired resistance heaters 42a, 42b, is emitted in the state of liquid droplets from the nozzle 44a formed in the nozzle sheet 44 as later explained.

The film 43 is affixed as a layer to the major surface 41a of the circuit substrate 41. The film 43 is a dry film resist of the order of, for example, the light exposure curing film resist. The film is layered on substantially the entire surface of the major surface 41a of the circuit substrate 41, and freed of unneeded portions by a photolithographic process so that the film surrounds the resistance heaters 42a, 42b which are in a recessed form. The part of the film 43 surrounding the paired resistance heaters 42a, 42b forms a part of the ink liquid chamber 45.

The nozzle sheet 44 is a sheet-like member, with a thickness on the order of 10 to 15 μm, including nozzles 44a for emitting liquid ink droplets i, and is layered on the surface of the film 43 opposite to the side circuit substrate 41. The nozzle 44a is a micro-sized hole, 15 to 18 μm in diameter, circularly opened in the nozzle sheet 44, and is arranged facing the paired resistance heaters 42a, 42b. This nozzle sheet 44 forms a part of the ink liquid chamber 45.

The ink liquid chamber 45 is a spacing surrounded by the circuit substrate 41, paired resistance heaters 42a, 42b, film 43 and the nozzle sheet 44, and holds therein the ink 2 supplied from the ink duct 46. The ink 2 in the ink liquid chamber 45 is heated by the paired resistance heaters 42a, 42b so that the internal pressure of the ink liquid chamber 45 is raised.

The ink duct 46 is connected to the ink outlet 34c of the connecting part 26 and is supplied with the ink 2 from the ink cartridge 11 connected to the connecting part 26 to form a duct for supplying the ink 2 to each ink liquid chamber 45 communicating with the ink duct 46. That is, the ink duct 46 is in communication with the connecting part 26. Thus, the ink 2, supplied from the ink cartridge 11, flows into the ink duct 46 so as to be charged in the ink liquid chamber 45.

The sole head chip 27 is provided with the paired resistance heaters 42a, 42b for each ink liquid chamber 45. Each color ink cartridge 11 is provided with 100 to 500 ink liquid chambers 45, provided with these paired resistance heaters 42a, 42b. The head chip 27 selects and heats the paired resistance heaters 42a, 42b, under a command from the controller 68 of the printer device 1, to emit the ink 2 in the ink liquid chamber 45, associated with the heated pair of the resistance heaters 42a, 42b, via the nozzle 44a associated with the ink liquid chamber 45.

That is, with the head chip 27, the ink 2, supplied from the ink duct 46, coupled to the head chip 27, is charged into the ink liquid chamber 45. The pulse current is caused to flow through the paired resistance heaters 42a, 42b for a short time, for example, for 1 to 3 μsec, to rapidly heat the paired resistance heaters 42a, 42b, as a result of which the portion of the ink 2 contacted with the paired resistance heaters 42a, 42b is heated to generate an ink bubble of a gaseous phase. With the expansion in volume of the ink bubble, a certain volume of the ink 2 is pressurized (ebullition of the ink 2). Thus, the volume of the ink 2, equal to the volume of the ink 2 thrust by the ink bubble at an area contacted with the nozzle 44a, is emitted from the nozzle 44a and deposited as ink droplet i on the recording sheet P.

With the present head chip 27, the paired resistance heaters 42a, 42b are arranged side-by-side, parallel to each other, in the sole ink liquid chamber 45, as shown in FIG. 8. That is, the paired resistance heaters 42a, 42b are provided in each ink liquid chamber 45. In the head chip 27, a plural number of pairs of the resistance heaters 42a, 42b are arranged substantially parallel to each other in a direction substantially perpendicular to the traveling direction of the recording sheet P, indicated by arrow C in FIG. 8, that is, along the width of the recording sheet P, indicated by arrow W in FIG. 8. It is noted that the nozzle 44a is indicated by a chain-dotted line in FIG. 8.

Hence, the paired resistance heaters 42a, 42b are a sole resistor divided into two portions, with the length being the same and with the width being halved, so that the resistance value of each resistor is approximately doubled. In case the resistors in these paired resistance heaters 42a, 42b are connected in series with one another, the resistors having the resistance values substantially doubled are connected in series with each other, with the result that the resistance value is approximately four times that prior to division.

For ebullition of the ink 2 in the ink liquid chamber 45, it is necessary to apply preset pulse currents to the paired resistance heaters 42a, 42b to heat the resistance heaters 42a, 42b, in order to emit the ink droplet i by the energy generated on ebullition. With the low resistance value, it is necessary to increase the pulse current supplied. However, with the paired resistance heaters 42a, 42b, corresponding to a sole resistor divided into two portions, the resistance value is high, so that the ink may be boiled with the pulse current of the lower value.

Thus, with the head chip 27, the transistors supplied with the pulse current may be reduced in size to save the space.

Meanwhile, the resistance value may be increased further by reducing the thickness of the paired resistance heaters 42a, 42b. However, from the perspective of the material type or the strength (durability) of the material, selected for the paired resistance heaters 42a, 42b, there is placed certain limitation to reduction of the thickness of the paired resistance heaters 42a, 42b. For this reason, the resistance value of the paired resistance heaters 42a, 42b is increased by division, instead of by reducing the thickness, of the resistance heaters.

In emitting the ink within the ink liquid chamber 45 by the nozzle 44a, the ink droplet i is emitted from the nozzle 44a substantially right downwards in case the paired resistance heaters 42a, 42b are driven so that the time until ebullition of the ink by the paired resistance heaters 42a, 42b, that is, the time of generation of the ink bubbles, will be equal to each other. If time difference is produced in the air bubble generating timing by the paired resistance heaters 42a, 42b, it becomes difficult to generate ink bubbles substantially simultaneously by the paired resistance heaters 42a, 42b, such that the ink droplets i are emitted with an offset in one or the other direction with respect to the arraying direction of the paired resistance heaters 42a, 42b.

Figure 10:
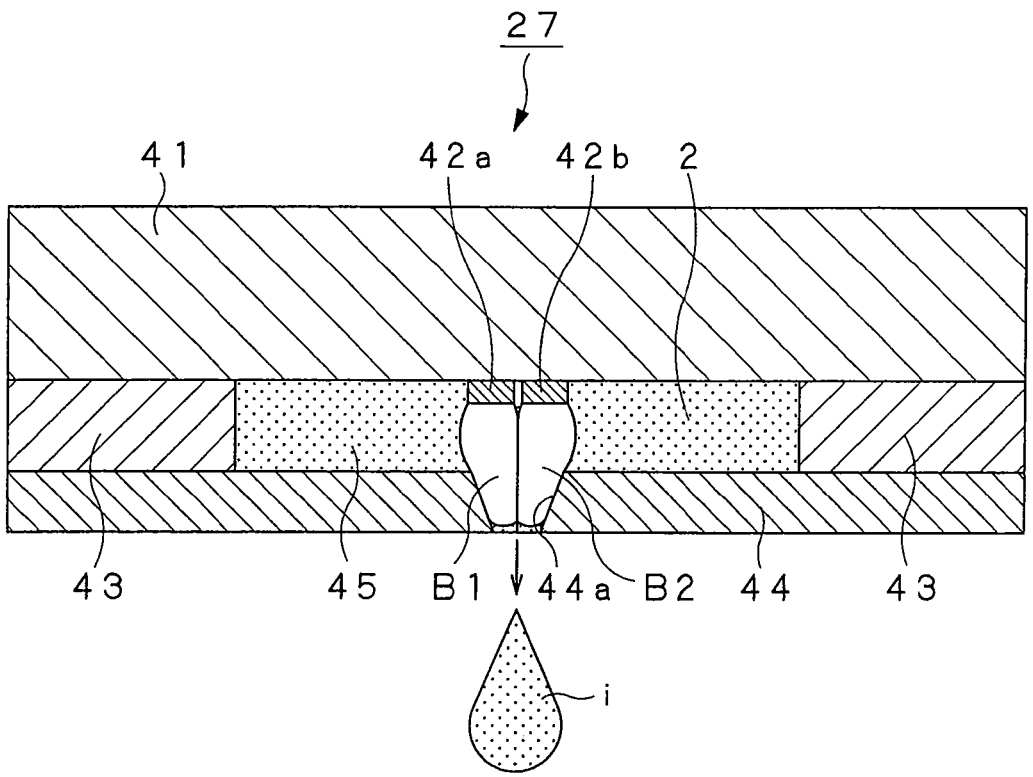
FIG. 10, illustrating the state of the head chip emitting an ink droplet, is a cross-sectional view depicting a state in which the ink droplet has been emitted from the nozzle approximately directly downwards by the two air bubbles of ink.

Specifically, the ink 2 is supplied to the ink duct 46, connected to the head chip 27, so that the ink 2 is charged in the ink liquid chamber 45. The pulse currents of the same current value flow through the paired resistance heaters 42a, 42b substantially simultaneously to heat the paired resistance heaters 42a, 42b rapidly, as a result of which ink bubbles B1, B2 of the gaseous phase are generated in the portions of the ink 2 contacted with the paired resistance heaters 42a, 42b, so that the preset volume of the ink 1 is pressurized by the expansion of these ink bubbles B1, B2. Thus, in the head chip 27, the same volume of the ink 2 as that pressurized substantially at right angles to the recording sheet P at the portion of the ink contacted with the nozzle 44a by the ink bubbles B1, B2 in the head chip 27 is emitted substantially downwards towards the recording sheet P as the ink droplet so as to be deposited on the recording sheet P, as shown in FIG. 10. For convenience for explanation, it is assumed that the ink bubble B1 has been formed on the resistance heater 42a, while the ink bubble B2 has been formed on the resistance heater 42b.

Figure 11:
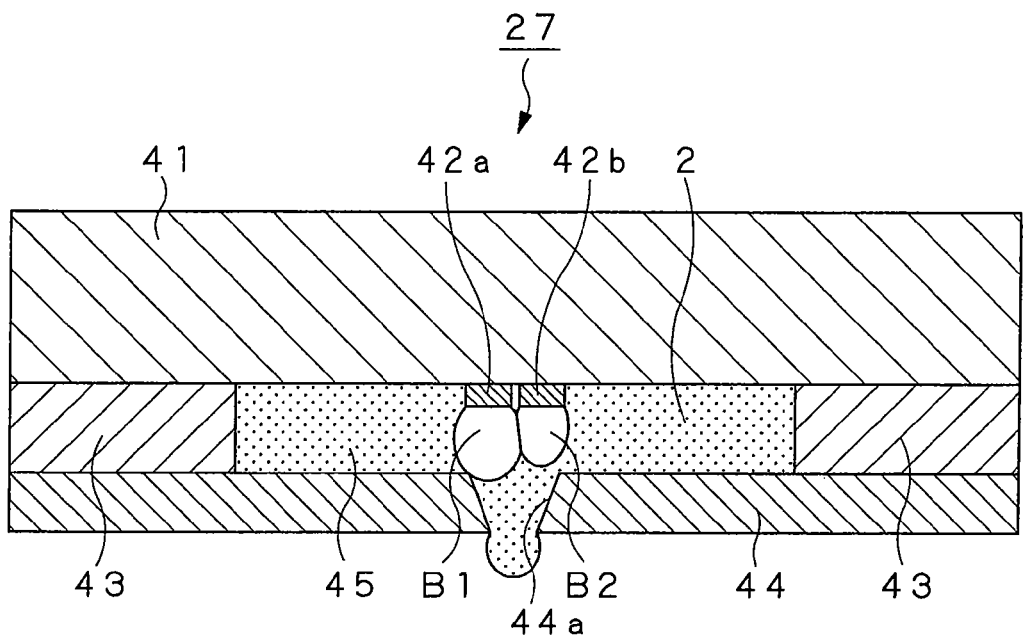
FIG. 11, illustrating the state of the head chip emitting the ink droplet, is a cross-sectional view depicting a state in which air bubbles of ink of different sizes have been formed in an ink liquid chamber.
Figure 12:
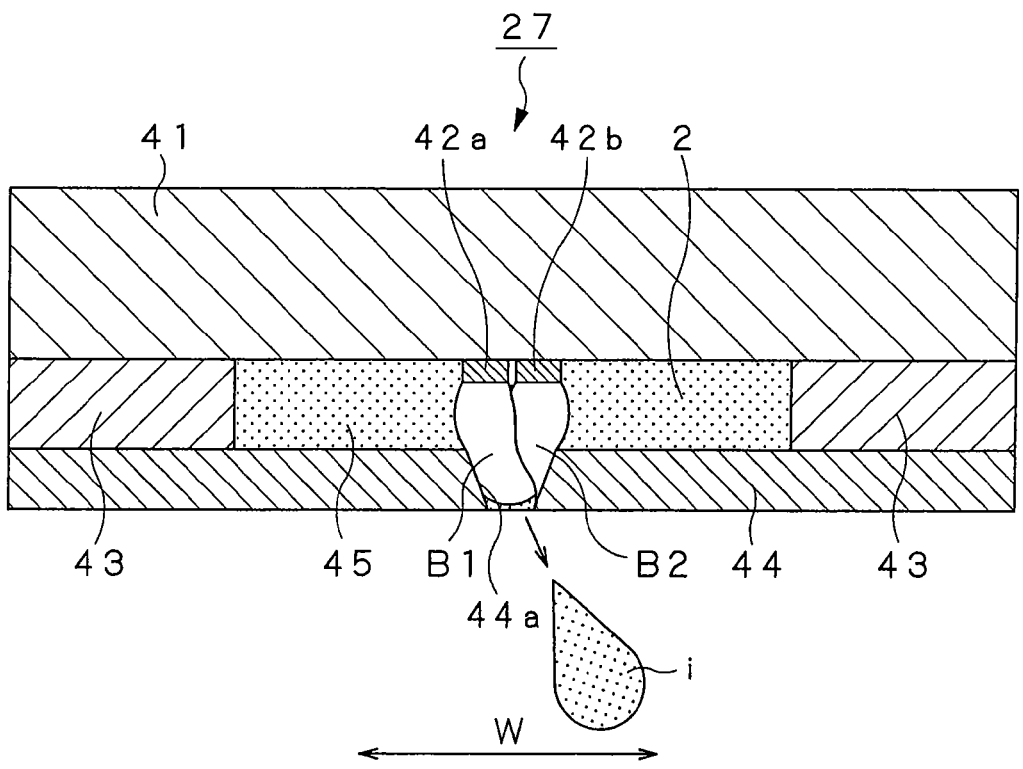
FIG. 12, illustrating the state of the head chip emitting an ink droplet, is a cross-sectional view depicting a state in which the ink droplet has been emitted from the nozzle substantially obliquely by the two air bubbles of ink.

In the head chip 27, pulse currents of different current values are supplied substantially simultaneously to the paired resistance heaters 42a, 42b to generate ink bubbles B1, B2 of different sizes in the portions of the ink 2 contacted with the paired resistance heaters 42a, 42b, so that preset volumes of the ink 2 are pressurized due to expansion of these ink bubbles B1, B2, as shown in FIG. 11. Thus, in the head chip 27, the same volumes of the ink 2 as those of the ink 2 pressurized by the ink bubbles B1, B2 in the ink portion contacted with the nozzle 44a are emitted as ink droplets i, from the nozzle 44a, along the width of the recording sheet P indicated by arrow W in FIG. 12, with an offset towards the ink bubble B1 or B2, whichever has the smaller volume, so as to be deposited on the recording sheet P, as shown in FIG. 12. Meanwhile, it is shown in FIG. 12 that the ink bubble B1 formed on the resistance heater 42a is larger in volume than the ink bubble B2 formed on the resistance heater 42b.

With the above-described structure of the head chip 27, the ink 2 containing a non-ionic surfactant containing the organic compound shown by the above chemical formula 1 is supplied to the ink liquid chamber 45 so that bubbles other than the ink bubble B1 or B2 by the paired resistance heaters 42a, 42b are suppressed from being generated in the ink 2 in the ink liquid chamber 45, so that no inconvenience is caused that bubbles produced in the ink in the ink liquid chamber obstruct supply of the ink to the resistance heaters or emission of the ink through the nozzle.

With the head chip 27, the ink 2 supplied to the ink liquid chamber 45 contains at least the non-ionic surfactant containing in turn the organic compound represented by the above chemical formula, and hence the ink 2 exhibits superior wetting performance not only for the recording sheet P but also for the inner peripheral surface of the ink liquid chamber 45, the paired resistance heaters 42a, 42b and the nozzle 44a, so that the ink 2 may be supplied promptly to the paired resistance heaters 42a, 42b after emission of the liquid droplet i from the nozzle 44a. Thus, with the present head chip 27, the ink 2 may promptly be supplied to the paired resistance heaters 42a, 42b, each time the ink liquid droplet i is emitted, that is, the ink 2 may be optimally supplied without interruptions to the ink liquid chamber 45, and hence the ink liquid droplets i may be emitted optimally from the nozzle 44a even in case the ink liquid droplets i are emitted at short emitting intervals. Specifically, even if the paired resistance heaters 42a, 42b are driven with pulse currents with the frequency exceeding 1 kHz, preferably 3 kHz, and more preferably 5 kHz, the ink liquid droplet i may be emitted optimally from the nozzle 44a.

Moreover, with the head chip 27, the ink 2 supplied to the ink liquid chamber 45 contains at least the non-ionic surfactant containing in turn the organic compound represented by the above chemical formula 1, with the cloud point of the surfactant being on the order of 80° C. higher than that of the conventional surfactant, so that it is possible to suppress the temperature of the ink 2, heated by the paired resistance heaters 42a, 42b, from exceeding the cloud point of the surfactant to undergo changes in the physical properties. Hence, with the present head chip 27, there is no risk of the temperature of the ink 2 in the ink liquid chamber 45 readily exceeding the cloud point of the ink 2 in the ink liquid chamber 45, with the ink 2 being stable in its physical properties, so that the wettability of the ink 2 relative to the inner peripheral surface of the ink liquid chamber 45, the paired resistance heaters 42a, 42b or the nozzle 44a may be maintained and the ink liquid droplet i may optimally be emitted from the nozzle 44a.

Thus, with the present head chip 27, the physical properties of the ink 2 in the ink liquid chamber 45 are stable and the wettability of the ink 2 for e.g. the nozzle 44a may be kept in an optimal state, so that, even if the ink liquid droplet i is emitted from the nozzle 44a as the emitting direction is varied under driving control of the paired resistance heaters 42a, 42b, no variations are produced in the emitting angle of the ink liquid droplet i, such that the ink liquid droplet i may be emitted optimally in the preset direction.

The main body unit of the cartridge 21, making up the printer device 1, loaded with the head cartridge 3, described above, is now explained with reference to the drawings.

Figure 13:
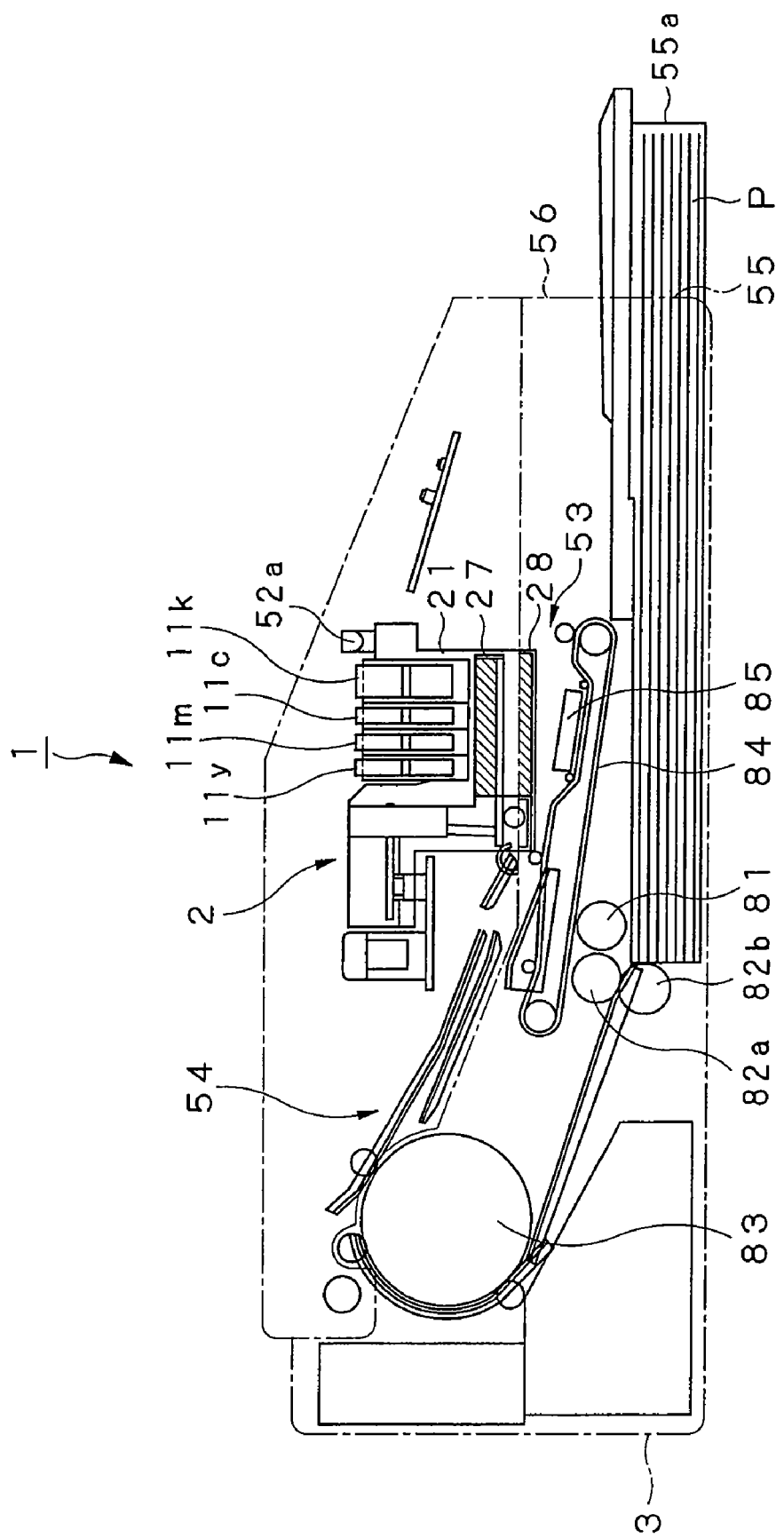
FIG. 13 is a side view showing the ink jet printer device, with a portion of the device being removed to show its inside.

Referring to FIGS. 1 and 13, the main body unit of the printer 4 includes a head cartridge loading unit 51, a head cartridge holding mechanism 52 for holding and securing the head cartridge 3 by the head cartridge loading unit 51, a head cap opening/closing mechanism 53 for opening/closing the head cap, a sheet supplying/discharging mechanism 54 for supplying/discharging the recording sheet, a sheet supply port 55 for supplying the recording sheet P to the sheet supplying/discharging mechanism 54, and a sheet discharging port 56 for discharging the recording sheet P from the sheet supplying/discharging mechanism 54.

The head cartridge loading unit 51 is a recess in which the head cartridge 3 is loaded. In this recess is loaded the head cartridge 3. For printing data on a traveling recording sheet, the head cartridge 3 is loaded in the recess so that the emitting surface 27a of the head chip 27 will be substantially parallel to the sheet surface of the running recording sheet. There are occasions where the head cartridge 3 needs to be exchanged due to e.g. ink clogging in the head chip 27, such that the head cartridge 3 is a consumable item, even if it need not be exchanged so often as the ink cartridge 11. Hence, the head cartridge 3 is held by the head cartridge holding mechanism 52 so that it may be dismounted from the head cartridge loading unit 51.

The head cartridge holding mechanism 52 is used for detachably holding the head cartridge 3 by the head cartridge loading unit 51. Thus, with the head cartridge holding mechanism, a knob 52a provided to the head cartridge 3 is retained by a biasing member, such as a spring, not shown, provided in a retention opening 52b formed in the main body unit of the printer 4 for pressurizing the head cartridge 3 in position against the reference surface 4a provided to the main body unit of the printer 4 for holding and securing the head cartridge 3.

The head cap opening/closing mechanism 53 has a driving unit for opening/closing the head cap 28 of the head cartridge 3. In printing, the head cap opening/closing mechanism opens the head cap 28 for exposing the head chip 27 for the recording sheet P and, when the printing has come to a close, the head cap opening/closing mechanism closes the head cap 28 to protect the head chip 27.

The sheet supplying/discharging mechanism 54 includes a driving unit for transporting the recording sheet P. The recording sheet P, supplied from the sheet supply port 55, is transported to the head chip 27 of the head cartridge 3. The printed recording sheet P, on which the ink liquid droplet i emitted from the nozzle 44a has been deposited, is transported up to the sheet discharging port 56 and discharged to outside the device. The sheet supply port 55 is an opening through which recording sheets P are supplied to the sheet supplying/discharging mechanism 54, and includes a tray 55a on which plural recording sheets P are layered and stored. The sheet discharging port 56 is an opening for discharging the printed recording sheets P, on which has been deposited the ink liquid droplet i emitted from the nozzle 44a.

A control circuit 61, shown in FIG. 14, for controlling the printing by the printer device 1, constructed as described above, is now explained with reference to the drawings.

The control circuit 61 includes a printer driving unit 62 for driving and controlling driving mechanisms 53, 54 of the main body unit of the printer 4, an emission controller 63 for controlling the current supplied to the head chip 27 adapted for coping with various color inks 2, an alarm unit 64 for issuing alarm as to the residual quantity of each color ink 2, an input/output terminal 65 for inputting/outputting signals with an external device, a ROM (read-only memory) 66 having stored e.g. a control program, a RAM (random access memory) 67 for transiently storing e.g. the control program as read out and for reading out the so stored control program as necessary, and a controller 68 for controlling various components.

The printer driving unit 62 actuates a driving motor, forming the head cap opening/closing mechanism 53, based on a control signal from the controller 68, to control the head cap opening/closing mechanism for opening/closing the head cap 28. Based on the control signal from the controller 68, the printer driving unit 62 actuates the driving motor, forming the sheet supplying/discharging mechanism 54, to supply paper sheets P from the sheet supply port 55 of the main body unit of the printer 4 to discharge the recording sheet P after printing form the sheet discharging port 56, by way of controlling the sheet supplying/discharging mechanism.

Figure 15:
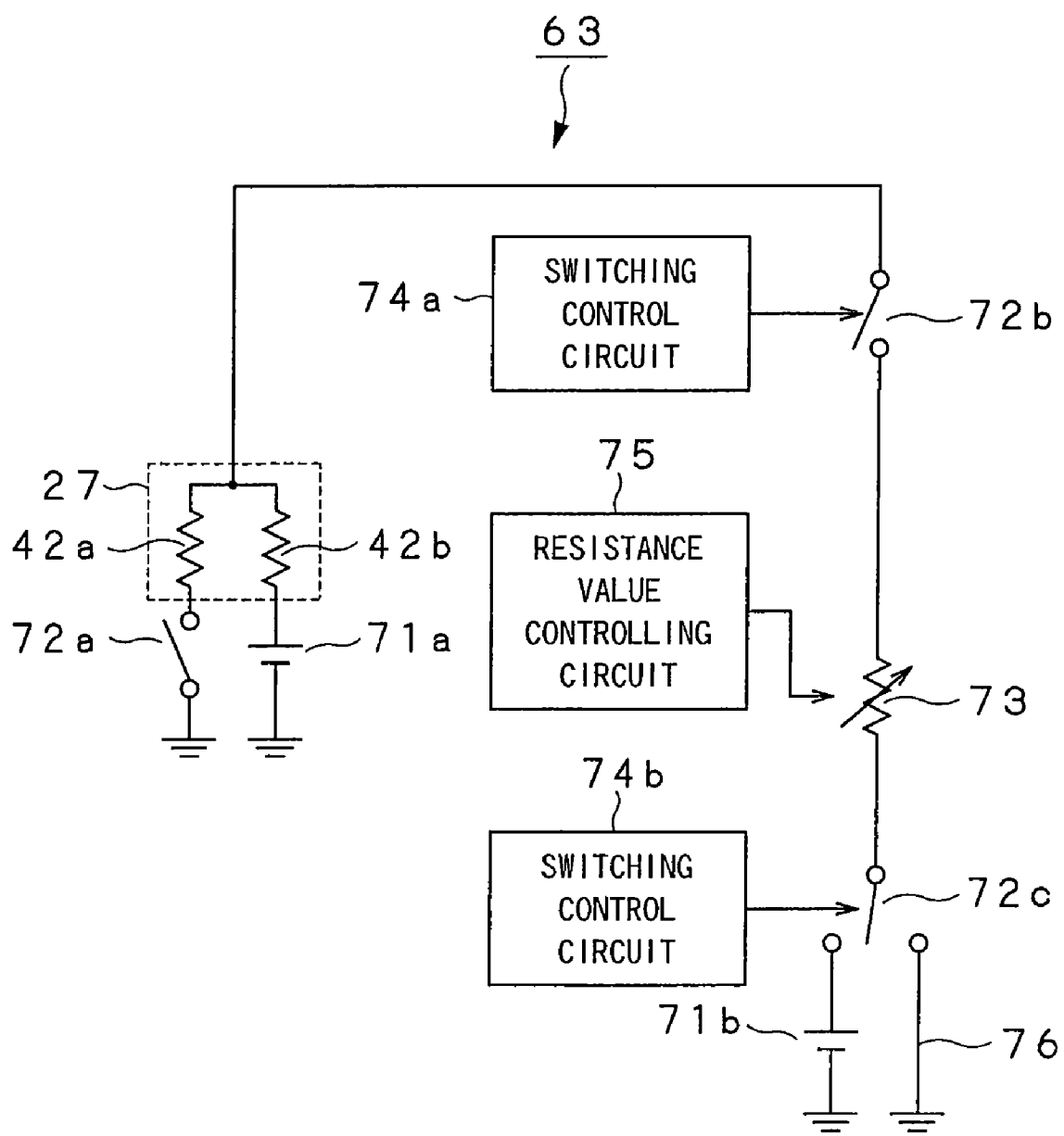
FIG. 15 is a block diagram showing an emission control unit of a control circuit.

The emission controller 63, shown in FIG. 15, is an electrical circuit including power supply units 71a, 71b for supplying pulse currents to the paired resistance heaters 42a, 42b, operating as resistors, switching elements 72a, 72b, 72c for turning the electrical connection across the paired resistance heaters 42a, 42b and the power supply units 71a, 71b on or off, a variable resistor 73 for controlling the pulse currents supplied to the paired resistance heaters 42a, 42b, switching control circuits 74a, 74b for controlling the switching of the switching elements 72b, 72c, and a resistance value controlling circuit 75 for controlling the resistance value of the variable resistor 73.

The power supply unit 71a is connected to the resistance heater 42b, while the power supply unit 71b is connected via switching element 72c to the variable resistor 73. Both the power supply units supply pulse currents to the electrical circuit. Although the power supply of the pulse currents, sent to the electrical circuit, may use the power supply units 71a, 71b as the power supply source, the power may also be directly supplied for, e.g. the controller 68.

The switching element 72a is arranged across the resistance heater 42a and the ground to control the on/off of the emission controller 63 in its entirety. The switching element 72b is arranged across the paired resistance heaters 42a, 42b and the variable resistor 73 to control the pulse current supplied to the paired resistance heaters 42a, 42b. The switching element 72c is arranged across the variable resistor 73 and the power supply unit 71b to control the direction of emission of the ink liquid droplet i. These switching elements 72a, 72b, 72c are controlled on or off to control the pulse current supplied to the electrical circuit.

The variable resistor 73 varies the resistance value to vary the current value of the pulse current supplied to the resistance heater 42a. That is, the current value of the pulse current, supplied to the resistance heater 42a, is determined depending on the magnitude of the resistance value of the variable resistor 73.

The switching control circuit 74a switches the on/off of the switching element 72b to connect the variable resistor 73 to the paired resistance heaters 42a, 42b or turns off the variable resistor 73 and the paired resistance heaters 42a, 42b. The switching control circuit 74b switches the on/off of the switching element 72c to switch the on/off of the connection across the power supply unit 71b and the electrical circuit.

The resistance value controlling circuit 75 controls the magnitude of the resistance value of the variable resistor 73 to adjust the magnitude of the pulse current supplied to the resistance heater 42a.

If, with the above-described emission controller 63, the switching element 72b is turned off, such that the variable resistor 73 is not connected to the paired resistance heaters 42a, 42b, and the switching element 72a is turned on, the pulse current is supplied from the power supply unit 71a to the paired resistance heaters 42a, 42b, connected in series with each other (no current then flowing in the variable resistor 73). If the resistance values of the paired resistance heaters 42a, 42b are approximately equal to each other, the quantities of heat generated by the paired resistance heaters 42a, 42b are approximately equal to each other.

Figure 16A:
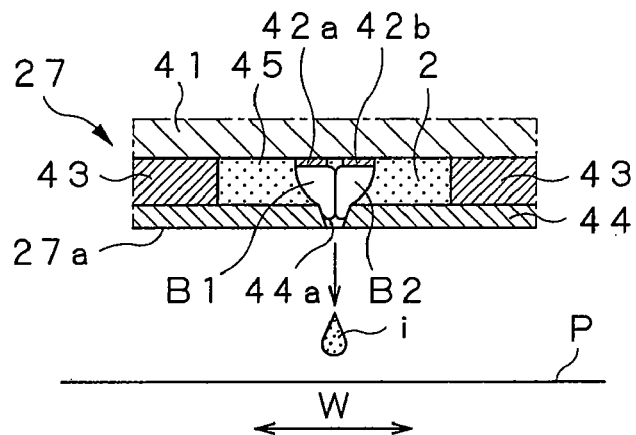

In the head chip 27, the heat quantities generated by the paired resistance heaters 42a, 42b are approximately equal to each other, as shown in FIG. 16A, the time of generation of the ink bubbles B1, B2, that is, the bubble generating time, is approximately equal, and the air bubbles B1, B2 of approximately the same volume are formed on the paired resistance heaters 42a, 42b. Consequently, the angle of emission of the ink 2 is approximately perpendicular to the major surface of the recording sheet P, such that the ink liquid droplet is emitted right downwards from the nozzle 44a.

Figure 16B:
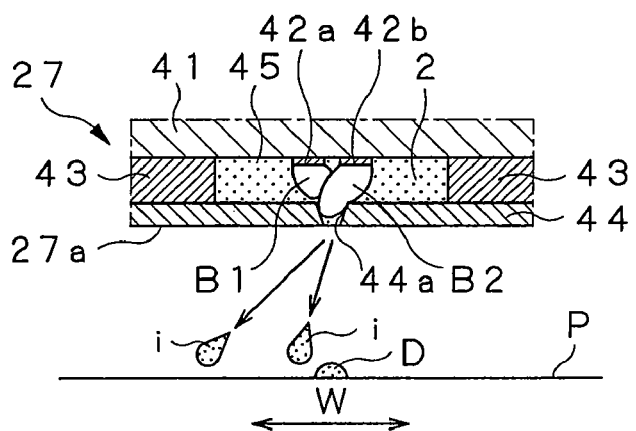

If, with the emission controller 63, shown in FIG. 15, the switching element 72b has turned the connection across the paired resistance heaters 42a, 42b and the variable resistor 73 on, has turned the switching element 72a on and has connected the switching element 72c to the ground, the ink liquid droplet i is emitted in a state in which the direction of emission of the ink liquid droplet has been changed towards the resistance heater 42a along the width W of the recording sheet P, as shown in FIG. 16B. That is, with the switching element 72c connected to the ground, the current value of the pulse current supplied to the resistance heater 42a becomes smaller depending on the resistance value of the variable resistor 73. Thus, the ink bubbles B1, B2 are formed on the paired resistance heaters 42a, 42b in such a state where the ink bubble B1 is smaller in size than the ink bubble B2, so that the ink liquid droplet i is emitted from the nozzle 44a as the angle of emission of the ink 2 is changed towards the resistance heater 42a. With this emission controller 63, the current value of the pulse current supplied to the resistance heater 42b remains unchanged, while the current value of the pulse current supplied to the resistance heater 42a is changed.

If, in this case, the resistance value of the variable resistor 73 is larger, the current flowing to the ground from the power supply unit 71a through the switching elements 72c is small, with the amount of decrease of the current value of the pulse current supplied from the power supply unit 71a to the resistance heater 42a being small. Consequently, the difference in the pulse currents supplied to the paired resistance heaters 42a, 42b becomes small, and the difference in the heat quantities generated between the paired resistance heaters 42a, 42b also becomes small, while the angle of emission of the ink liquid droplet i emitted from the nozzle 44a referred to the emitting surface 27a is larger. That is, the larger the resistance value of the variable resistor 73, the closer is the deposited point of the emitted ink 2 towards the resistance heater 42a away from the point of deposition D when the ink droplet i is emitted right downwards from the nozzle 44a. If conversely the resistance value of the variable resistor 73 is small, the difference in the pulse current, supplied to the paired resistance heaters 42a, 42b, is larger, and hence the difference in the heat quantities supplied to the paired resistance heaters 42a, 42b is also larger, with the angle of emission of the ink liquid droplet i emitted from the nozzle 44a, referred to the emitting surface 27a, becoming smaller. That is, the smaller the resistance value of the variable resistor 73, the remoter is the deposited point of the emitted ink 2 towards the resistance heater 42a away from the point of deposition D when the ink droplet i is emitted right downwards from the nozzle 44a.

Figure 16C:
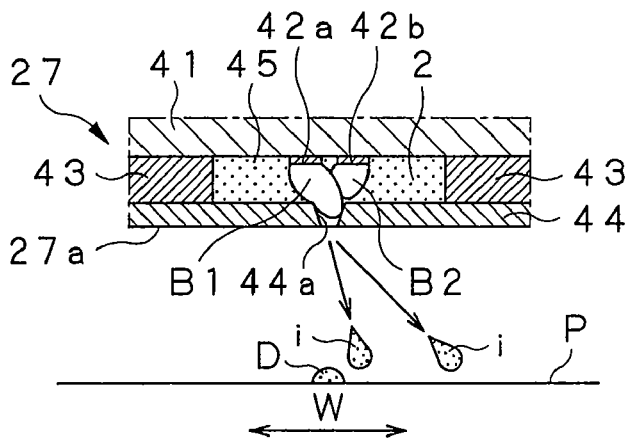

Additionally, with the emission controller 63, shown in FIG. 15, in case the switching element 72b has turned the connection across the paired resistance heaters 42a, 42b and the variable resistor 73 on, has turned the switching element 72a on, and has connected the switching element 72c to the power supply unit 71b, the ink liquid droplet i emitted from the head chip 27 is emitted in such a state that the ink emitting direction is varied towards the resistance heater 42b along the width of the recording sheet P, as shown in FIG. 16C. That is, with the switching element 72c connected to the power supply unit 71b, the current value of the pulse current supplied to the resistance heater 42a becomes larger in keeping with the resistance value of the variable resistor 73, and the ink bubbles B1, B2 are formed on the paired resistance heaters 42a, 42b in such a state in which the volume of the ink bubble B2 is smaller than that of the ink bubble B1, so that the ink liquid droplet i is emitted substantially obliquely from the nozzle 44a as the angle of emission of the ink 2 is varied towards the resistance heater 42b. In the head chip, the heated state of the paired resistance heaters 42a, 42b is reversed from that in case the switching element 72c is connected to the ground.

If, in this case, the resistance value of the variable resistor 73 is larger, the pulse current supplied from the power supply unit 71b in addition to that from the power supply unit 71a to the resistance heater 42a becomes smaller, so that the difference in the pulse current supplied to the paired resistance heaters 42a, 42b becomes smaller, the difference in the quantities of generated heat between the paired resistance heaters 42a, 42b is also small and the angle of emission of the ink liquid droplet i emitted from the nozzle 44a referred to the emitting surface 27a becomes larger. That is, the larger the resistance value of the variable resistor 73, the closer is the deposited position of the emitted ink liquid droplet i towards the resistance heater 42b away from the deposited point D when the ink liquid droplet i has been emitted substantially right downwards from the nozzle 44a. If the resistance value of the variable resistor 73 is smaller, the pulse current supplied from the power supply unit 71b in addition to that from the power supply unit 71a to the resistance heater 42a becomes larger, so that the difference in the pulse current supplied to the paired resistance heaters 42a, 42b becomes larger, the difference in the quantities of generated heat between the paired resistance heaters 42a, 42b is also larger and the angle of emission of the ink liquid droplet i emitted from the nozzle 44a referred to the emitting surface 27a becomes smaller. That is, the smaller the resistance value of the variable resistor 73, the remoter is the deposited position of the emitted ink liquid droplet i towards the resistance heater 42b away from the deposited point D when the ink liquid droplet i has been emitted substantially right downwards from the nozzle 44a.

In this manner, it is possible with the emission controller 63 to change over the switching elements 72a, 72b, 72c to vary the resistance value of the variable resistor 73 to change the direction of emission of the ink liquid droplet i from the nozzle 44a along the arraying direction of the paired resistance heaters 42a, 42b, that is, along the width-wise direction of the recording sheet P.

Although the current value of the current supplied to the resistance heater 42a is adjusted by controlling the value of the variable resistor 73, the current value of the current supplied to the resistance heater 42b may also be adjusted by a configuration in which the power supply unit 71a is connected to the resistance heater 42b.

Figure 14:
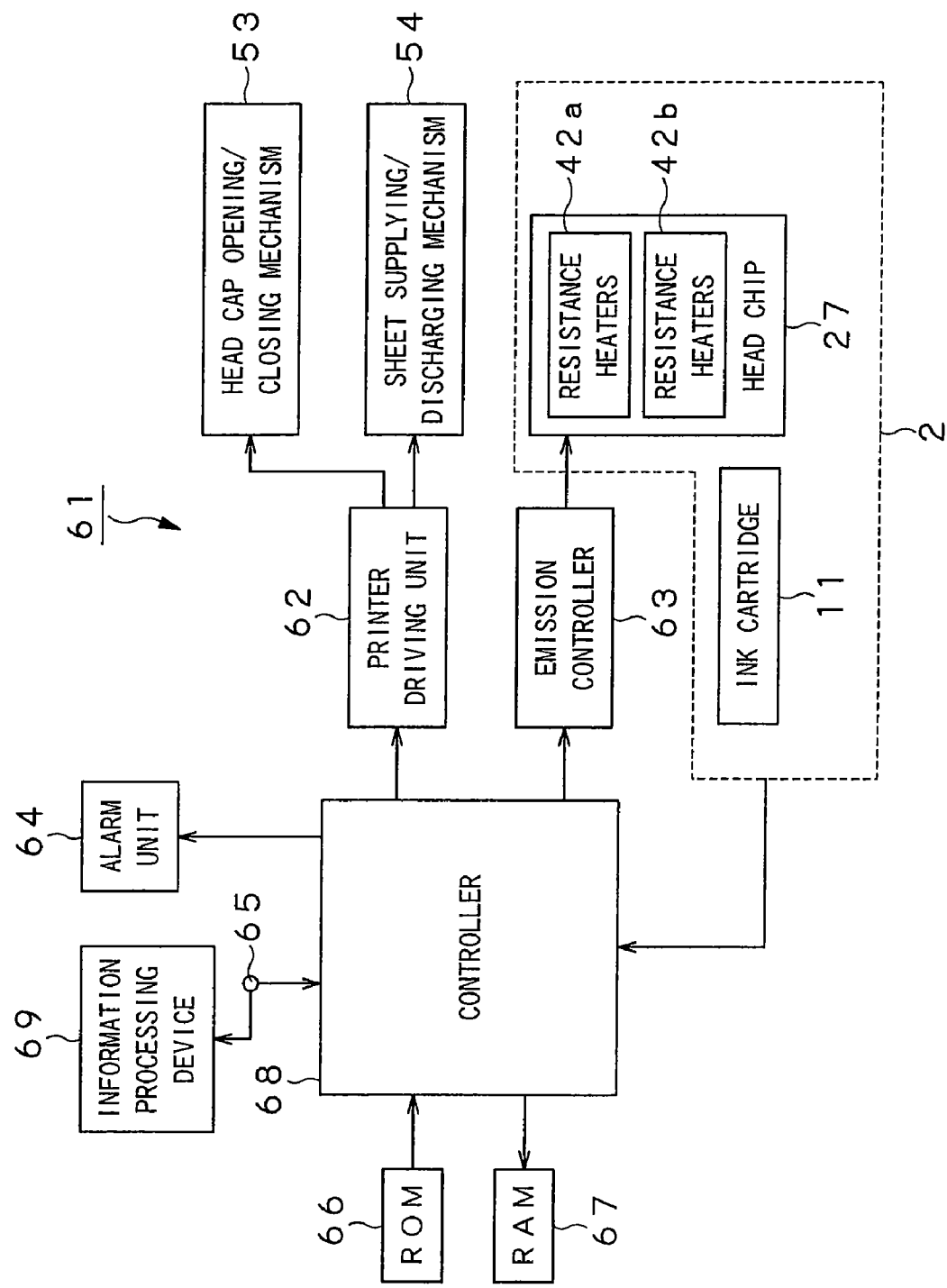
FIG. 14 is a block diagram showing a control circuit of the ink jet printer device.

The alarm unit 64, shown in FIG. 14, is a display means, such as LCD (liquid crystal display), and indicates the information typified by the printing condition, printing state or the residual quantity of the ink 2. The alarm unit 64 may also be voice outputting means, such as a loudspeaker. The alarm unit 64 may also include both the display means and the voice outputting means. The alarm may also be issued by a monitor or a loudspeaker of the information processing device 69.

The input/output terminal 65 transmits the above information, typified by the printing condition, printing state or the residual quantity of the ink 2, via an interface to the external information processing device 69. The input/output terminal 65 is supplied from e.g. the external information processing device 69 with a control signal for outputting the above information, such as the printing condition, printing state or the residual quantity of the ink 2. The information processing device 69 is an electronic device, such as a personal computer or a PDA (personal digital assistant).

The input/output terminal 65, connected to the information processing device 69, may use, as an interface, a serial interface or a parallel interface, and conforms to standards, such as USB (Universal Serial Bus), RS (Recommended Standard) 232C or IEEE (Institute of Electrical and Electronic Engineers) 1394. The input/output terminal 65 may have data communication with the information processing device 69 by wired or wireless communication. The standards for wireless communication may be exemplified by IEEE802.11a, 802.11b and 802.11 g.

There may be interposed a network, such as the Internet, between the input/output terminal 65 and the information processing device 69. In this case, the input/output terminal 65 is connected to networks, such as LAN (local area network), ISDN (Integrated Services Digital Network), xDSL (Digital Subscriber Line), FHP (Fiber to the Home), CATV (Community Antenna Television) or BS (broadcasting satellite). Data communication is by a variety of protocols, such as TCP/IP (Transmission Control Protocol/Internet Protocol).

The ROM 66 is a memory, such as EP-ROM (Erasable Programmable Read-Only Memory), having stored therein a variety of processing programs executed by the controller 68. These stored programs are loaded by the controller 68 on the RAM 67. The RAM 67 holds various states of the printer device 1 as well as the programs read out by the controller 68 from the ROM 66.

The controller 68 controls various parts based on printing data input from the input/output terminal 65 or on the data on the residual ink quantity input from the head cartridge 3. Based on the input control signal, the controller 68 reads out, from the ROM 66, the processing programs, controlling the various components, and holds the so read out processing programs to perform control or processing for various components.

In the above-described control circuit 61, the processing programs are stored in the ROM 66. However, the storage medium for the processing programs is not limited to the ROM 66 and may also be any of a variety of recording mediums, such as optical discs, magnetic discs, magneto-optical discs or IC cards, having the processing programs recorded thereon. In this case, the control circuit 61 is configured so that it is connected to a drive for actuating various recording mediums either directly or via information processing device 69 to read out processing programs from these recording mediums.

Figure 17:
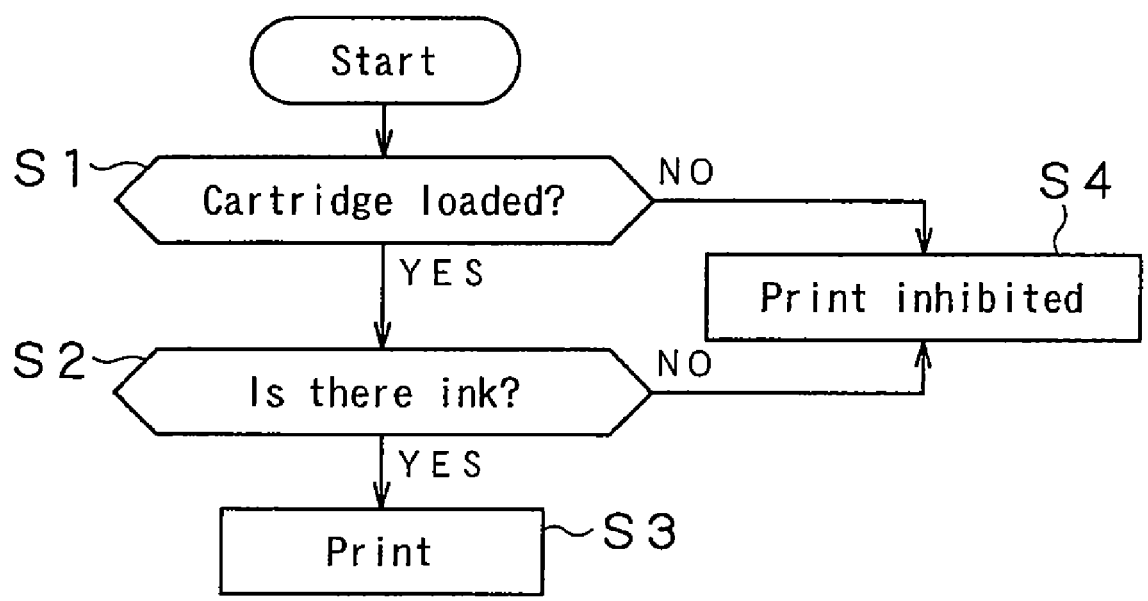
FIG. 17 is a flowchart for illustrating the printing operation of the ink jet printer device.

The printing operations of the printer device 1, constructed as described above, are now explained with reference to the flowchart shown in FIG. 17. Meanwhile, the present printing operations are carried out by processing operations by the CPU (central processing unit), not shown, provided in the controller 68, based on a processing program stored in storage means, such as ROM 66.

First, a user issues a command, by acting on e.g. an operating panel, provided to the main body unit of the printer 4, in order for the printer device 1 to carry out the printing operation. Then, in a step S1, the controller 68 gives a decision as to whether or not the ink cartridge 11 of a preset color has been loaded on each loading unit 22. If the ink cartridge 11 of a preset color is properly loaded on each loading unit 22, the controller 68 proceeds to a step S2. If otherwise, the controller proceeds to a step S4 to inhibit the printing operations.

Then, in the step S2, the controller 68 verifies whether the quantity of the ink 2 in the connecting part 26 is equal to or less than the preset quantity, that is, whether there is no ink in the connecting part 26. If it is verified that there is no ink, the alarm unit 64 issues a corresponding alarm and, in a step S4, inhibits the printing operation. If the quantity of the ink 2 in the connecting part is larger than the preset amount, that is, if the connecting part is filled with the ink 2, the controller 68 allows the printing operation in the step S3.

Figure 18:
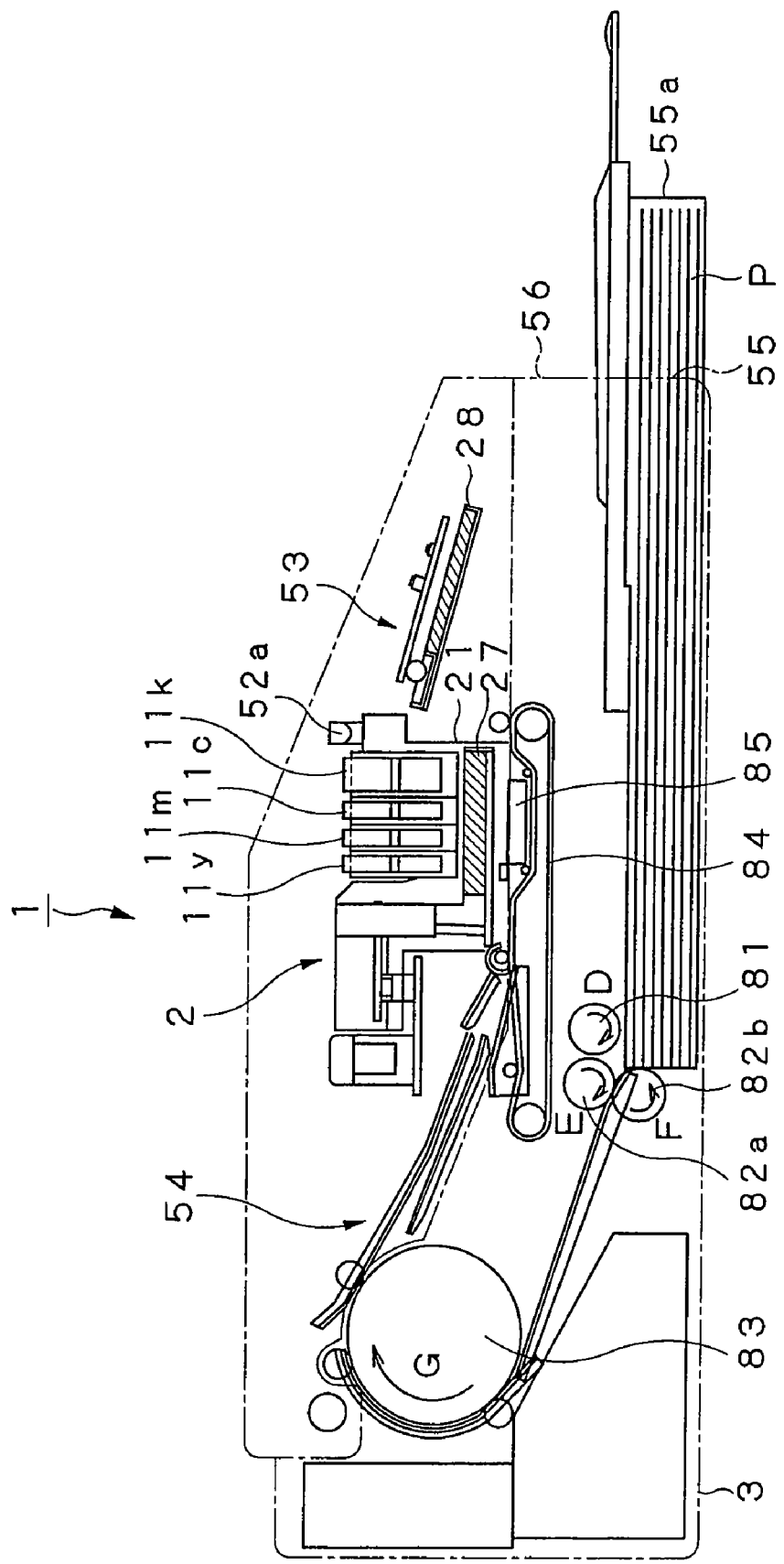
FIG. 18 is a side view of the ink jet printer device showing the state in which a head cap opening/closing mechanism is opened, with a portion of the device being removed to show its inside.

In carrying out the printing, the controller 68 causes the printer driving unit 62 to drive the driving units 53, 54 to shift the recording sheet P to a printable position. Specifically, the controller 68 actuates a driving motor, forming the head cap opening/closing mechanism 53, to shift the head cap 28 towards the tray 55*a* relative to the head cartridge 3 to expose the nozzle 44*a* of the head chip 27, as shown in FIG. 18. The controller 68 actuates the driving motor, forming the sheet supplying/discharging mechanism 54, to cause movement of the recording sheet P. Specifically, the controller 68 performs control so that the recording sheet P is pulled out by a sheet feed roll 81 from the tray 55*a*, and the recording sheet P thus pulled out is transported by a pair of separating rolls 82*a*, 82*b*, rotating in opposite directions, to a reversing roll 83 to reverse its transporting direction. The recording sheet then is transported to a transporting belt 84 and held at a preset position by a retention means 85 to set the position of deposition of the ink 2.

When it has been confirmed that the recording sheet P has been held in its printing position, the controller 68 controls the emission controller 63 for emitting the ink liquid droplet i from the nozzle 44*a* of the head chip 27 to the recording sheet P. More specifically, when the ink liquid droplet i is emitted substantially right downwards from the nozzle 44*a*, as shown in FIG. 16A, the emission controller 63 is controlled so that substantially the same pulse current will be supplied to the paired resistance heaters 42*a*, 42*b*. When the ink liquid droplet i is emitted in another emitting direction from the nozzle 44*a* towards the resistance heater 42*a*, as shown in FIG. 16B, the controller 68 controls the emission controller 63 so that the current value of the pulse current supplied to the resistance heater 42*a* will be smaller than that of the pulse current supplied to the resistance heater 42*b*.

When the ink liquid droplet is emitted from the nozzle in a different direction, that is, towards the resistance heater 42*b*, as shown in FIG. 16C, the controller 68 exercises control so that the current value of the pulse current supplied to the resistance heater 42*a* will be larger than that of the pulse current supplied to the resistance heater 42*b*. When the ink liquid droplet i is emitted from the nozzle 44*a*, the same amount of the ink 2 as the amount of the emitted ink liquid droplet i is instantly supplemented from the ink duct 46 into the ink liquid chamber 45 to restore the original state, as shown in FIG. 6B. When the ink liquid droplet i is emitted from the head chip 27, and the negative pressure of the ink 2 in the ink chamber 34*b* towards the ink outlet 34*c*, divided by the opening part 34*d*, is raised, the diaphragm 34 is uplifted by the atmospheric pressure, under the negative pressure of the ink 2, to uplift the valve 34*e* along with the valve shaft 34*h* against the bias of the biasing member 34*f*. At this time, the opening 34*d* between the ink inlet 34*a* and the ink outlet 34*c* of the ink chamber 34*b* is opened, so that the ink 2 is supplied from the ink inlet 34*a* towards the ink outlet 34*c* to supplement the ink 2 into the ink duct 46 of the head chip 27. The negative pressure of the ink 2 is lowered and the diaphragm 34 is restored to its original shape under the force of restoration to lower the valve 34*e* along with the valve shaft 34*h* under the bias of the biasing member 34*f*. The above-described sequence of operations is repeated in the valving mechanism 34 when the negative pressure of the ink 2 is increased each time the ink liquid droplet i is emitted.

In this manner, letters/characters or images, corresponding to the printing data, are sequentially printed on the recording sheet P traveling by the sheet supplying/discharging mechanism 54. The recording sheet P, for which the printing has been finished, is discharged via sheet discharging port 56 by the sheet supplying/discharging mechanism 54.

With the above-described printer device 1, the ink 2, at least containing the non-ionic surfactant, containing in turn the organic compound shown by the above-described chemical formula, is contained in the ink cartridge 11, this ink 2 being emitted to the recording sheet P as ink liquid droplet i via nozzle 44*a*. The ink 2 exhibits superior wettability for the recording sheet P, and is permeated in a direction along the thickness of the recording sheet P, so that high quality printing may be made without bleeding of the depositing point of the deposited ink liquid droplet i. For example, if the ordinary paper, such as copy sheet, bond paper or the report paper, is used as the recording sheet P, it is possible to suppress the bleeding of the deposited ink liquid droplet i along the fiber of the ordinary paper sheet.

Moreover, with the present printer device 1, in which the ink 2, exhibiting superior wettability for the recording sheet P, is emitted as ink liquid droplet i via nozzle 44*a* for printing on the recording sheet P, the ink liquid droplet i deposited quickly seeps into the recording sheet P and is dried in situ, so that, even if the sheet portion having the liquid droplet i deposited thereon is rubbed, there is no risk of the deposited point of the liquid droplet i becoming blurred to deteriorate the image quality.

With the present printer device 1, the ink 2, at least containing the non-ionic With the present printer device 1, the ink 2, containing the surfactant, containing in turn the organic compound represented by the chemical formula 1, is stored in the ink cartridge 11, this ink being supplied into the ink liquid chamber 45 to suppress bubbles other than the ink bubbles B1, B2, from being formed in the ink 2 in the ink liquid chamber 45. Hence, with the present printer device 1, there is no risk of bubbles generated in the ink in the ink liquid chamber deterring the supply of the ink onto the resistance heaters, or the emission of the ink from the nozzle, thus optimally emitting the ink liquid droplet i from the nozzle 44*a*.

With the present printer device 1, in which the ink 2, supplied to the ink liquid chamber 45, exhibits superior wettability not only for the recording sheet P but also for the inner peripheral surface of the ink liquid chamber 45, paired resistance heaters 42*a*, 42*b* and the nozzle 44*a*, the ink 2 may be quickly supplied to the paired resistance heaters 42*a*, 42*b* on emission of the ink liquid droplet i from the nozzle 44*a*. Thus, with the present printer device 1, the ink 2 may quickly be supplied to the paired resistance heaters 42*a*, 42*b*, each time the ink liquid droplet i is emitted from the nozzle 44*a*, so that, even in case the ink liquid droplets i are emitted at short intervals, the ink liquid droplets i may be emitted optimally from the nozzle 44*a*. That is, with the present printer device 1, the ink liquid droplet i may be optimally emitted to achieve high quality printing even if the paired resistance heaters 42*a*, 42*b* are driven with the pulse current with the frequency of 1 kHz or higher, preferably 3 kHz or higher and more 5 kHz or higher, to increase the printing speed, the ink liquid droplet i may be optimally emitted from the nozzle 44*a* for each ink emitting event to achieve high image quality printing.

With the present printer device 1, in which the ink 2, stored in the ink cartridge 11, at least contains the surfactant, containing the organic compound, represented by the chemical formula 1, the cloud point of the surfactant being on the order of 80° C., higher than the cloud point of the conventional surfactant, it is possible to prevent changes in the physical properties of the ink 2 from occurring due to the cloud point of the surfactant being exceeded on heating the ink 2 by the paired resistance heaters 42a, 42b. Thus, with the present printer device 1, there is no risk of the temperature of the ink 2 in the ink liquid chamber 45, supplied from the ink cartridge 11, readily exceeding the cloud point of the surfactant, with the properties of the ink 2 being stabilized, so that it is possible to maintain the wettability of the ink 2 for the inner peripheral surface of the ink liquid chamber 45, the paired resistance heaters 42a, 42b or the nozzle 44a, with the ink liquid droplet i being optimally emitted from the nozzle 44a.

With the present printer device 1, the physical properties of the ink 2 in the head chip 27 are stable and the wettability of the ink 2 for e.g. the nozzle 44a is maintained in an optimum condition, it is possible to control the driving of the paired resistance heaters 42a, 42b to vary the direction of ink emission to prevent variations from being produced in the angle of emission of the ink liquid droplet i from the nozzle 44a to emit the ink liquid droplet i at a desired angle of emission from the nozzle 44a.

Figure 19A:
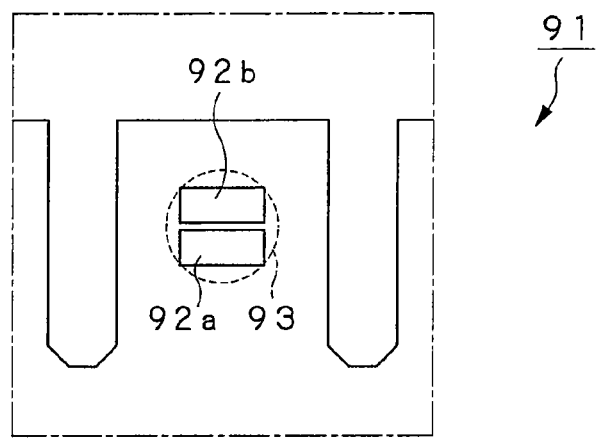
FIGS. 19A to 19C show a modification of a head chip, where
Figure 19B:
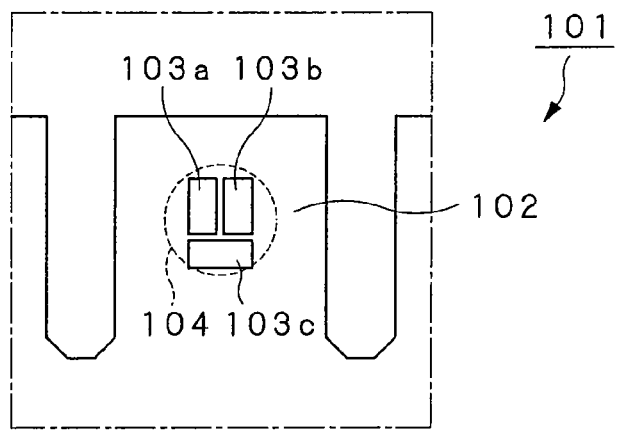
Figure 19C:
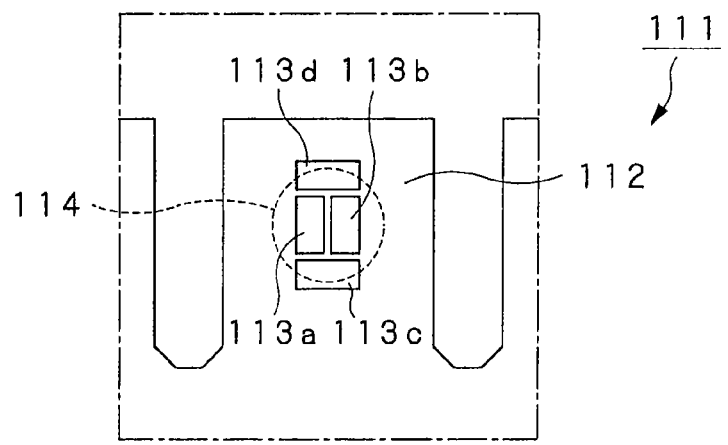

In the foregoing explanation, the paired resistance heaters 42a, 42b are arrayed side-by-side along the width of the recording sheet P. The present invention is not limited to this configuration and may, for example, be applied to head chips 91, 101, 111, shown for example in FIGS. 19A to 19C, provided that the direction of emission of the ink liquid droplet i is controlled as the current value of the pulse current supplied to plural pressure generating elements is changed. Meanwhile, with the head chip 91, paired resistance heaters 92a, 92a are arranged side-by-side along the running direction of the recording sheet P. With the head chip 101, three resistance heaters 103a, 103b, 103c are arranged in an ink liquid chamber 102, and four resistance heaters 113a, 113b, 113c and 113d are arranged in an ink liquid chamber 112. In FIG. 19, the positions of the nozzles 93, 104, 114 in the head chips 91, 101, 111 are denoted by dotted lines. In the head chips 101, 111, the resistance heaters 103c, 113c on the ink duct side are provided for preventing such a situation in which, when the ink bubble generated in the ink liquid chamber 102, 112 is split, the pressure for emitting the ink liquid droplet i via nozzle 104, 114 is lower on the ink duct side than on the sidewall side, such that the ink liquid droplet i is emitted in a direction in which the ink 2 is supplied from the ink duct, that is, in a substantially opposite direction to the direction indicated by an arrow F in FIGS. 19A to 19C.

Figure 20:
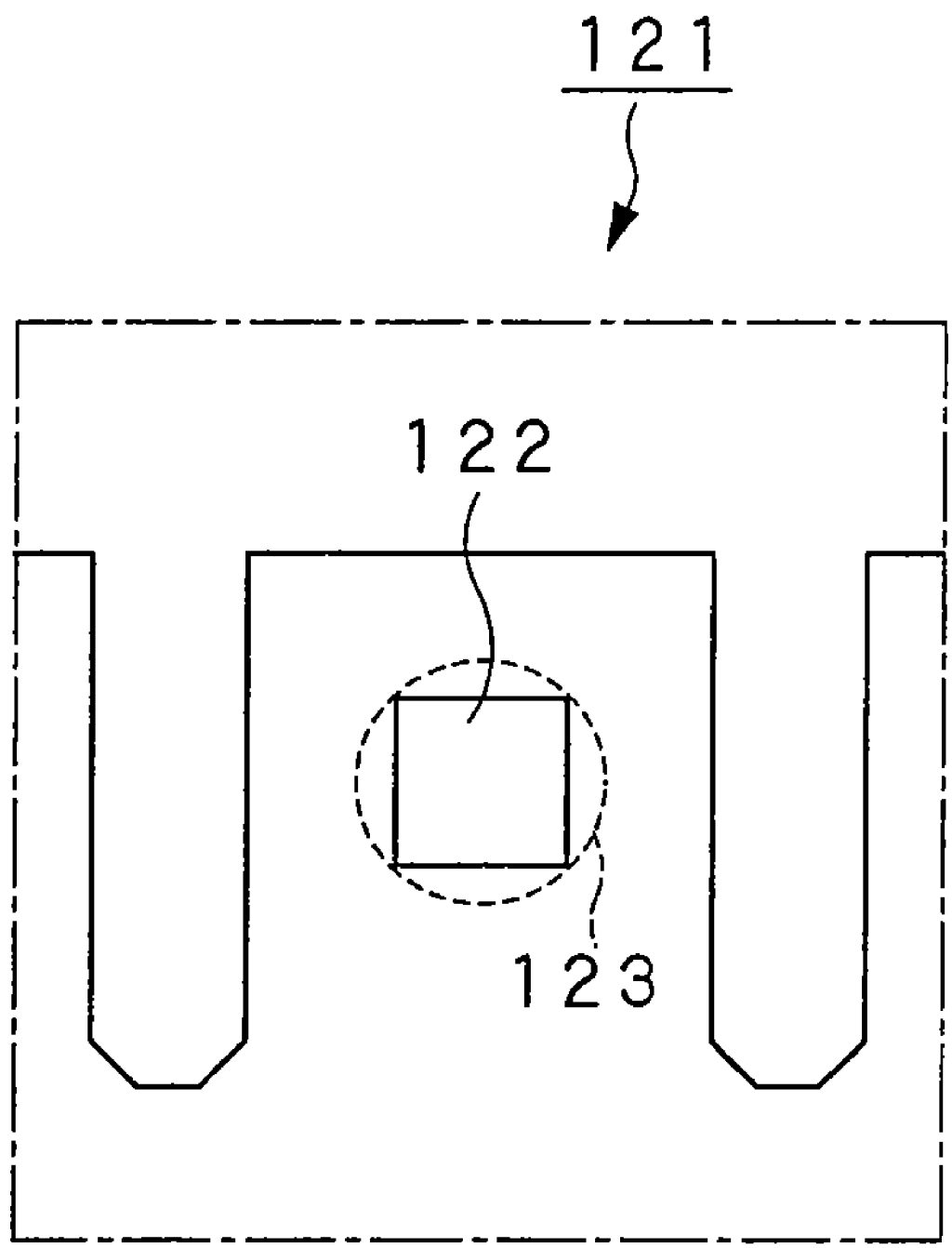
FIG. 20 is a plan view of a modification of the head chip showing the state in which only one resistance heater is provided.

In the foregoing explanation, it is assumed that the head chip 27 is provided with a plural number of plural resistance heaters 42a, 42b. The present invention is, however, not limited to this configuration and may also be applied to a head chip 121 in which only one resistance heater 122 is provided facing the nozzle 123, as shown in FIG. 20. In this case, the head chip 121 emits the ink liquid droplet i substantially right downwards, that is, in a direction substantially perpendicular to the recording sheet P. In FIG. 20, the position of the nozzle 123 in the head chip 121 is again show by a dotted line.

In the above explanation, it is assumed that the head cartridge 3 of the printer device 1 is dismountable from the main body unit of the printer 4 and that the ink cartridge 11 is dismountable from the head cartridge 3. The present invention may, however, be applied to a printer device in which the main body unit of the printer 4 is unified to the head cartridge 3.

In the configuration, described above, an electro-thermal conversion system is employed, in which the ink 2 is emitted from the nozzle 44a as the ink is heated by the paired resistance heaters 42a, 42b. This is merely illustrative and an electromechanical conversion system may also be used in which the ink is emitted electro-mechanically from the nozzle by an electromechanical transducer, such as piezo element.

Moreover, in the above-described configuration, the printer device 1 is a line printer. This, however, is again simply illustrative, such that the present invention may be applied to a serial ink jet printer device in which the ink head is moved in a direction substantially perpendicular to the traveling direction of the recording sheet. In this case, at least a plural number of the pressure generating devices are provided in the head chip of the serial ink jet printer device.

EXAMPLES

In the following, certain Examples, Comparative Examples and Reference Examples, in which the ink as a recording liquid of the present invention is actually prepared, are explained.

Example 1

In Example 1, 3 parts by weight of C.I. Direct Yellow 86, as a dyestuff serving as a colorant, 70 parts by weight of water as a solvent, 5 parts by weight of glycerin, 10 parts by weight of ethylene glycol, and 10 parts by weight of monobutyl diethyleneglycol, as other solvents, and 2 parts by weight of a non-ionic surfactant of the following chemical formula

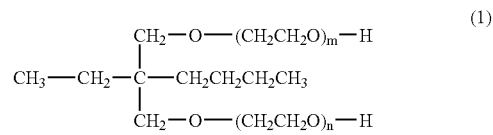

where m and n are integers not less than 1, with the total addition amount (m+n) of ethylene oxide (abbreviated below to EO) equal to 2, were mixed together to produce an ink precursor. As the surfactant containing the organic compound shown by the general formula 1, NEXCOAT, manufactured by NIKKO CHEMICALS Co. Ltd., having the addition amount of ethylene oxide changed, was used.

The ink precursor, obtained with the above composition, was agitated for four hours, in a state heated to 60° C. After the agitation, the ink precursor was compulsorily filtered, as the ink precursor was pressurized with a membrane filter, manufactured by ADVANTEC Inc. with a mesh size of 0.8 μm, to prepare the ink.

Example 2

In Example 2, 4 parts by weight of C.I. Direct Blue 199, as a dyestuff serving as a colorant, 65 parts by weight of water as a solvent, 10 parts by weight of ethylene glycol, 10 parts by weight of ethylene glycol, and 10 parts by weight of triethyleneglycol, as other solvents, and 2 parts by weight of a non-ionic surfactant of the organic compound of the chemical formula 1, similar to that of Example 1, with the total addition amount (m+n) of EO equal to 2, were mixed together to produce an ink precursor. An ink was prepared in the same way as in Example 1, except using the ink precursor.

Example 3

In Example 3, 3 parts by weight of C.I. Acid Red 52, as a dyestuff serving as a colorant, 70.9 parts by weight of water as a solvent, 10 parts by weight of monobutyl triethylene glycol, 5 parts by weight of 2-pyrrolidone, and 10 parts by weight of glycerin, as other solvents, and 0.1 part by weight of a non-ionic surfactant of the organic compound of the chemical formula 1, similar to that of Example 1, with the total addition amount (m+n) of EO equal to 4, were mixed together to produce an ink precursor. An ink was prepared in the same way as in Example 1, except using the ink precursor.

Example 4

In Example 4, 4 parts by weight of C.I. Direct Black 154, as a dyestuff serving as a colorant, 75.95 parts by weight of water as a solvent, 5 parts by weight of ethylene glycol, 5 parts by weight of ethylene glycol, and 10 parts by weight of glycerin, as other solvents, and 0.05 part by weight of a non-ionic surfactant containing the organic compound of the chemical formula 1, similar to that of Example 1, with the total addition amount (m+n) of EO equal to 4, were mixed together to produce an ink precursor. An ink was prepared in the same way as in Example 1, except using the ink precursor.

Example 5

In Example 5, 3 parts by weight of C.I. Direct Black 168, as a dyestuff serving as a colorant, 76.9 parts by weight of water as a solvent, 5 parts by weight of 1,2-propanediol, 5 parts by weight of 2-pyrrolidone and 10 parts by weight of glycerin, as other solvents, and 0.1 part by weight of a non-ionic surfactant containing the organic compound of the chemical formula 1, similar to that of Example 1, with the total addition amount (m+n) of EO equal to 4, were mixed together to produce an ink precursor. An ink was prepared in the same way as in Example 1, except using the ink precursor.

Example 6

In Example 6, 3 parts by weight of C.I. Direct Yellow 132, as a dyestuff serving as a colorant, 74.5 parts by weight of water as a solvent, 10 parts by weight of diethylene glycol, 10 parts by weight of tetraethylene glycol and 0.5 part by weight of triethanolamine, as other solvents, and 2 parts by weight of a non-ionic surfactant containing the organic compound of the chemical formula 1, similar to that of Example 1, with the total addition amount (m+n) of EO equal to 4, were mixed together to produce an ink precursor. An ink was prepared in the same way as in Example 1, except using the ink precursor.

Example 7

In Example 7, 3 parts by weight of C.I. Acid Red 289, as a dyestuff serving as a colorant, 52 parts by weight of water as a solvent, 100 parts by weight of ethylene glycol, 20 parts by weight of ethylene glycol and 10 parts by weight of glycerin, as other solvents, and 5 parts by weight of a non-ionic surfactant containing the organic compound of the chemical formula 1, similar to that of Example 1, with the total addition amount (m+n) of EO equal to 7, were mixed together to produce an ink precursor. An ink was prepared in the same way as in Example 1, except using this ink precursor.

Comparative Example 1

In Comparative Example 1, 4 parts by weight of C.I. Direct Blue 199, as a dyestuff serving as a colorant, 65 parts by weight of water as a solvent, 10 parts by weight of ethylene glycol, 10 parts by weight of diethylene glycol and 10 parts by weight of triethylene glycol, as other solvents, and 1 part by weight of polyoxyethylene nonylphenylether, manufactured by NIKKO CHEMICALS Co. Ltd. (trade name: NP10), as a surfactant, were mixed together to prepare an ink precursor. An ink was prepared in the same way as in Example 1, except using the ink precursor.

Comparative Example 2

In Comparative Example 2, 3 parts by weight of C.I. Direct Black 168, as a dyestuff serving as a colorant, 76.9 parts by weight of water as a solvent, 5 parts by weight of 1,2-propanediol, 5 parts by weight of 2-pyrrolidone and 10 parts by weight of glycerine, as other solvents, and 0.1 part by weight of polyoxyethylene nonylphenylether, manufactured by NIKKO CHEMICALS Co. Ltd. (trade name: NP7.5), as a surfactant, were mixed together to prepare an ink precursor. An ink was prepared in the same way as in Example 1, except using this ink precursor.

Comparative Example 3

In Comparative Example 3, 3 parts by weight of C.I. Acid Red 52, as a dyestuff serving as a colorant, 71 parts by weight of water as a solvent, 10 parts by weight of monobutyl triethyleneglycol, 5 parts by weight of 2-pyrrolidone and 10 parts by weight of glycerine, as other solvents, and 1 part by weight of polyoxyethylene tridecyl alcoholether, manufactured by NIPPON YUSHI Co. Ltd. (trade name: Dispanol TOC), as a surfactant, were mixed together to prepare an ink precursor. An ink was prepared in the same way as in Example 1, except using this ink precursor.

Comparative Example 4

In Comparative Example 4, 3 parts by weight of C.I. Direct Yellow 132, as a dyestuff serving as a colorant, 74.5 parts by weight of water as a solvent, 10 parts by weight of diethylene glycol, 10 parts by weight of tetraethylene glycol and 0.5 part by weight of triethanolamine, as other solvents, and 2 parts by weight of polyoxyethylene oleylether, manufactured by NIKKO CHEMICALS Co. Ltd. (trade name: Nonion E-215), as a surfactant, were mixed together to prepare an ink precursor. An ink was prepared in the same way as in Example 1, except using this ink precursor.

Comparative Example 5

In Comparative Example 5, 3 parts by weight of C.I. Acid Red 289, as a dyestuff serving as a colorant, 52 parts by weight of water as a solvent, 10 parts by weight of ethylene glycol, 20 parts by weight of diethylene glycol, 10 parts by weight of glycerin, as other solvents, and 5 parts by weight of polyoxyethylene nonylphenylether, manufactured by NIKKO CHEMICALS Co. Ltd. (trade name: NP10), as a surfactant, were mixed together to prepare an ink precursor. An ink was prepared in the same way as in Example 1, except using the ink precursor.

Comparative Example 6

In Comparative Example 6, 4 parts by weight of C.I. Direct Black 154, as a dyestuff serving as a colorant, 75.95 parts by weight of water as a solvent, 5 parts by weight of ethyleneglycol, 5 parts by weight of diethylene glycol, and 10 parts by weight of glycerine, as other solvents, and 0.05 part by weight of polyoxyethylene alkylether, manufactured by NIKKO CHEMICALS Co. Ltd. (trade name: BT9), as a surfactant, were mixed together to prepare an ink precursor. An ink was prepared in the same way as in Example 1, except using this ink precursor.

Reference Example

In the Reference Example, am ink was prepared in the same way as in Example 1, except using acetylene glycol based surfactant, manufactured by NISSHIN KAGAKU Co. Ltd., as a surfactant.

The surface tension and the viscosity of the Examples and Comparative Examples, prepared as described above, were measured. The surface tension was measured using an automatic surface tension meter, manufactured by KYOWA KAIMEN KAGAKU-SHA (model name: CBPV-Z), while the viscosity was measured using the Viscomate, manufactured by KYOWA KAIMEN KAGAKU-SHA (model name: VM-100A).

Table 1 below shows measured results of the surface tension and the viscosity of the Examples and the Comparative Examples.

TABLE 1

|  | Surface tension (mN/m) | Viscosity (mPas) |
|---|---|---|
| Ex. 1 | 34.9 | 3.66 |
| Ex. 2 | 41.4 | 3.50 |
| Ex. 3 | 35.4 | 3.00 |
| Ex. 4 | 46.1 | 2.37 |
| Ex. 5 | 47.6 | 2.67 |
| Ex. 6 | 37.2 | 2.76 |
| Ex. 7 | 37.2 | 5.83 |
| Comp. Ex. 1 | 32.1 | 3.48 |
| Comp. Ex. 2 | 36.3 | 2.50 |
| Comp. Ex. 3 | 31.5 | 3.03 |
| Comp. Ex. 4 | 40.5 | 2.92 |
| Comp. Ex. 5 | 31.2 | 6.55 |
| Comp. Ex. 6 | 47.3 | 2.33 |

It is seen from the results shown in Table 1 that, in the Examples and the Comparative Examples, the surface tension ranges between 31 mN/m and 48 mN/m, while the viscosity ranges between 2 mPa·s and 7 mPa·s, there being no marked difference in both the surface tension and the viscosity.

For each of the Examples, Comparative Examples and the Reference Example, an ink jet printer, provided with a head chip with 24 nozzles, each being of the nozzle diameter of 20 µm, and with a pair of resistance heaters, each being of the resistance value of 135 ohm, was used, and the head chip was driven with a driving voltage of 11 V, to print alphabetic letters or over-all printing (solid printing) of a preset area of a support, such as regenerated paper sheet manufactured by HONSHUU-SEISHI Co. Ltd. or on a bond paper sheet manufactured by MEAD Inc. The printing was then evaluated as to quality of the printed letter, ink fixation, frequency response and emission angle response.

The following Table 2 shows the results of evaluation of the quality of the printed letter, ink fixation, frequency response and emission angle response for the Examples, Comparative Examples and the Reference Example.

TABLE 2

|  | Letter/character printing quality | Ink fixation | Frequency response | | | Emission angle response | |
|---|---|---|---|---|---|---|---|
|  |  |  | 1 kHz | 3 kHz | 10 kHz | 20 µm offset | 30 µm offset |
| Ex. 1 | ○ | ◎ | ◎ | ◎ | ◎ | ◎ | ◎ |
| Ex. 2 | ○ | ◎ | ◎ | ◎ | ◎ | ◎ | ◎ |
| Ex. 3 | ○ | ◎ | ◎ | ◎ | ◎ | ◎ | ◎ |
| Ex. 4 | ○ | ○ | ◎ | ◎ | ◎ | ◎ | ◎ |
| Ex. 5 | ○ | ○ | ◎ | ◎ | ◎ | ◎ | ◎ |
| Ex. 6 | ○ | ◎ | ◎ | ◎ | ◎ | ◎ | ◎ |
| Ex. 7 | ○ | ◎ | ◎ | ◎ | ◎ | ◎ | ◎ |
| Comp. Ex. 1 | △ | △ | △ | X | X | X | X |
| Comp. Ex. 2 | △ | △ | △ | X | X | △ | X |
| Comp. Ex. 3 | X | △ | X | X | X | X | X |
| Comp. Ex. 4 | X | X | X | X | X | △ | X |
| Comp. Ex. 5 | X | ○ | △ | X | X | X | X |
| Comp. Ex. 6 | X | X | △ | X | X | △ | X |
| Ref. Ex. | ○ | ◎ | ◎ | ◎ | ◎ | ◎ | ◎ |

As for the quality of the printed letter, the letters printed on the above three sorts of paper sheets were observed with naked eyes for evaluation. In Table 2, a circle mark is used to indicate that no blurring is observed, a mark △ is used to indicate that blurring is observed but the letter may be recognized, and a mark x is used to indicate that a printed letter has become blurred to the extent that it cannot be recognized.

In evaluating the ink fixation, a letter printed on a PPC sheet manufactured by XEROX Inc. was rubbed by a filter paper sheet manufactured by TOYO KAGAKU SANGYO Co. Ltd. (trade name: No. 5C) and possible blurring in the printed letter was observed with naked eyes for evaluation. In ink fixation evaluation in Table 2, a double circle mark is used to indicate that blurring occurred in 5 seconds, a circle mark is used to indicate that blurring occurred in 10 seconds, a mark △ is used to indicate that blurring occurred in 15 seconds and a mark x is used to indicate that blurring occurred in 30 seconds.

For evaluating the frequency response, printing of letters/characters and solid printing were carried out for the above-mentioned three sorts of paper sheets, at the frequencies of 1 kHz, 3 kHz and 10 kHz, and the printed sites were visually observed for possible presence of blurring or voids (sites where the ink liquid droplets were not deposited). For evaluating the frequency response in the above Table 2, absence of both the blurring and the void is indicated by a double circle mark, presence of blurring in only the solid printing is indicated by a circle mark, presence of the blurring and the void in only the solid printing is indicated by a mark △, and presence of the blurring and the void in both the letter printing and the solid printing is indicated by a mark x. When supplied with the driving voltage of the frequency of 1 kHz, 3 kHz or 5 kHz, the head chip is driven at an emission interval of emitting the ink liquid droplets 1000 times, 3000 times and 10000 times per second, respectively.

For evaluating the emission angle response, letters/characters were printed on the above-mentioned three sorts of paper sheets for a case where ink liquid droplets were emitted as the ink emission angle was changed so that the mid point of an ink dot 40 µm in diameter, formed by emitting an ink liquid droplet right downwards from the nozzle, was offset by 20 µm and for case where ink liquid droplets were emitted as the ink emission angle was changed so that the mid point of the ink dot was offset by 30 μm, and evaluation was made by visually observing the possible presence of blurring or void, caused by the shifting of the deposited point, in the deposited position. In Table 2, evaluation of the emission angle response is by a double circle mark for indicating absence of blurring or void in the letter/character printing for each frequency, by a circle mark for indicating the presence of blurring, by a mark Δ for indicating the presence of the void and by a mark x for indicating the presence of both the blurring and the void.

It is seen from the results of evaluation shown in Table 2 that the Examples 1 to 7, containing non-ionic surfactants, containing in turn the organic compounds shown in the chemical formula 1, are not vitally different in surface tension or viscosity from the Comparative Examples 1 to 6, employing EO modified etheric surfactants, having a structure analogous to the non-ionic surfactant, while being superior thereto in all of the quality of the printed letter, ink fixation, frequency response and in emission angle response, thus giving the results of evaluation favorably comparing with the Reference Example.

In the Examples 1 to 7, since there is contained a non-ionic surfactant, containing at least the compound shown in the Chemical Formula 1, it is possible to optimize the wettability with respect to recording paper sheets, such as PPC paper sheets, regenerated paper sheets or bond paper sheets. Thus, in the Examples 1 to 7, it is possible to effect printing of high image quality letters/characters free of blurring or bleeding.

Additionally, with the Examples, since the ink is supplied promptly to the resistance heaters immediately after the emission of the ink liquid droplet i from the nozzle, the ink liquid droplet i may promptly be emitted from the nozzle, the ink liquid droplet i may be optimally supplied, each emission event, even if the emission interval is shortened, thus achieving high quality printing of letters/characters and solid printing free of blurring or void.

Moreover, in each Example, since superior wettability is demonstrated even in the vicinity of the nozzle in the head chip, it is possible to control the driving of the paired resistance heaters and to suppress variations in the emission angle of the liquid ink droplets I, emitted from the nozzle, each emission event, thus achieving high quality printing of letters/characters free of blurring or void.

On the other hand, in the Comparative Examples 1 to 6, employing EO modified etheric surfactants, containing the organic compound shown in the Chemical Formula 1, the ink has only poor wettability for the recording sheet P, as compared to the inks of the Examples, and is not dried quickly when the ink liquid droplet i is deposited on the recording sheet, with the ink suffering blurring or bleeding, thus lowering the printing quality.

Moreover, the ink of the Comparative Examples is lower in wettability for the head chip, such that it becomes difficult to supply the ink promptly to the resistance heater after emission of the ink liquid droplet i from the nozzle. That is, with the Comparative Examples, it becomes increasingly difficult to supply the ink liquid droplet from the nozzle, each ink emission event, as the emission interval becomes shorter, that is, as the frequency of the driving voltage becomes higher, with the consequence that the blurring or void is produced, thus lowering the printing quality.

Additionally, with the Comparative Examples, since the ink is poorer in wettability in the vicinity of the nozzle in the head chip than with the Examples, the driving of the paired resistance heaters is controlled to vary the direction of emission, so that variation is produced in the angle of emission of the ink liquid droplets from the nozzle. Thus, in the respective Comparative Examples, the ink emission angle is subjected to variations in the emission angle when the ink liquid droplets are emitted with variable emission directions from the nozzle, thus producing the blurring or voids to lower the printing quality.

It is seen from above that addition of the non-ionic surfactant, containing the organic compound shown in the Chemical Formula 1, in preparing the ink, the printing quality of the letters/characters, ink fixation, frequency response, and emission angle response of the produced ink, are superior, that is, the produced ink has properties equivalent to or higher than the ink of the Reference Example.

Example 8

Next, the Example 8 is explained.

The ink 2 of the Examples 1 to 7 may be further improved in wettability to the recording sheet P by adding a glycolether, having a vapor pressure at 20° C. not higher than 0.1 mmHg and a surface tension not higher than 35 mN/m, in addition to the colorant, solvent and the surfactant. Such glycolether may be enumerated by, for example, diethylene glycol monobutylether, triethylene glycol monomethylether and triethylene glycol monobuthylether.

Since the surface tension of the glycolether has a surface tension not larger than 35 nM/m, the surface tension of the ink 2 may be suppressed to a lower value at any time, such as before or after emitting the ink 2 or after deposition of the ink 2 on the recording sheet P. That is, by the ink 2 containing glycol ether, the static surface tension and the dynamic surface tension of the ink 2 assume an approximately equal value to suppress the surface tension to a lower value. Consequently, the surface tension of the ink 2 may be maintained at a lower value at any time, such as when the ink 2 is housed in the ink liquid chamber 45, when the ink is in the inside of an emission opening or after the ink has been deposited on the recording sheet P. In addition, the ink is improved in fixation properties, so that, even if case the fiber is exposed on the major surface of the recording paper sheet P, printing may be made on a common paper sheet, such as the copy paper, report paper, bond paper or a sheet for a series of slip paper sheets divided by perforations. This improves the quality of printed letters/characters, or so-called letter/character printing quality.

If the surface tension of the glycol ethers is larger than 35 mN/m, the surface tension of the ink 2 cannot be suppressed to a lower value, while it becomes difficult to improve the wettability further. The ink 2 is not permeated quickly to the recording paper sheet P, but bleeds at the deposition point on the recording sheet P, with the result that no clear image quality is obtained.

The aforementioned glycol ether has a vapor pressure not higher than 0.1 mmHg. If the vapor pressure is larger than 0.1 mmHg, the glycol ether is liable to be evaporated. If the glycol ether is evaporated, the content thereof in the ink 2 is decreased to render it difficult to suppress the surface tension of the ink 2 to a lower value. Consequently, the operation and effect in case the glycol ether is contained in the ink 2 cannot be obtained, such that wettability is lowered.

Thus, by employing the glycol ethers having the vapor pressure at 20° C. not higher than 0.1 mmHg and the surface tension not larger than 35 mN/m, the ink 2 may be improved as compared to a case where only the surfactant is used, such that the ink 2 may be emitted in stability to improve the wettability for the recording sheet P, so that printing may be of high image quality and free of void or bleeding.

The content of the glycol ethers in the ink 2 is not less than 1 wt % and not more than 20 wt %, based on the total weight of the ink 2. If the amount of glycol ethers is less than 1 wt % based on the total weight of the ink 2, the surface tension of the ink 2 cannot be suppressed to a lower value, such that sufficient wettability cannot be achieved.

If the amount of glycol ethers is larger than 20 wt % based on the total weight of the ink 2, the wettability for the inner peripheral wall of the nozzle 44a is high such that the ink 2 contained in the ink liquid chamber 45 leaks to outside along the inner peripheral wall of the nozzle 44a. The result is that the ink wettability to the recording sheet P becomes excessively high such that the ink 2 seeps to the reverse surface of the recording sheet P.

Thus, by having the glycol ethers, with the vapor pressure at 20° C. not higher than 0.1 mmHg and with the surface tension not larger than 35 mN/m, contained in an amount not less than 1 wt % and not larger than 20 wt %, based on the total weight of the ink 2, it is possible to realize sufficient wettability to print a clear image.

If a colorant, such as a water-soluble dyestuff, as a dye, or a variety of pigments, a solvent in which to disperse the colorant, a surfactant containing an organic compound, shown by a chemical formula 1, and glycol ether, with the vapor pressure at 20° C. not higher than 0.1 mmHg and with the surface tension not larger than 35 mN/m, are mixed together in the ink 2, the surface tension is lowered by the glycol ether, so that the content of the surfactant may be in a range from not less than 0.1 wt % to not larger than 5 wt % based on the total weight of the ink 2.

If the content of the surfactant, containing the surfactant containing in turn the organic compound represented by the general formula 1, is less than 0.1 wt %, based on the total weight of the ink 2, is less than 0.1 wt %, sufficient wettability for the recording sheet P cannot be developed. If conversely the content of the surfactant, containing the organic compound, represented by the chemical formula 1, is larger than 10 wt % based on the total weight of the ink 2, foaming occurs inconveniently in the ink liquid chamber 45, thus obstructing stable emission of the ink 2. Thus, by setting the content of the surfactant, containing the organic compound represented by the chemical formula 1, so as to be not less than 0.1 wt % and not larger than 5 wt %, it is possible to suppress foaming in the ink liquid chamber 45 as well as to provide for proper seeping into the recording sheet P.

In addition to the above-mentioned dyestuff, solvent or the surfactant, viscosity adjustment agents, surface tension adjustment agents, pH adjustment agents, antiseptics, rust-proofing agents or mold-proofing agents may be added to the ink 2. Specifically, the viscosity adjustment agents, surface tension adjustment agents and the pH adjustment agents may be enumerated by proteins, such as gelatin or casein, natural rubbers, such as gum Arabic, cellulose derivatives, such as methyl cellulose, carboxymethyl cellulose or hydroxymethyl cellulose, natural high polymeric materials, such as lignin sulfonates or shellacs, polyacrylates, styrene-acrylic acid copolymers, polyvinyl alcohol, and polyvinyl pyrrolidone. One or more of these may be added, if so desired. The antiseptics, rust-proofing agents and the mold-proofing agents may be enumerated by, for example, benzoic acid, dichlorophene, hexachlorophene, sorbic acid, p-hydroxy benzoate and ethylenediamine tetraacetate (EDTA). One or more of these may be added if so desired.

The ink 2 of the above composition may be prepared as follows: In preparing a solution type ink 2, employing e.g. the dye as a colorant, the colorant agent, formed of the above dyestuff, solvent and the surfactant are mixed together, heated to 40 to 80° C. and, in this state, are agitated and dispersed together, using e.g. a screw. In the case of the dispersion ink 2, employing e.g. the pigment as the colorant, the ink may be prepared by dispersing the pigment and the surfactant in a solvent, using a fine pigment dispersing method, used up to now, for example, a ball mill, a sand mill, an attriter, a roll mill, an agitator, a Henschell mixer, a colloid mill, an ultrasonic homogenizer, a pearl mill or a wet jet mill. The ink 2, thus prepared, is processed at least once by pressure filtration, employing a filter, and/or by filtration under a reduced pressure, or at least once by centrifugal separation, employing a centrifugal separator, for removing impurities, coarse particles, or cuttings.

The ink 2, prepared as described above, is accommodated in the ink cartridge 11, shown in FIGS. 2 and 3, as described above.

Examples 9 to 14 and Comparative Examples 7 to 10, in which an ink of the present invention, containing a colorant, a solvent, a surfactant and glycol ether, is actually prepared, are hereinafter explained.

Example 9

In Example 9, 3 wt % of C.I. Direct Yellow 86, as a dyestuff serving as a colorant, 75.9 wt % of water as a solvent, 10 wt % of glycerin and 10 wt % of ethylene glycol, as other solvents, 1 wt % of diethylene glycol monobutylether, having a vapor pressure at 20° C. of 0.1 mmHg and a surface tension of 26 mN/m, and 0.1 wt % of a non-ionic surfactant containing the organic compound of the chemical formula 1:

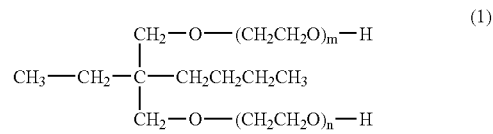

where m and n are integers not less than 1, with the total addition amount (m+n) of EO equal to 4, were mixed together to produce an ink precursor. Meanwhile, as the surfactant containing the organic compound, with the above chemical formula 1, NEXCOAT manufactured by NIKKO CHEMICALS Co. Ltd., having the addition amount of ethylene oxide changed, was used.

The ink precursor, obtained with the above composition, was agitated for four hours, in a state heated to 60° C. After the agitation, the ink precursor was compulsorily filtered, as the precursor was pressured with a membrane filter, manufactured by ADVANTEC Inc. with a mesh size of 0.8 μm. The ink was prepared in this manner.

Example 10

In Example 10, 3 wt % of C.I. Direct Yellow 86, as a dyestuff serving as a colorant, 57.9 wt % of water as a solvent, 10 wt % of ethylene glycol, and 10 wt % of ethylene glycol, as other solvents, 20 wt % of diethylene glycol monobutylether, as glycol ether, having a vapor pressure at 20° C. of 0.1 mmHg and a surface tension of 26 mN/m, and 0.1 wt % of a non-ionic surfactant of the organic compound of the chemical formula 1, similar to that of Example 1, with the total addition amount (m+n) of EO equal to 4, were mixed together to produce an ink precursor. An ink was prepared in the same way as in Example 9, except preparing the ink precursor.

Example 11

In Example 11, 3 wt % of C.I. Direct Yellow 86, as a dyestuff serving as a colorant, 75.9 wt % of water as a solvent, 10 wt % of glycerin, and 10 wt % of ethylene glycol, as other solvents, 1 wt % of triethylene glycol monobutylether, as glycol ether, having a vapor pressure at 20° C. of 0.1 mmHg and a surface tension of 27 mN/m, and 5.0 wt % of a non-ionic surfactant of the organic compound of the chemical formula 1, similar to that of Example 1, with the total addition amount (m+n) of EO equal to 2, were mixed together to produce an ink precursor. An ink was prepared in the same way as in Example 9, except preparing the ink precursor.

Example 12

In Example 12, 3 wt % of C.I. Direct Yellow 86, as a dyestuff serving as a colorant, 75.9 wt % of water as a solvent, 10 wt % of glycerin, 10 wt % of ethylene glycol, as other solvents, 1 wt % of triethylene glycol monobutylether, as glycol ether, having a vapor pressure at 20° C. less than 0.1 mmHg and a surface tension of 27 mN/m, and 0.1 wt % of a non-ionic surfactant of the organic compound of the chemical formula 1, similar to that of Example 1, with the total addition amount (m+n) of EO equal to 2, were mixed together to produce an ink precursor. An ink was prepared in the same way as in Example 9, except preparing the ink precursor.

Example 13

In Example 13, 3 wt % of C.I. Direct Yellow 86, as a dyestuff serving as a colorant, 57.9 wt % of water as a solvent, 10 wt % of glycerin, and 10 wt % of ethylene glycol, as other solvents, 1 wt % of triethylene glycol monobutylether, as glycol ether, having a vapor pressure at 20° C. less than 0.1 mmHg and a surface tension of 27 mN/m, and 0.1 wt % of a non-ionic surfactant of the organic compound of the chemical formula 1, similar to that of Example 1, with the total addition amount (m+n) of EO equal to 2, were mixed together to produce an ink precursor. An ink was prepared in the same way as in Example 9, except preparing the ink precursor.

Example 14

In Example 14, 3 wt % of C.I. Direct Yellow 86, as a dyestuff serving as a colorant, 75.9 wt % of water as a solvent, 10 wt % of glycerin, and 10 wt % of ethylene glycol, as other solvents, 1 wt % of triethylene glycol monobutylether, as glycol ether, having a vapor pressure at 20° C. less than 0.1 mmHg and a surface tension of 27 mN/m, and 5.0 wt % of a non-ionic surfactant of the organic compound of the chemical formula 1, similar to that of Example 1, with the total addition amount (m+n) of EO equal to 2, were mixed together to produce an ink precursor. An ink was prepared in the same way as in Example 9, except preparing this ink precursor.

Comparative Example 7

In Comparative Example 7, 3 wt % of C.I. Direct Yellow 86, as a dyestuff serving as a colorant, 76.0 wt % of water as a solvent, 10 wt % of glycerin, and 10 wt % of ethylene glycol, as other solvents, and 1 wt % of triethylene glycol monobutylether, as glycol ether, having a vapor pressure at 20° C. less than 0.1 mmHg and a surface tension of 26 mN/m, were mixed together to produce an ink precursor not containing the non-ionic surfactant of the organic compound of the chemical formula 1, similar to that of Example 8, with the total addition amount (m+n) of EO equal to 4. An ink was prepared in the same way as in Example 9, except preparing this ink precursor.

Comparative Example 8

In Comparative Example 8, 3 wt % of C.I. Direct Yellow 86, as a dyestuff serving as a colorant, 51.9 wt % of water as a solvent, 10 wt % of glycerin, and 10 wt % of ethylene glycol, as other solvents, 25 wt % of diethylene glycol monobutylether, as glycol ether, having a vapor pressure at 20° C. less than 0.1 mmHg and a surface tension of 26 mN/m, and 0.1 wt % of a non-ionic surfactant of the organic compound of the chemical formula 1, similar to that of Example 9, with the total addition amount (m+n) of EO equal to 4, were mixed together to produce an ink precursor. An ink was prepared in the same way as in Example 9, except preparing this ink precursor.

Comparative Example 9

In Comparative Example 9, 3 wt % of C.I. Direct Yellow 86, as a dyestuff serving as a colorant, 77.0 wt % of water as a solvent, 10 wt % of glycerin, and 10 wt % of ethylene glycol, as other solvents, and 5 wt % of a non-ionic surfactant of the organic compound of the chemical formula 1, similar to that of Example 8, with the total addition amount (m+n) of EO equal to 4, were mixed together to produce an ink precursor containing no glycol ether. An ink was prepared in the same way as in Example 9, except preparing this ink precursor.

Comparative Example 10

In Comparative Example 10, 3 wt % of C.I. Direct Yellow 86, as a dyestuff serving as a colorant, 77.0 wt % of water as a solvent, 10 wt % of glycerin and 10 wt % of ethylene glycol, as other solvents, 20 wt % of ethylene glycol monobutylether, as glycol ether, having a vapor pressure at 20° C. of 0.6 mmHg and a surface tension of 24 mN/m, and 5.0 wt % of a non-ionic surfactant of the organic compound of the chemical formula 1, similar to that of Example 12, with the total addition amount (m+n) of EO equal to 4, were mixed together to produce an ink precursor. An ink was prepared in the same way as in Example 9, except preparing this ink precursor.

For each of the Examples and Comparative Examples, described above, a head chip of an ink jet printer device, with the nozzle diameter of 20 μm, the resistance value of each of paired resistance heaters being 135 ohm, with the number of the nozzles of the head chip being 24, was driven with a driving voltage of 11V, to print alphabetical letters and to effect all-over printing of a preset area (so-called solid printing) on a PPC sheet manufactured by XEROX Inc., regenerated paper sheets manufactured by HONSHU SEISHI Co. Ltd., or on a bond paper sheet manufactured by MEAD Inc., and the evaluation was made of the quality of the printed letters, frequency response and on emission stability.

The following Table shows the results of the evaluation of the quality of printed letters, frequency response and emission stability.

TABLE 3

| | Surfactant shown in chemical formula (1) | | Glycol ethers | | | | Letter/character printing quality | Frequency response | | | Emission accuracy |
|---|---|---|---|---|---|---|---|---|---|---|---|
| | M + n in chemical formula (1) | Content (wt %) | Compounds | Content (wt %) | Vapor pressure [mmHg] | Surface tension [mN/m] | | 1 kHz | 3 kHz | 10 kHz | |
| Ex. 9 | 4 | 0.1 | Diethylene glycol monobutylether | 1 | 0.1 | 26 | ○ | ◎ | ○ | ○ | ○ |
| Ex. 10 | 4 | 0.1 | Diethylene glycol monobutylether | 20 | 0.1 | 26 | ◎ | ◎ | ◎ | ◎ | ○ |
| Ex. 11 | 2 | 5.0 | Triethylene glycol monobutylether | 1 | Less than 0.1 | 27 | ◎ | ◎ | ◎ | ◎ | ○ |
| Ex. 12 | 2 | 0.1 | Triethylene glycol monobutylether | 1 | Less than 0.1 | 27 | ○ | ◎ | ○ | ○ | ○ |
| Ex. 13 | 2 | 0.1 | Triethylene glycol monobutylether | 20 | Less than 0.1 | 27 | ◎ | ◎ | ◎ | ◎ | ○ |
| Ex. 14 | 2 | 5.0 | Triethylene glycol monobutylether | 1 | Less than 0.1 | 27 | ◎ | ◎ | ◎ | ◎ | ○ |
| Comp. Ex. 7 | 4 | 0.0 | Triethylene glycol monobutylether | 1 | 0.1 | 26 | ○ | ◎ | ○ | X | ○ |
| Comp. Ex. 8 | 4 | 0.1 | Triethylene glycol monobutylether | 25 | 0.1 | 26 | Δ | ◎ | ◎ | ◎ | ○ |
| Comp. Ex. 9 | 4 | 5.0 | — | — | — | — | ◎ | ◎ | ○ | X | ○ |
| Comp. Ex. 10 | 4 | 5.0 | Ethylene glycol monobutylether | 20 | 0.6 | 24 | ◎ | ◎ | ◎ | ◎ | X |

Meanwhile, evaluation of the quality of the printed letters/characters is by visual observation of the letters/characters on the aforementioned three sorts of the paper sheets. In Table 3, in evaluating the quality of the printed letters/characters, a double circle mark indicates that no blurring is observed, a circle mark indicates that the printed letter/character undergoes slight bleeding but still may be recognized, a mark Δ indicates that bleeding is observed and the printed letter/character undergoes bleeding, and a mark x indicates that the printed letter/character undergoes bleeding such that the printed letter/character cannot be recognized.

For evaluating the frequency response, printing of letters/characters and solid printing were carried out for the above-mentioned three sorts of paper sheets, at the frequencies of 1 kHz, 3 kHz and 10 kHz, and the printed sites were visually observed for possible presence of blurring or voids (sites where the ink liquid droplets were not deposited). For evaluating the frequency response in the above Table 2, optimum ink followup, absence of both the blurring and the void in both the letter/character printing and void and no observed offset in the deposited point are indicated by a double circle mark, presence of blurring in only the solid printing, is indicated by a circle mark, offset of part of deposited points and presence of the blurring and the void in the solid printing despite absence of the blurring and the void in the printed letter/character, are indicated by a mark Δ, and presence of the blurring and the void in both the letter printing and the solid printing is indicated by a mark x. When supplied with the driving voltage of the frequency of 1 kHz, 3 kHz or 5 kHz, the head chip is driven at an emission interval of emitting the ink liquid droplets 1000 times, 3000 times and 10000 times per second, respectively.

In evaluating the emission stability, the head cartridge, holding the ink tanks, charged with respective inks, is exposed to atmospheric air at room temperature for one week and the letter/character printing and solid printing are carried out on each of the three sorts of paper sheets. The possible presence of blurring in printed sites or of sites where no ink droplets have been deposited, that is, the presence or absence of voids, was visually observed for evaluation. As for the evaluation of the emission stability, the absence of blurring and void in both the printing of letter/character and no offsetting in the deposited point are indicated by a double circle mark, the presence of slight blurring in only the solid printing is indicated by a circle mark, offset of part of deposited points and presence of the blurring and the void in the solid printing despite absence of the blurring and the void in the printed letter/character are indicated by a mark Δ, and presence of the blurring and the void in both the letter printing and the solid printing is indicated by a mark x.

It is seen from the results of evaluation shown in Table 3 that the Examples 1 to 6, containing the non-ionic surfactant, containing in turn the organic compound represented by the chemical formula 1, and the glycol ether, having the vapor pressure at 20° C. not larger than 0.1 mmHg and the surface tension not larger than 35 mN/m, in an amount ranging between 1 and 20 wt %, are superior in all of the printing quality of letters/characters, frequency response and emission stability to the Comparative Example 1 containing no non-ionic surfactant, or to the Comparative Examples 2 to 4 not containing glycol ether having the vapor pressure not larger than 0.1 mmHg and the surface tension not larger than 35 mN/m, or not containing glycol ether in an amount ranging between 1 and 20 wt %.

In the inks of Examples 9 to 14, containing the non-ionic surfactant including at least the organic compound represented by the chemical formula 1 and the glycol ether having the vapor pressure at 20° C. not larger than 0.1 mmHg and the surface tension not larger than 35 mN/m, the surface tension of the ink is lowered, while the wettability for the recording sheet P is improved, that is, the ink may be permeated quickly along the thickness of the recording sheet P. Thus, with the Examples 9 to 14, printing of letters/characters, free of blurring or bleeding, may be made for recording sheets, such as PPC sheets, regenerated sheets or bond sheets.

Moreover, with the Examples, the glycol ether, having the vapor pressure at 20° C. not larger than 0.1 mmHg and the surface tension not larger than 35 mN/m, is contained in the ink, the ink is maintained in the low surface tension state in the ink liquid chamber or within the nozzle, with the ink exhibiting superior wettability for the ink liquid chamber or within the nozzle. Hence, the ink may be supplied quickly to the resistance heaters directly after emission of the ink liquid droplet from the nozzle, such that the ink liquid droplets may quickly be emitted from the nozzle even in case of shortening of the ink emission interval. That is, if, with the Examples, the frequency of the driving voltage is increased to 1 kHz, 3 kHz or to 10 kHz, with the emission interval becoming correspondingly shorter, the ink liquid droplets may quickly be supplied to the resistance heaters, so that, even in case the printing speed is lowered, the ink liquid droplets may adequately be emitted from the nozzle 44a for each emission event, thus achieving a high image quality printing.

Since the foam other than that formed on the resistance heater may be suppressed, and the ink exhibits superior wettability for the inner wall of the nozzle, the ink may be emitted in a preset direction without producing offsetting in the deposited position, with the result that the printing of letters/characters of high image quality free of voids and solid printing may be achieved.

With the Comparative Example 7, not containing the non-ionic surfactant, in contradistinction from the Examples, the ink exhibits only poor wettability for the interior of the ink chamber, such that it becomes difficult to supply the ink promptly to the resistance heaters after emission of the ink liquid droplets. The result is that, in the Comparative Example 7, the shorter the emission interval, that is, the higher the emission interval, the more difficult becomes the emission of the ink liquid droplets, so that the ink emission cannot adapt itself to the speedy printing and hence the offsetting of the deposited position, blurring or voids are produced to lower the letter/character printing quality.

In the Comparative Example 8, in contradistinction from the Examples, 25 wt % of diethylene glycol monobutylether, as a glycol ether having the vapor pressure at 20° C. not larger than 0.1 mmHg and the surface tension not larger than 35 mN/m, is contained in the ink, and hence the ink exhibits extremely high wettability for the recording sheet, such that, in case the ink liquid droplet is emitted and deposited on the recording sheet, the ink bleeds on the surface of the recording sheet to lower the printing quality.

In the Comparative Example 9, in contradistinction from the Examples, diethylene glycol monobutylether, as a glycol ether having the vapor pressure at 20° C. not larger than 0.1 mmHg and the surface tension not larger than 35 mN/m, is not contained in the ink, and hence the ink is not in the low surface tension state. Thus, the ink fails to exhibit sufficient wettability for the ink liquid chamber or the nozzle, such that, after emission of the ink liquid droplet, it becomes difficult to supply the ink to the resistance heater quickly after emission of the ink liquid droplet. Thus, in the Comparative Example 3, the shorter the emission interval, that is, the larger the frequency of the driving voltage, the more difficult becomes the emission of the ink liquid droplet from the nozzle for each emission event, so that ink emission cannot adapt itself to speedy printing, with the deposited position becoming offset or blurring or void being produced to lower the quality of letter/character printing.

In the Comparative Example 10, containing ethylene glycol monobutylether, with the vapor pressure at 20° C. of 0.6 mmHg and the surface tension of 24 mN/m, in contradistinction from the Examples, this ethylene glycol monobutylether is liable to be evaporated to lower the content of ethylene glycol monobutylether in the ink. Thus, in the Comparative Example 4, the surface tension of the ink cannot be suppressed to a lower value, such that sufficient wettability for the ink liquid chamber or to the nozzle cannot be obtained. If the state of failure in ink emission is sustained, nozzle clogging occurs, so that, in the Comparative Example 10, emission of ink liquid droplets is delayed or deviated from the preset direction, resulting in lowered emission stability, offset deposition positions or voids.

In light of the foregoing, at least the non-ionic surfactant, containing the organic compound shown by the chemical formula 1 and the glycol ether having the vapor pressure at 20° C. not larger than 0.1 mmHg and the surface tension not larger than 35 mN/m, is contained in an amount of 1 to 20 wt %, in producing the ink, whereby an ink may be produced which is free from blurring or bleeding, stabilized in the ink liquid droplet emission direction and which is superior in long-term storage properties, quality in printed letter/character, frequency response and in emission stability.

The present invention is not limited to the above embodiment explained with reference to the drawings and, as may be apparent to those skilled in the art, various changes, corrections or substitutions may be carried out without departing from the claims and purport of the invention.

INDUSTRIAL APPLICABILITY

According to the present invention, described above, the surfactant containing the organic compound having the above chemical formula is contained in the recording liquid in place of the conventional surfactant composed e.g. of acetylene glycols, such that a recording liquid may be produced which is less expensive than in case the conventional acetylene glycols, for examples, are used.

The invention claimed is:

1. A recording liquid deposited on a support in the state of a liquid droplet for printing thereon, said recording liquid comprising:
    a dye;
    a solvent for dispersing the dye; and
    a surfactant containing an organic compound represented by the following chemical formula 1:

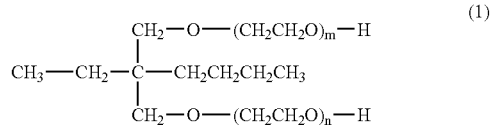

(1)

where m and n are integers not less than 1, and a glycol ether having the vapor pressure at 20° C. not larger than 0.1 mmHg and the surface tension not larger than 35 mN/m,
wherein, the amount of surfactant is contained in an amount of not less than 0.5 wt % and not larger than 10.0 wt % of said recording liquid, and
the sum of m and n in formula 1 is less than or equal to 30.

2. The recording liquid according to claim 1 wherein:
said surfactant is contained in an amount not less than 0.1 wt % and not larger than 5.0 wt % of said recording liquid, and
said glycol ether is contained in an amount not less than 1 wt % and not larger than 20 wt % of said recording liquid.

3. The recording liquid of claim 1, wherein the sum of m and n in Formula 1 is from 2 to 10.

4. The recording liquid of claim 3, wherein the sum of m and n in Formula 1 is from 4 to 8.

* * * * *